(12) United States Patent
Eller et al.

(10) Patent No.: US 7,280,881 B2
(45) Date of Patent: Oct. 9, 2007

(54) METHOD AND SYSTEM FOR REDUCING LEAD-TIME IN THE PACKAGING INDUSTRY

(75) Inventors: Robert J. Eller, Webster, NY (US); Joseph J. Cardillo, Fairport, NY (US)

(73) Assignee: ExxonMobil Oil Corporation, Irving, TX (US)

(*) Notice: Subject to any disclaimer, the term of this patent is extended or adjusted under 35 U.S.C. 154(b) by 0 days.

(21) Appl. No.: 11/644,427

(22) Filed: Dec. 22, 2006

(65) Prior Publication Data

US 2007/0173965 A1 Jul. 26, 2007

Related U.S. Application Data

(62) Division of application No. 09/992,345, filed on Nov. 14, 2001, now Pat. No. 7,225,040.

(60) Provisional application No. 60/251,488, filed on Dec. 5, 2000.

(51) Int. Cl.
G06F 19/00 (2006.01)
B41J 1/00 (2006.01)
G06F 15/00 (2006.01)

(52) U.S. Cl. .................. 700/100; 700/99; 700/106; 700/107

(58) Field of Classification Search ............. 700/99, 700/100, 106, 107; 705/22–25, 29
See application file for complete search history.

(56) References Cited

U.S. PATENT DOCUMENTS

| | | | | |
|---|---|---|---|---|
| 5,231,567 A | * | 7/1993 | Matoba et al. | 700/100 |
| 5,559,708 A | * | 9/1996 | Turnbull et al. | 700/97 |
| 5,657,453 A | * | 8/1997 | Taoka et al. | 705/1 |
| 5,960,164 A | * | 9/1999 | Dorfman et al. | 358/1.11 |
| 5,982,996 A | * | 11/1999 | Snyders | 358/1.15 |
| 5,991,783 A | * | 11/1999 | Popa et al. | 715/522 |
| 6,036,345 A | * | 3/2000 | Jannette et al. | 700/97 |
| 6,067,406 A | * | 5/2000 | Van Hoof et al. | 358/1.9 |
| 6,167,382 A | * | 12/2000 | Sparks et al. | 705/26 |
| 6,247,507 B1 | * | 6/2001 | Soehnlen et al. | 141/2 |
| 6,415,196 B1 | * | 7/2002 | Crampton et al. | 700/100 |
| 6,611,727 B2 | * | 8/2003 | Bickley et al. | 700/99 |

OTHER PUBLICATIONS

Mathias Weske, "Flexible Modeling and Execution of Workflow Activities", hicss, p. 713, Thirty First Annual Hawaii INternational Conference on System Sciences—vol. 7, 1998.*

* cited by examiner

*Primary Examiner*—Michael D. Masinick
(74) *Attorney, Agent, or Firm*—Darryl M. Tyus

(57) ABSTRACT

A system for integrating a packaging supply chain from a point that a digital contract proof is available through delivery of finished packaging materials to an end user, wherein said system comprises a computer system accessible for interactive communications with users, said computer system comprising a first memory area for storing functionality and data for end user members of the supply chain; a second memory area for storing functionality and data for converter members of the supply chain; and a third memory area for storing functionality and data for other members of the supply chain.

38 Claims, 63 Drawing Sheets

Figure 3E

| Plan Capacity - S & OP Inventory Build Or Draw | | | | | |
|---|---|---|---|---|---|
| | Draw | | Build | | |
| Class of Demand | Time (Hrs) | Length | Time (Hrs) | Length | Comments |
| 10S | 20 | 405,240 | | | Draw from last months Mem Day Build |
| 8S | | | | | |
| 8S/CS | | | 15 | 225,000 | Build for Back To School |
| 6S/P3 | | | | | |
| Pool | | | | | |

Month: May
Year: 2000

Screen No. Plan 1.1.5

Plan Capacity - Capacity Group Setup

Process Step: Printing
Capacity Group Abreviation: 10S
Capacity Group Description: 10 Station Capacity Groups

| Priority | Capacity Group | Cylinder Width | Max Stations | Extrusion Lam | Adhesive Lam | Max Process | Max Bounce | Cold Seal |
|---|---|---|---|---|---|---|---|---|
| 1 | Pool | 1600 | 6 | N | N | 3 | 3 | N |
| 2 | 6S | 1600 | 6 | N | N | 2 | 3 | N |
| 3 | 6SP3 | 1600 | 6 | Y | Y | 3 | 3 | Y |
| 4 | 8S | 1600 | 8 | N | Y | 2 | 3 | Y |
| 5 | 10S | 1700 | 10 | Y | Y | 3 | 3 | N |

CONFIDENTIAL, DO NOT DUPLICATE  Screen No. SU 6.1.8

Figure 7A

Sultana is a registered trademark of Verkade and United Biscuits.

Sultana is a registered trademark of Verkade and United Biscuits.

| Item Definition - Bill of Materials | | | | | | |
|---|---|---|---|---|---|---|
| Item # | 167887-001 | | | Customer Item No.: | 12345-1000 | |
| Customer | Wise | | | | | |
| Description | 6 Oz Regular Potato Chips | | | | | |
| Image # | 990ct-54978v1 | | | | | |

Bill Of Materials  Basis  500,000  IMPS

| | Material # | Description | Material | Width | Gauge | Qty Req (Kg) |
|---|---|---|---|---|---|---|
| Substrate 1 | F-20C-1145 | 20 Coex | | 1145 | 20 | 1521 |
| Substrate 2 | F-18M-1140 | 18 Met | 18MM488 | 1140 | 18 | 1371 |
| Substrate 3 | | | | | | |

| | Material # | Description | Material | Coating Weight | Coating Units | Qty Req (Kg) |
|---|---|---|---|---|---|---|
| Top Coat | | | | | | |
| Lam 1/2 | A-1234-Sun | ADH | PU | 2.3 | g/sq M | 192 |
| Lam 2/3 | | | | | | |
| Bottom Coat | | | | | | |

Ink Bill Of Materials

CONFIDENTIAL   Screen No. OM 2.6.2

Figure 11L

METHOD AND SYSTEM FOR REDUCING LEAD-TIME IN THE PACKAGING INDUSTRY

CROSS-REFERENCE TO RELATED APPLICATION

This is a divisional of U.S. application Ser. No. 09/992,345, filed Nov. 14, 2001, now U.S. Pat. No. 7,225,040 and claims benefit of 60/251,488, filed Dec. 5, 2000, incorporated herein by reference in its entirety.

BACKGROUND OF THE INVENTION

The present invention relates to a method and a system for reducing lead-time in the packaging industry. This invention is particularly beneficial to the flexible packaging industry which services the fast moving consumer goods manufacturing industry (i.e., producers of snacks, cookies, crackers, candies, health and beauty aids, etc.). Currently packaging is the longest lead-time item for these companies, and a system-wide bottleneck for them. Reducing the packaging lead-time allows for waste reduction and revenue enhancement opportunities.

The method disclosed herein comprises an embodiment of a business process which may be enabled by the internet and capable of exchanging information with other business processes.

U.S. Pat. No. 6,067,406 discloses a method and device wherein the output mode of an output device for rendering electronic images on an output medium may be characterized by different user-selectable settings such as: paper type, ink type, etc. Apart from the screen characteristics such as screen ruling, frequency and angle, a calibration curve can be communicated via the page description language (e.g., PostScript Level 2) for each color component. Sets of calibration curves can be prepared for specific types of rendering, and be referenced by name. By this name indication and by naming conventions based upon the output mode or screening parameters, calibration changes can be introduced quickly and consistently. U.S. Pat. No. 6,067,406 is incorporated herein by reference.

U.S. Pat. No. 5,991,783 discloses a system and method for generating, storing and transmitting a layout page containing graphical data correlated to at least one graphical image which has previously been graphically encoded, such that the layout page may be printed either as a complete, full-color image, or as individual color separation plates. The system and method create a set of master data files, having a main master file which stores complete RGB (red, green, blue) color data for the graphical image, and a correlated set of CMYK (cyan, magenta, yellow, black) master files, each containing graphical data for a single color separation plate for the graphical image. The main master file contains pointers to each of the CMYK master files. The system and method also create a set of preview data files: a set of CMYK preview files essentially only containing a pointer to the corresponding CMYK master file, and a main preview file essentially only containing a pointer to the main master file, and pointers to each of the CMYK preview files. U.S. Pat. No. 5,991,783 is incorporated herein by reference.

U.S. Pat. No. 5,982,996 discloses an information distributing apparatus for operating within a computer network environment. The information distributing apparatus includes a computer having an operating system and is configured to operate within the computer network environment. The apparatus has an application configured for running on the computer via the operating system, the application configured to generate a source job in the form of an intermediate file format comprising an output instruction file. The apparatus includes a print processor in the form of an intermediate executable code for operating on the output instruction file. The apparatus also includes at least one output device having an output device driver configured to convert the output instruction file to output instructions usable by the output device for producing output. The print processor is operable on the output instruction file to select the device driver of one of the at least one output device to render the output instruction file, and feed the output instruction file to the output device driver of one of the at least one output device. A corresponding method is also disclosed. U.S. Pat. No. 5,982,996 is incorporated herein by reference.

U.S. Pat. No. 5,960,164 also discloses a method and system for producing documents at a first site from database information produced at a second site remote from the first site has enhanced system flexibility and enhanced data handling throughput, which are accomplished by adopting standard programming interface or database tables to allow a computer at the second site to obtain information necessary to generate all necessary data codes and stream formatting information which will be utilized at the first site. An object association table, which associates document production jobs with specific documents and appropriate descriptions, is provided at the first site so that it is accessible—e.g. through an online communications network—at the second site. The object association table is accessed at the second site in realizing substantially only file names in the object association table, to produce database information at the second site. The database information is supplied from the second site to the first site where it is translated so that it may be utilized by a specific print engine at the first site, utilizing a job formatting table to build an engine specific print stream for one or more print engines. Then the engine specific print stream, tailored to the particular print engine utilized, electronically controls a specific print engine at the first site to image documents having variable information from the database information supplied from the second site. U.S. Pat. No. 5,960,164 is incorporated herein by reference.

Packaging is the longest lead-time ingredient for the consumer goods manufacturer. Most components that the manufacturer uses are commodities with lead-times of hours or days. However, packaging is a custom product with lead-times of 2-4 weeks for a repeat order and lead-times of 8-12 weeks or more for a new design. This relatively long lead-time creates system-wide bottlenecks; inefficiencies and waste; packaging write-offs; barriers to lean manufacturing at end user sites; and 4 to 8 weeks of delay in launching new products. The long lead-time is the primary reason that successful promotions are not fully exploited.

The long lead-time for packaging is caused by complexity of the supply chain, the distance between the parties, and the process of manufacturing and delivering the packaging to the consumer goods manufacturer. A large lead-time reduction can be achieved by using the internet to collapse apparent distance between the parties and implementing a new business process using the internet. Accordingly, it is an object of the present invention to provide a method and system for reducing lead-time in the flexible packaging industry.

All patents and publications referred to in this application are hereby incorporated herein by reference in their entirety.

SUMMARY OF THE INVENTION

The present invention relates to a method and system for linking the various members of the packaging (including labels) supply chain. The invention provides an integrated order placement, production planning, scheduling, and material requirements planning environment for the various members of the packaging supply chain. Among the members in the flexible packaging supply chain are end users, converters, and suppliers of goods and services necessary for the creation of packaging. The method and system of the present invention allow members of the supply chain to access the additional data they need to integrate their activities and reduce packaging lead-times. In addition, the system is designed to interface with the converter's order management, inventory, and purchasing systems to acquire data for production planning (e.g. inventory levels), order processing, and certain other functions. The system is designed to interface with digital files containing package designs and images to provide information for item creation, production planning, and scheduling.

BRIEF DESCRIPTION OF THE FIGURES

FIG. 3E is an exemplary monitor view of an Inventory Adjustment Table of the Sales and Operation processes of the current invention. See also paragraph [00133] of the specification.

FIG. 4B is an exemplary monitor view of the Inventory Adjustment Table of the Master Production Scheduling processes of the current invention. See also paragraph [00140] of the specification.

FIG. 5C is an exemplary monitor view of the Capacity Group Setup Table of the Master Production Scheduling processes of the current invention. See also paragraph [00146] of the specification.

FIG. 7A is an exemplary monitor view of an End User-Place Order process of the Order Management processes of the current invention. See also paragraph [00156] of the specification.

FIG. 9D is an exemplary monitor view of the Change Order process of the Order Management processes of the current invention. See also paragraph [00169] of the specification.

FIG. 9E is an exemplary monitor view of the Create Order process of the Order Management processes of the current invention. See also paragraph [00170] of the specification.

FIG. 10B is an exemplary monitor view of the Package Structure-Converter Data process of the Order Management processes of the current invention. See also paragraph [00174] of the specification.

FIG. 10C is an exemplary monitor view of the Enter/Change Item process of the Order Management processes of the current invention. See also paragraph [00175] of the specification.

FIG. 10D is an exemplary monitor view of the Bill of Materials process of the Order Management processes of the current invention. See also paragraph [00176] of the specification.

FIG. 11L is an exemplary monitor view of the Update Production process of the Schedule Order processes of the current invention. See also paragraph [00194] of the specification.

FIG. 12F is an exemplary monitor view of the Explode BOMs process of the Material Requirements Planning processes of the current invention. See also paragraph [00201] of the specification.

DETAILED DESCRIPTION OF INVENTION

General Overview

Figure 1:
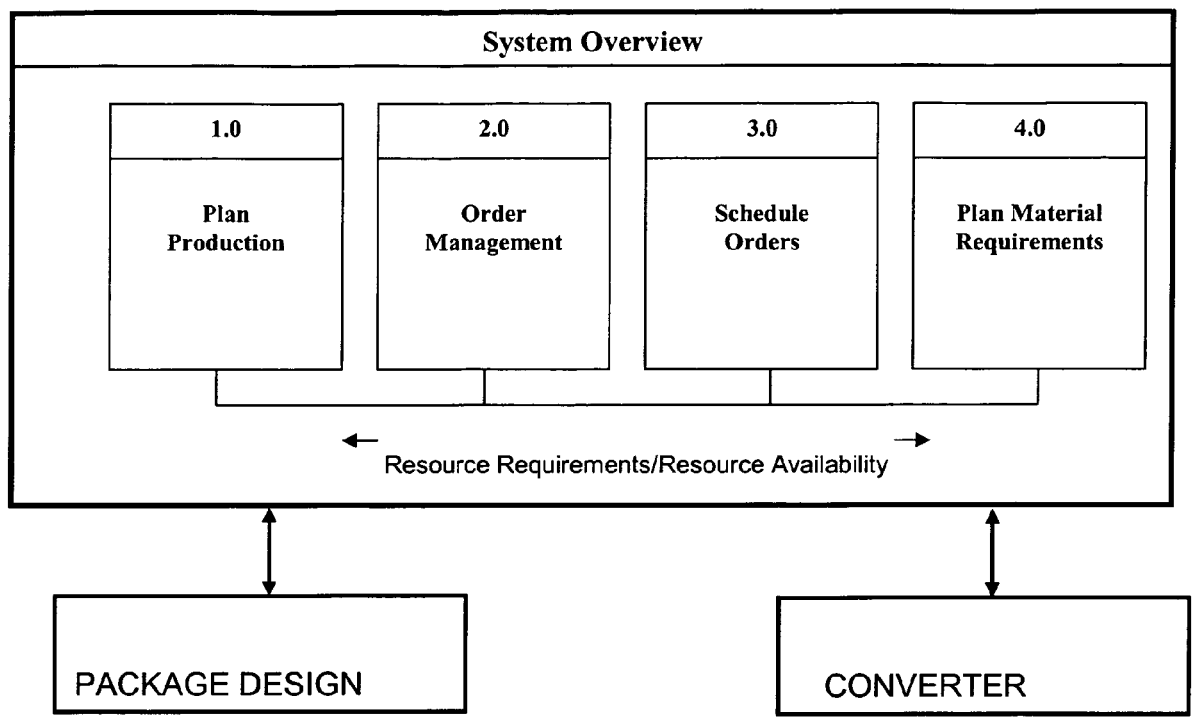
FIG. 1 is a flow diagram setting forth a system overview of the processes of the current invention. See also paragraphs [00116]-[00119] of the specification.

The present invention provides a method for reducing lead-time and waste in the packaging supply chain together with an integrated computerized platform for order placement, production planning, scheduling, and ensuring that the materials required to produce the ordered packages are available to support the schedule. The phrase "packaging" means containers for storing, shipping, and selling goods and products as well as labels for use in connection with such containers. In order to operate efficiently and economically, the method of the present invention comprises a computer system. Accordingly, the present invention comprises both the method and an enabling computer system.

In this application, Packaging Design means the graphic design (image) displayed on a package. Packaging Product Design means the combination of the Packaging Design with the structure of the package, which includes at least some of the materials used to make the package. Packaging Item means the combination of the Packaging Product Design (the design of a single package) combined with at least one of following categories of information: production configuration (multiple packages produced together), a specific bill of materials, and routing (the sequence of machines used to produce the item). A skeleton of the item may be created by the end user (end user item), and completed by the converter (converter item). Order means the combination of a packaging item with a specified delivery date and a specified quantity.

Compared to current methods for operating the packaging supply chain, the present invention comprises the following innovations which allow the invention to accomplish its objective of reducing lead-time and waste.

Complete Information—The first requirement for improving the performance of the packaging supply chain is to eliminate the errors caused by planning with incomplete information. Today, much information, especially information about the image, is generally unavailable to planners. The present invention has the capacity to make both the image itself, and critical scheduling information extracted from the image (scheduling metadata) available to planners at all levels in the supply chain.

Sales and Production Items—From the viewpoint of the supply chain, there are two equally important views of every packaging item. First, the item is a sales unit, a single package to be filled and sold. Simultaneously, the package is a production unit, for example, a sheet of cardboard with four cardboard boxes printed on it. Up to now, planning systems have emphasized the production unit, with the result planning across multiple suppliers (with often different sizes of equipment) is nearly impossible. The present invention solves this problem by introducing two items—an end user item corresponding to the sales unit, and a converter item (for each converter) corresponding to that converter's production unit.

Networked Environment—A typical packaging supply chain consists of six to ten widely separated companies, and chains with up to 50 members are not uncommon. By utilizing computer networks, and particularly by exploiting the ease and availability of the internet, the members of the supply chain can shrink the apparent distance between companies and greatly reduce distance related delays. The potential of a networked environment to speed up the supply chain depends on the quality of the information being communicated over the network (otherwise, the only effect of networking the supply chain is to speed up the rate at which mistakes are made). The present invention solves the problem of data quality by providing complete information and meaningful item definitions. It then goes on to introduce a suite of business processes that fully exploit the potential of a networked environment to slash lead-times.

Reliable Lead-times—An effective networked environment is an important lead-time reduction component. However, speed without reliability will not result in a breakthrough (if a process is sometimes fast and sometimes slow with no apparent reason for the difference, a prudent business will plan as if the process will be slow all of the time). The present invention introduces a set of integrated business methods and systems tools which maximize the likelihood that promised lead-times will be met, thus allowing the supply chain to take advantage of the reduced lead-times in all phases of its operation.

Schedule Optimization—Short, reliable lead-times allow companies in the packaging supply chain to wait longer before committing to packaging decisions. The result of waiting longer is that there is less opportunity for circumstances to change or, equivalently, more schedule stability. In this environment, a powerful, easy to use scheduling tool coupled with the availability of complete information can greatly decrease waste in the supply chain. Accordingly, the present invention provides such a tool, together with the business methods required to enable its effective use.

Networking the Packaging Environment

While there are many members involved in the packaging industry supply chain, the principal members of the supply chain are the end user, the converter, and suppliers of goods and services necessary for the production of packages. The end user uses the packages to store ship, promote, and/or sell its products. Generally, it is the end user that places orders for the creation and delivery of packaging. Generally, the converter is responsible for production of finished packaging ready to be filled or finished labels ready to be applied. The converter coordinates the printing of a package design selected by the end user onto a suitable substrate. The converter often actually performs the service of printing the package design and further processing the printed substrate to produce finished packaging materials for the end user. The third general category of members in the packaging supply chain are the suppliers of goods and services required by the converter to produce packaging. These suppliers supply materials such as plastic film from which the packages are made and services such as cylinder engraving.

The present invention provides a method and computer system for networking and integrating the packaging supply chain. The method and computer system of the present invention are particularly suitable for use in connection with the internet. The internet comprises a vast number of computers and computer networks that are interconnected through communication links. The interconnected computers exchange information using various services, such as electronic mail, Gopher, and the World Wide Web ("www"). The www service allows a server computer system (i.e., web server or web site) to send graphical web pages of information to a remote computer system. The remote computer system can then display the web pages. Each resource (e.g., computer or web page) of the www is uniquely identifiable by a Uniform Resource Locator ("URL"). To view a specific web page, a computer system specifies the URL for that web page in a request (e.g., a HyperText Transfer Protocol ("HTTP") request). The request is forwarded to the web server that supports that web page. When that web server receives the request, it sends that web page to the remote computer system. When the remote computer system receives that web page, it typically displays the Web page using a browser. A browser is a special-purpose application program that effects the requesting of web pages and the displaying of web pages. Web pages can be defined using Hyper Text Markup Language ("HTML") or Extended Markup Language ("XML"). HTML provides a standard set of tags that define how a web page is to be displayed. When a user indicates to the browser to display a web page, the browser sends a request to the server computer system to transfer to the client computer system an HTML document that defines the web page. When the requested HTML document is received by the client computer system, the browser displays the web page as defined by the HTML document. The HTML document contains various tags that control the displaying of text, graphics, controls, and other features. The HTML document may contain URLs of other web pages available on that server computer system or other server computer systems.

The system of the present invention allows the various members of the packaging supply chain to access the system though a system homepage appropriate to the member's position in the supply chain displayed on the monitor of the member's computer connected to the system of the present invention thorough the internet. Each member can log into the system through this homepage using a secure ID. The system of the present invention may also connect each member to the system through a communications link such as dedicated wide area network, a frame relay network, a local area network, or any other commercial networking technology. Each member having connection to the system of the present invention is capable of transmitting to and receiving data from the system useful to the member to fulfill its role in the packaging supply chain.

The Method of the Present Invention

The starting point for the method is a design which has been developed to the point of being a digital contract proof (e.g. a Portable Data Format file commonly referred to as a "PDF" file or other suitable file format) and an end user requirement for packaging carrying this design. From this starting point, the invention enables one or more of the following methods: distributed item creation, order placement, capacity planning and order acknowledgement, material requirements planning, procurement of raw materials and services, scheduling, order status tracking, and access control.

Distributed item creation comprises a method for accessing images, algorithms to calculate item data (e.g. percent ink coverage), and a collaborative item creation process using this data which comprises end user creation of the item skeleton (image and basic package structure) and converter addition of item details (bill of materials, plate/cylinder identification numbers, routings, etc.)

Capacity planning and order acknowledgement is a method for capacity planning (sales & operations planning, master production scheduling), capacity checking (slotting orders to production lines for available to promise ("ATP"), and allocation checks), and material availability checking.

Procurement of raw materials and services comprises a method for providing suppliers with immediate notification of urgent material/service requirements directly out of the material requirements planning process; and mechanisms for transferring requirements to purchasing systems, ordering materials/services from suppliers, and tracking the status of materials and services on order.

Scheduling comprises a method for scheduling converting operations (press, laminator, metallizers, coaters, slitters, etc.) using complete information; accessing image files and algorithms for extracting scheduling information from these files (e.g. process print degree of difficulty, degree of bounce associated with the color separated design, etc.); intuitive (drag and drop) scheduling methods for increased productivity; maintaining multiple "what if" scenarios; and scheduling methods that are designed for compatibility with the ATP/allocation process (i.e. methods to insure schedules can be developed to fulfill the commitments made in the ATP/allocation process).

Access control and security management methods comprise having a defined owner for each data element with the owner having the ability to grant access to other users (e.g. a converter can grant an end user access to the converters order status information); and security management that prevents access to information not owned or authorized for access by the inquiring party.

The Computer System of the Present Invention

The computer system for integrating the flexible packaging supply chain comprises a computer system accessible for networked interactive communications, which may include on-line communications using the internet, with users which comprises a first memory area for storing functionality and data for end user members of the supply chain; a second memory area for storing functionality and data for converter members of the supply chain; and a third memory area for storing functionality and data for other members of the supply chain (including but not limited to film suppliers, cylinder suppliers, ink suppliers, adhesive suppliers, etc.).

In one embodiment of the system, the computer system is programmed to perform the steps of (1) providing an end user with networked access to an end user homepage, with the homepage linking to the first memory area, and providing the end user with the ability to create an item, place orders for the item, receive confirmation of promise date, and track order status; (2) providing a converter with networked access to a converter homepage, with the homepage linking to the second memory area; and providing the converter with the ability to receive orders, add item details, plan production, check "available to promise" against these plans, schedule orders for production, plan material requirements, initiate orders for material, track production, and insure production meets promised delivery dates; and (3) providing other users with networked access to other user homepage(s), with the homepage(s) linking to a third memory area, and providing the ability to send and receive information concerning orders, forecasts, schedules, etc. as required to synchronize and integrate the supply chain.

In another embodiment of the system, the computer system is further programmed to support distributed item creation in a collaborative planning environment comprising: (1) tools for collaborative item creation (facilities for creating and storing elements of item information—for example structure, material descriptions, multilevel bills of materials (e.g. structure, ink, routings, etc.); (2) tools to access images and extract metadata (information extracted from the digital image which is essential to prepare production plans and schedules e.g. difficulty of print; specific colors used to print image; percent coverage by color; etc.) and (3) a collaborative item creation process using these tools: end user creation of the item skeleton (image and basic package structure); converter addition of item details (bills of materials, plate/cylinder identification numbers, routings, etc.).

In another embodiment of the system, the computer system is further programmed to support electronic placement of orders by the end user and electronic confirmation of the original date and quantity (or proposal of a new date and quantity) by the converter.

In another embodiment of the system of the present invention, the computer system is further programmed to support capacity planning and order acknowledgement in a collaborative planning environment comprising: (1) capacity planning tools (sales & operations planning, master production scheduling), capacity checking tools (available to promise, allocation), and material availability checking tools; (2) a capacity planning & management process enabled by these tools; (3) an acknowledgement process enabled by these tools; (4) mechanisms for capturing inventory and order status; (5) mechanisms for slotting orders to production lines; and (6) mechanisms for dynamically real-locating material among jobs.

In one embodiment of the system, the computer system is further programmed to support material requirements planning in a collaborative planning environment.

In another embodiment of the system, the computer system is further programmed to support procurement of materials and services in a collaborative planning environment comprising: tools for providing suppliers with immediate notification of urgent material/service requirements directly out of the material requirements planning process; and mechanisms for transferring requirements to purchase systems, ordering materials/services from suppliers, and tracking the status of materials and services on order.

In another embodiment of the system, the computer system is further programmed to support line scheduling enhanced by the availability of image information in a collaborative planning environment comprising: (1) scheduling tools for converting operations (printing, laminating, metallizing, coating, slitting, etc.); (2) access to image files and algorithms utilizing scheduling information extracted from these files (e.g. process print degree of difficulty, degree of bounce associated with the color separated design, etc.); (3) intuitive (drag and drop) scheduling based on complete information; (4) ability to maintain multiple "what if" scenarios; (5) a scheduling process enabled by these tools; and (6) scheduling process and tools are designed for compatibility with ATP/allocation processes (i.e. these processes and tools ensure that schedules can be developed to fulfill the commitments made in ATP/allocation).

In another embodiment of the system, the computer system comprises order status tracking (an internet site providing the capability to track the status of packaging orders).

In another embodiment of the system, the computer system comprises access control and security management comprising: defined owner for each data element with the owner having the ability to grant access to other users (e.g. a converter can grant an end user access to the converters order status information); and security management that prevents access to information not owned or authorized for access by the inquiring party.

In another embodiment of the system, the computer system comprises output compatibility (a system designed to interface with all known digital output technologies—monitors, cylinder/plate engravers, ink jet printers, toner fusion printers, thermal printers, etc.).

Image Metadata

Production planning and scheduling systems depend on complete information about the jobs being scheduled in order to prepare high quality plans and schedules. In the case of packaging, much of this information is related to the demands that the graphics on the package will place on the printing operation. Today, in virtually all cases, this information is not readily available to the production planner or scheduler. As a result, production plans and schedules are often flawed, sometimes to the point of being completely unusable.

The missing information is data about the image (graphic design). Generically, data about an image is called "metadata". In order for packaging production planning and scheduling systems to operate with peak efficiency and effectiveness, a new class of metadata must be created: metadata for item creation, production planning, and scheduling. The present invention satisfies this requirement by defining specific metadata elements, providing algorithms to extract these elements from an image, and incorporating the use of these elements into its enabling computer system. This section describes the individual elements of metadata identified and the algorithms for extracting each element. The more metadata elements created and utilized, the more effective the method and system of the present invention will be. However, it is understood that one or any combination of the individual metadata elements may be useful in the present invention.

1. Printing Colors—Description. Once a digital contract proof (PDF file or other suitable format) has been approved, the next step is to color separate this file. The result of this step is to create one color separated file (monochrome TIFF or other suitable format) for each color to be printed on the press. This algorithm retrieves the colors used to print the job and stores them (together with the RGB values required to display them on a monitor) in the metadata file.

Printing Colors—Algorithm. For each color separated file, retrieve and store the color name (e.g. Kinder Orange) or color number (e.g. Pantone color number) of the ink to be used in the associated press station in the metadata file. Look up and store the corresponding RGB value (three byte representation of the color as displayed on a monitor) in the metadata file. If the sequence in which these colors will be printed on the press is known, store this information in press station sequence (i.e. Station 1 Color Name or Color Number, Station 1 RGB Value, Station 2 Color Name or Color Number, Station 2 RGB Value, etc.).

2. Ink Coverage—Description. The amount of ink used to print an image can be calculated from the ink's coating weight and the percent of the image which will be covered by the ink. This algorithm calculates the percent ink coverage for each color and stores the result in the metadata file.

Ink Coverage—Algorithm. For each color separated file, calculate percent coverage as follows:

> Image Coverage=Sum of the grayscale values for each byte in the image
>
> Total Coverage=Number of bytes in the image*Max grayscale value
>
> Percent Coverage=(Image Coverage/Total Coverage) *100 and store the resulting percentages in the metadata file in the same order as the color names.

If dot gain emulation software is available, the accuracy of this estimate can be improved by preprocessing the image to emulate dot gain on the target press before calculating Percent Coverage using the algorithm shown above.

3. Process Difficulty—Description. Packages contain a variety of image types. Simple line art (solid color images) can be printed by even the oldest, most poorly maintained presses. High quality photorealistic images, on the other hand, are printed using 4-color process and require high quality, well maintained machines to render an acceptable image. Vignettes (images that fade continuously from highly saturated color to white) are the most difficult images to print using conventional printing techniques since a continuous reduction in dot size is the most demanding test of press capability. This algorithm examines an image file to determine the degree of process difficulty associated with the printing the image.

Process Difficulty—Algorithm. Analyze the CMYK image file (PDF or other suitable format) as follows:

If 100% of image has only black bytes (line art) or consists of vector art at constant grayscale, then process difficulty equals "1".

If 100% of image has only one byte (line art) or two bytes (duotone) "on", but some of the image has two bytes on, then process difficulty equals "2".

If some of the image has three bytes (3-color process) or four bytes (4-color process) "on", then process difficulty equals "3".

If 5% or more of the image is a monotone decreasing grayscale from some positive value to zero (vignette), then process difficulty equals "4".

Finally, store the maximum resulting process difficulty level (1, 2, 3, or 4) in the metadata file.

4. Bounce—Description. When a color separated image is rendered as a flexographic or letterpress plate, the plate will consist of raised areas where there is printing and blank areas where no printing exists. During the printing process, the raised areas support the plate against the impression cylinder. If a blank area extends across the entire width of the plate, the plate will droop toward the cylinder, and will tend to bounce when the next raised area comes into contact with cylinder as the plate continues its revolution. Presses differ considerably in their ability to maintain print quality when printing such an image. This algorithm examines the image for the existence of blank areas across the entire image. The resulting measure can than be correlated with the capabilities of individual presses to insure that jobs are scheduled on lines that are capable of maintaining print quality when printing the image.

Bounce—Algorithm. For each color separated file, calculate void area as follows:

Retrieve the Minimum Void Width ($V_m$) corresponding to the target press. (In the absence of a press specific $V_m$, use the default $V_m$ value).

Beginning at the start of the file, extract a full width subset of the file $V_m$ units high. Sum of the grayscale values for each byte in the subset.

If the sum of the grayscale values=0 (or is <a press specific threshold value), then write the position of the first byte in the subset to the metadata file.

Index down one line, and repeat the process until the full width subset contains the last byte of the file. When the last byte first appears in the subset, process this subset and stop.

The metadata file now contains the start position of each segment of the file that has the potential to cause a bounce problem. Further process this file to combine overlapping void areas into a set of discrete voided bars. The height of the largest void bar is then compared to an empirically derived table which links maximum void height ($H_{vmax}$) to image quality when printed on the target press. If the image is printed more than one across the plate, the preceding algorithm is applied to the fully stepped and repeated image. Alternatively, the positions of the voided areas can be passed to an optimization algorithm which offsets the images in such a way as to minimize $H_{vmax}$ for the stepped and repeated image. The resultant $H_{vmax}$ can then be taken from the optimizing algorithm. Store $H_{vmax}$ in the metadata file.

5. Image Dimension—Description. Packages are often printed in multiples of the finished package (e.g. four boxes printed on a single sheet of cardboard stock, which is subsequently cut and folded to make four individual boxes). In order to choose the most efficient press for printing a package (or label), the dimensions of the image are required.

Image Dimensions—Algorithm. Retrieve image width and image length (cutoff) from the image file. Store these values in the metadata file. If the converter has slotted the item to a particular press, retrieve the number of images across and down (around) the plate or cylinder. Store these values in the metadata file.

Invention Process Overview

FIG. 1 provides an overview of the processes involved in the method of the present invention. Referring to this figure, the Production Planning Process (Process 1.0) of the present invention is capable of operating on two time horizons, long range and near term planning. Sales & Operations Planning ("S&OP") combines forecasts of demand and production capacity to provide a long range view of production line loading, highlighting supply and demand imbalances. This long range view may be 12 months or more. Master Production Scheduling ("MPS") fine tunes the near term S&OP view over short time periods such as on a week by week basis over the next 6-8 weeks. As part of the MPS process, the total capacity of the system is divided in capacity buckets (e.g. available capacity by line, by week), which MPS in turn maintains. The capacity remaining in these buckets is the basis for checking orders to insure production capacity available to produce the ordered packages. This process in depicted in Process 2.0 of FIG. 1.

The Order Management Process (Process 2.0) of the present invention is a shared activity managed jointly by the end user and the converter. The Order Management process begins with item creation by the end user (i.e., linking digital data associated with a package image with a structural specification for the package to create a packaging stock keeping unit or other unique designation for a package design). Once the item has been created, the end user can place an order by combining the item with quantity and date requirements. Upon receiving an order from the end user, the converter adds converter specific data to the item (e.g.

printing cylinder numbers, ink specifications, etc.) if required, and checks for the availability of materials and line time to produce the order. If the order is a repeat order for an existing item, the entire process can be performed: by the present invention automatically. Once accepted by the converter, the end user receives an acknowledgment of the converter's promised delivery date.

The Schedule Order Process (Process 3.0) of the present invention stores orders acknowledged by the system for subsequent scheduling using decision support tools. These tools allow the converter to prepare finite schedules (individual jobs sequenced for production on a particular line) for presses, laminators, slitters, and other items of converting equipment.

The Material Requirements Planning ("MRP") Process (Process 4.0) of the present invention calculates requirements for printing cylinders, substrates, inks, and adhesives based upon acknowledged orders. As orders are scheduled, the timing of material requirements is further refined. Time phased requirements are compared to quantities available in stock and quantities on order to generate net requirements for purchasing.

Figure 2:
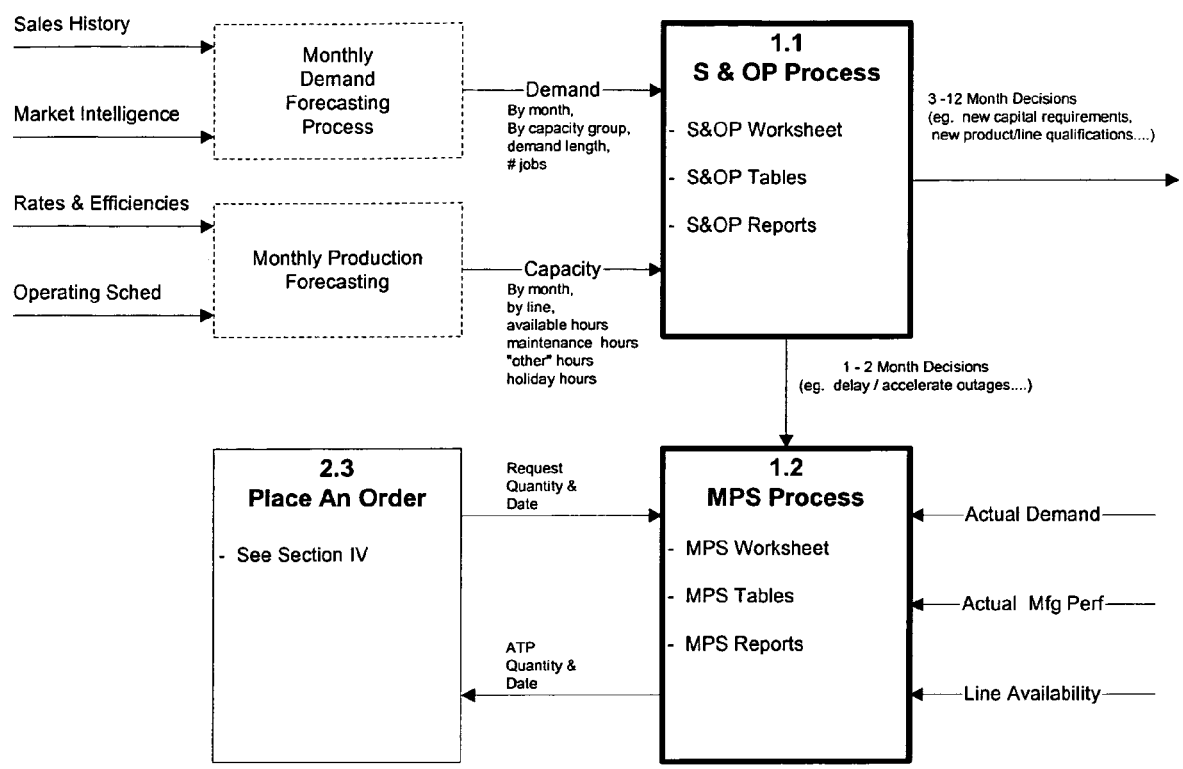
FIG. 2 is a flow diagram setting forth an overview of the Production Planning and Order Management processes of the current invention. See also paragraphs [00120]-[00125] of the specification.

FIG. 2 shows how the Production Planning and Order Management Processes described above work together to maximize profitability for the business operating the assets and simultaneously maximize reliability for the customer receiving the product.

Production planning in the present invention begins with an analysis of business options over an upcoming time period such as the next 12 months as depicted in this figure. The first step in this process is the monthly S&OP cycle. By modeling manufacturing operations using forecast demand and forecast capacity, the S&OP process loads production lines (e.g. presses, laminators, etc.) and highlights imbalances between supply and demand for resolution. This process has two outcomes: (1) long range decisions that affect the operation of the business in the 3-12 month timeframe (e.g. timing of major capital outages, planning for the ramp-up of new businesses, planning for discontinuation of existing business, etc.), and (2) short range decisions affecting operations in the 1-2 month timeframe (e.g. maintenance outages, inventory builds and draws, and execution of long range decisions whose implementation date has reached the 1-2 month time horizon). These short range S&OP decisions are a primary input to the second production planning process, Master Production Scheduling (MPS). MPS fine tunes these near term S&OP decisions for execution on a week by week basis over the next 6-8 weeks. In order to accomplish this goal, MPS evaluates near term S&OP decisions in the context of actual demand and actual capacity available. The results are used to time the execution of events (e.g. an outage), and to control the flow of orders (through the Available To Promise (ATP) functionality discussed hereinafter). S&OP and MPS both depend on computer models to forecast the impact of alternative courses of action. These models, in turn, depend on a number of parameters which are input and maintained through a series of tables (e.g. production line characteristics, the forecasts described below, and other data required to support the models).

To use the S&OP process, a user prepared demand forecast is entered as digital data in an electronic storage area of the system in accordance with the present invention. The forecast can be prepared in any way that fits the business—ranging from a simple sales estimate, to a statistical forecast adjusted for market intelligence.

Similarly, a user prepared production forecast is entered as digital data in an electronic storage area of the system in accordance with the present invention. A production forecast typically includes information such as output rates by product and line, material efficiencies by product and line, and available production hours by line.

Once the demand and production forecasts have been loaded the S&OP model is run to support the long and short range decisions described above.

One embodiment of the present invention also provides an interface between the MPS functionality and the ATP check. The MPS functionality maintains capacity buckets (e.g. available capacity by line and week). As each order is taken, an ATP check determines if the targeted bucket can accept the order without exceeding its available capacity.

The process described above will be described in more detail hereinafter.

Invention Functionalities Detail

In this section, we provide a detailed description of the method and computer system of the present invention. In general, the method is represented by a process diagram identified as a number (e.g. FIG. 3). A computer system to enable this method is then described in figures beginning with the method number and suffixed with a letter (e.g. FIGS. 3A-3G).

Figure 3:
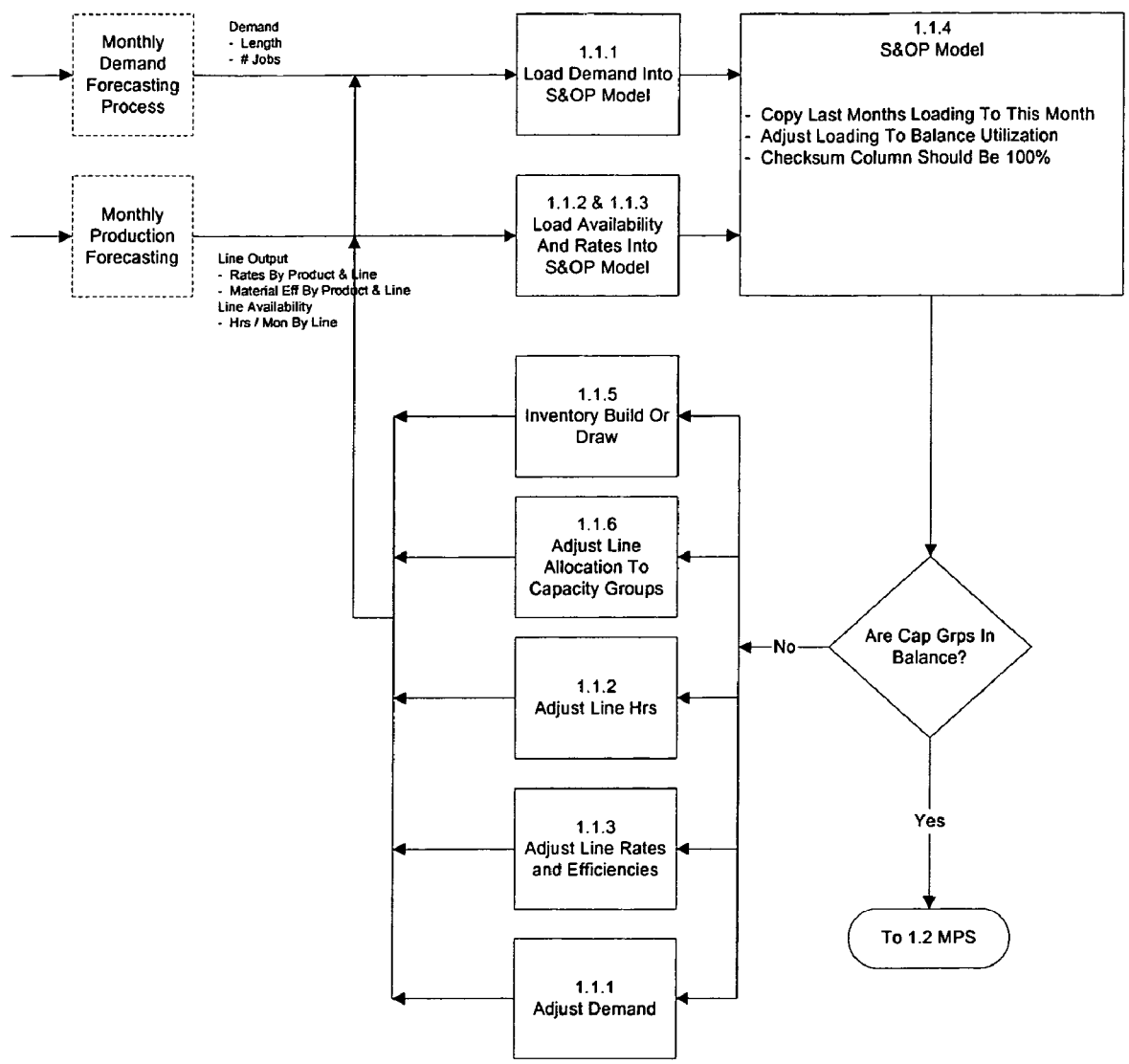
FIG. 3 is a flow diagram setting forth an overview of the Sales and Operation processes of the current invention. See also paragraphs [00127]-[00135] of the specification.

FIG. 3 depicts the S&OP process in accordance with the present invention. While FIG. 3 and the accompanying description refer to S&OP in the context of a month, it is understood that the S&OP process in accordance with the present invention may be applied to any time interval selected by the user. Similarly, it is within the scope of the present invention to practice the S&OP process, and the other processes of the present invention, without practicing all of the process steps depicted.

Figure 3A:
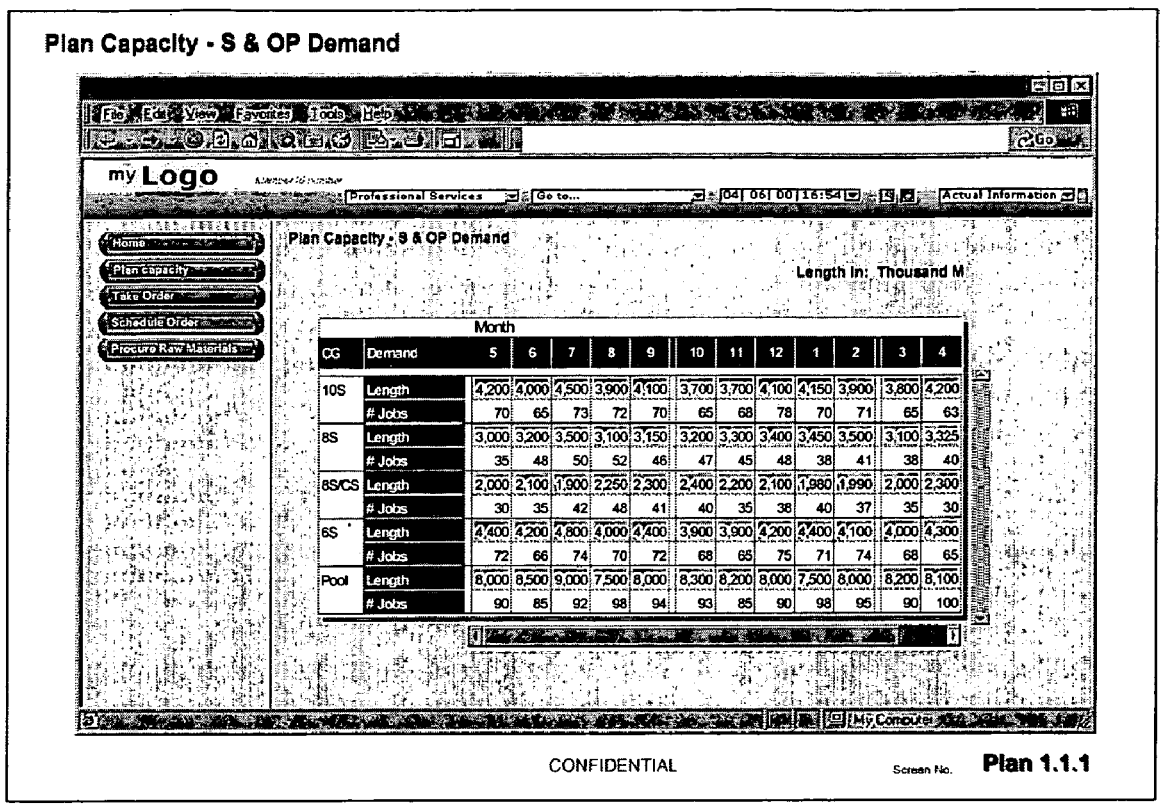
FIG. 3A is an exemplary monitor view of a Demand Forecast Table of the Sales and Operation processes of the current invention. See also paragraph [00129] of the specification.
Figure 3B:
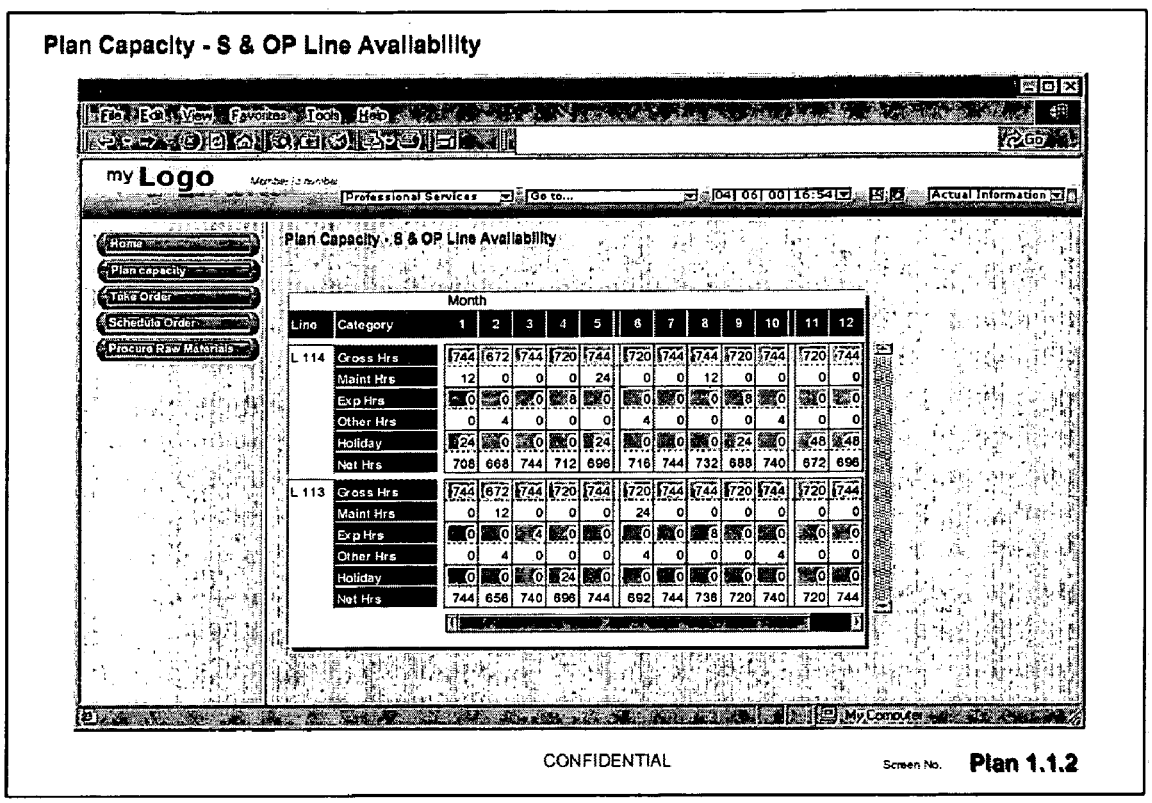
FIG. 3B is an exemplary monitor view of a Line Availability Table of the Sales and Operation processes of the current invention. See also paragraph [00130] of the specification.
Figure 3C:
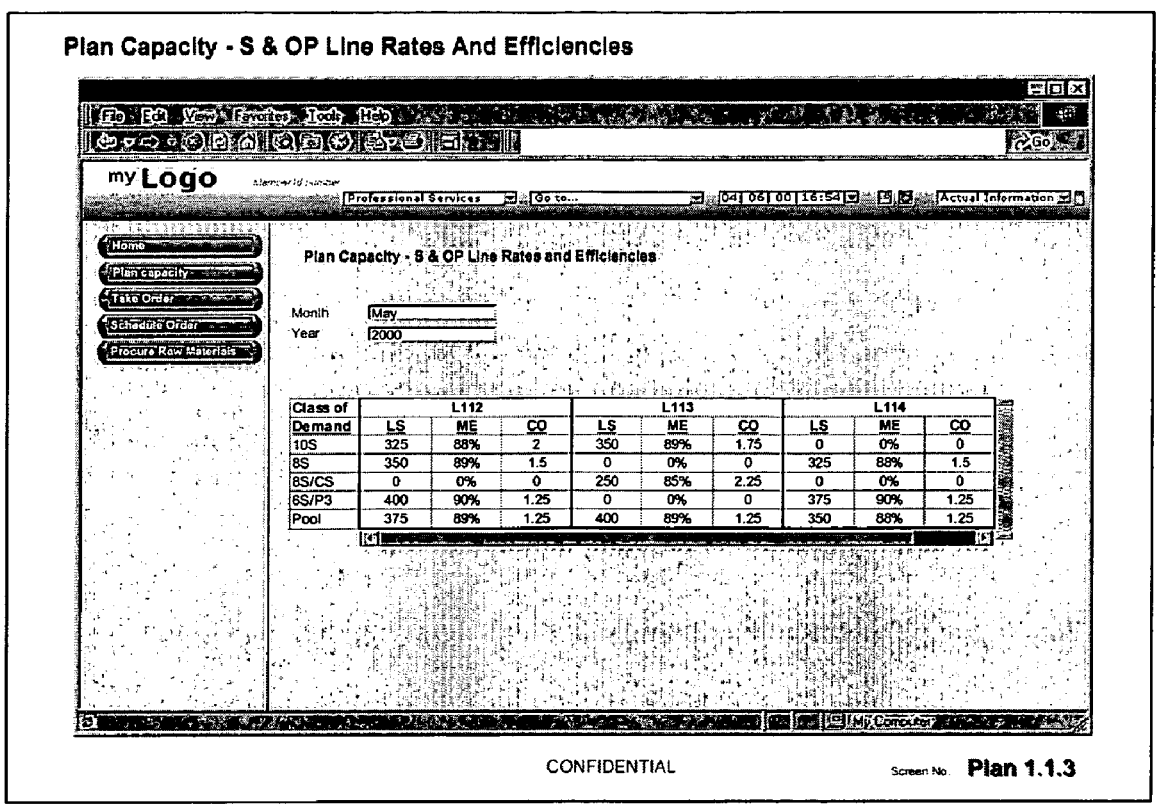
FIG. 3C is an exemplary monitor view of a Lines Rates and Efficiencies Table of the Sales and Operation processes of the current invention. See also paragraph [00131] of the specification.

At the beginning of each monthly cycle or other chosen time interval cycle, the user loads digital demand data into the S&OP model by updating the Demand Forecast Table as depicted in process step 1.1.1 of FIG. 3. FIG. 3A shows an exemplary monitor view of this functionality, which is achieved according to the following computer programming specifications:

Initial Processing
Lookup all records on Table 1.1.1 using converter_no from login
Setup display to include 12 months of data starting with the current month
Create any records that do not exist and fill with zero's
Lookup converter demand length unit of measure on the converter_db using converter_no
User Workflow & Resultant Processing
Typical
Place cursor on the first capacity group (row) of the month (column) for which you want to enter data
Enter demand length for the capacity group
<Enter> or <Tab> to the next field and enter value
Continue down the column or across row entering length and # of jobs for each capacity group
Exceptional
Point and click to select individual cell
Change value in cell
Notes
The user may elect to enter data by row or by column, screen operation should allow both using standard navigation: <enter> moves down a cell, <tab> moves over a cell
Screen should be horizontally and vertically scrollable The user may elect to enter data by row or by column, screen operation should allow both using standard navigation: <enter> moves down a cell, <tab> moves over a cell Screen should be horizontally and vertically scrollable The user of the system may update the production line availability data to reflect periods when lines will not be available for production due to holidays, outages, or other sources of scheduled downtime as depicted in process step 1.1.2 of FIG. 3. FIG. 3B shows a monitor view of this functionality, which is achieved according to the following computer programming specifications:

Initial Processing
  Lookup all records on Table 1.1.2 using converter_no from login
  Setup display to include 12 months of data starting with the current month
  Lookup gross hours and holiday hours in the month_db using month and year
  Create any records that do not exist and fill Maintenance hours, Exp hours, Other Hrs, with zero's
  Calculate Net Hrs=Gross Hrs−Maint Hrs−Exp Hrs−Other Hrs−Holiday Hrs
User Workflow & Resultant Processing
Typical
  Place cursor on the Maint Hrs for the first production line (row) of the month (column) for which you want to enter data
  Enter Maint Hrs <enter>
  Cursor moves to the next field in this column (Exp Hrs)
  Enter Exp Hrs <enter>
  Cursor moves to the next field in this column (Other Hrs)
  Enter Other Hrs <enter>
  Calculate Net Hrs=Gross Hrs−Maint Hrs−Exp Hrs−Other Hrs−Holiday Hrs
  Continue down column to next line
Exceptional
  Point and click to select individual cell
  Change value in cell
Notes
  The user may elect to enter data by row or by column, screen operation should allow both using standard navigation: <enter> moves down a cell, <tab> moves over a cell
  Screen should be horizontally and vertically scrollable The user completes the capacity forecast by loading output rates and material efficiencies for each product line combination which will be considered in loading the system as depicted in process step 1.1.3 of FIG. 3. FIG. 3C shows an exemplary monitor view of this functionality, which is achieved according to the following computer programming specifications:

Initial Processing
  Default month and year to current month and year
  Lookup all records on Table 1.1.3 using converter_no from login and current month and year
User Workflow & Resultant Processing
Typical
  Enter month, enter year
  Place cursor on cell you want to change
  Enter new data
Notes
  The user may elect to enter data by row or by column, screen operation should allow both using standard navigation: <enter> moves down a cell, <tab> moves over a cell
  Screen should be horizontally and vertically scrollable
  "LS"=Line Speed, "ME"=Material Efficiency, "CO"=Changeover Downtime (Average Per Job)

Figure 3D:
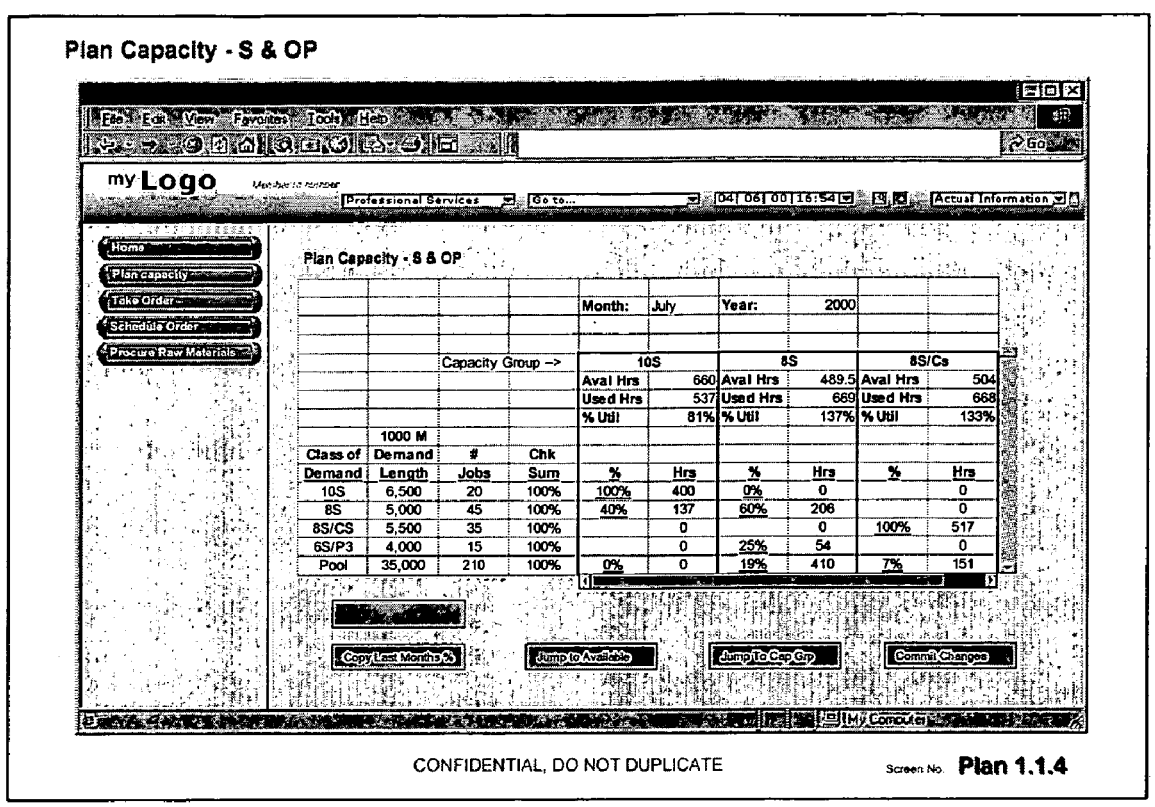
FIG. 3D is an exemplary monitor view of line loading utilizations of the Sales and Operation processes of the current invention. See also paragraph [00132] of the specification.
Figure 3F:
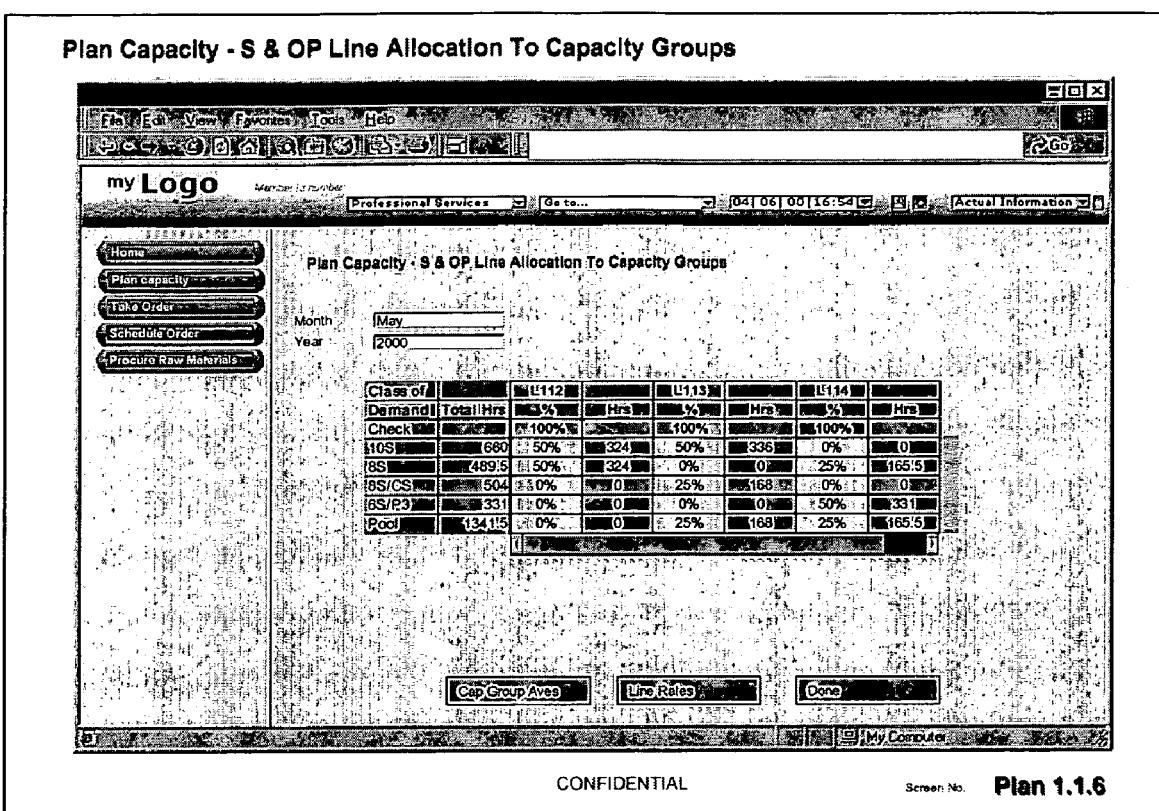
FIG. 3F is an exemplary monitor view of a Capacity Group Assignment Table of the Sales and Operation processes of the current invention. See also paragraph [00134] of the specification.
Figure 3G:
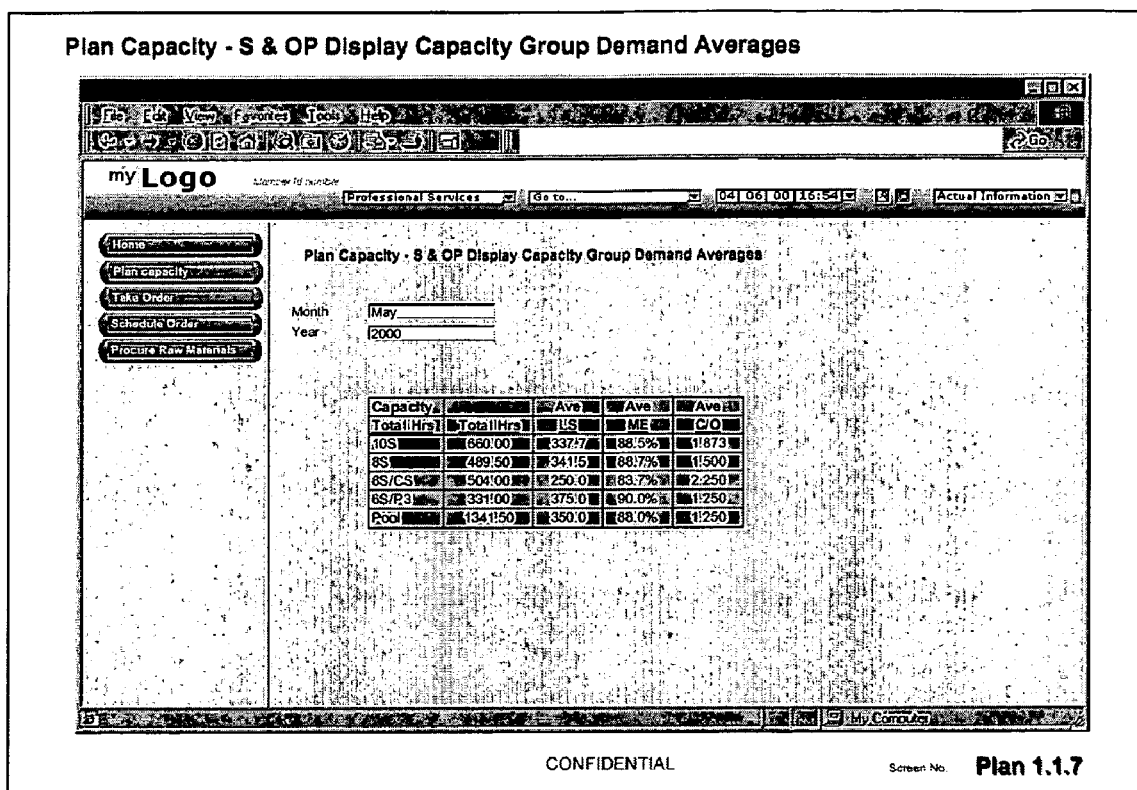
FIG. 3G is an exemplary monitor view of a Capacity Group Demand Averages Table of the Sales and Operation processes of the current invention. See also paragraph [00135] of the specification.

As depicted in process step 1.1.4 of FIG. 3, with demand and capacity updated, the user runs the S&OP model. Initially, the model assigns demand to production units based on the final loading used in the previous S&OP cycle. The user reviews the resulting line utilizations and attempts to resolve imbalances by making adjustments in line loading. Imbalances which cannot be resolved by moving demand between lines require changes in assumptions (i.e. by changing data in the tables holding these assumptions). FIG. 3D shows an exemplary monitor view of this functionality, which is achieved according to the following computer programming specifications:

Initial Processing
  Lookup Average Material Efficiency (ME), Line Speed (LS) and Changover Time (CO) for each class of demand in Table 1.1.7 using Converter_no, Month, Year, Class of Demand
  Lookup and display percent demand in table 1.1.4 using Converter_no, Month, Year, Capacity Group
  Lookup demand and # of jobs in table 1.1.1 using Converter_no, Month and Year
  Lookup inventory draw and build from Table 1.1.5 using converter_no, month, year
  Use inventory build or draw to adjust demand from Table 1.1.1 lookup. Adjusted demand=demand (table 1.1.1)+demand build (table 1.1.5)−demand draw (table 1.1.5)
  Display adjusted demand and # of jobs. Demand=Demand (table 1.1.1)+Demand build (table 1.1.5)−Demand draw (table 1.1.5)
  Lookup and display Avail Hrs in Table 1.1.6 using Month, Year and Capacity Group
  Calc and display Hrs=(D*1000*P/(ME*LS*60))+(#Jobs*P*CO) (D=Demand, P=Percent)
  Calc and display Used Hrs=Sum of Hrs In Each Capacity Group
  Calc and display Utilization=Demand/Capacity
User Workflow & Resultant Processing
Typical
  Copy forward percentages from last month
  Adjust percent demand to balance capacity
  Commit Changes
Notes
  Screen should be horizontally and vertically scrollable
  Action button to copy last months %'s
  Screen should have easy links back to Availability Detail, and Capacity Group Data
  Screen should have a commit button One data input area in which assumptions can be changed is the Inventory Adjustment Table depicted in process step 1.1.5 of FIG. 3. This process allows the user to move capacity from periods where the system is underutilized to periods where the system is oversold by building inventory in the former periods and consuming it in the later. FIG. 3E shows an exemplary monitor view of this functionality, which is achieved according to the following computer programming specifications:

Initial Processing
  Set month and year to current month and year unless access from 1.1.4. If access from 1.1.4 set month and year to month and year used at the time of the call from 1.1.4
  Lookup all records on Table 1.1.7 using converter_no from login and current month and year for all capacity groups Lookup all records on Table 1.1.5 using converter_no from login and current month and year
User Workflow & Resultant Processing
Typical
    Enter month, enter year
    Place cursor on cell you want to change
    Enter new data
    System calculates length Length=(time*60)*Average LS for this capacity group
Notes:
None Another data input step in which assumptions can be changed is the Capacity Group Assignment Table depicted as process step 1.1.6 of FIG. 3. The S&OP model loads demand onto capacity groups (i.e. virtual lines composed of hours from physical lines having similar manufacturing capabilities). This process allows the user to shift hours from under loaded capacity groups to overloaded ones in order to resolve supply imbalances. FIG. 3F shows an exemplary monitor view of this functionality, which is achieved according to the following computer programming specifications:
Initial Processing
Default and display month and year to current month and year
For converter-no from login and current month and year, lookup:
    Table 1.1.2 (available hours for each line)
    Table 1.1.3 (LS, ME, CO by line by capacity group)
    Table 1.1.6 (all existing entries)
    Table 1.1.7 (Total Hrs by class of demand)
Display all Table 1.1.6 records
Display Total Hrs for each class of demand (from Table 1.1.7)
User Workflow & Resultant Processing
Typical
    Enter month, enter year
    Place cursor on the % cell you want to change
    Enter new data
    System will calculate:
        Hrs=% entered*available hours for that line
        Check=column sum of % for that line
        Total Hrs (Table 1.1.7)=Row sum of hours for each capacity group
    When all changes have been entered, click "DONE"
    The system checks to insure all lines are 100% allocated. If not, hard error
    The system generates a table of LS, ME, CO all of the average values for table 1.1.7
        LS Average=$\Sigma$All lines (line Hrs for CGD/Total Hrs for CGD)*Line LS for CGD
        ME Average=$\Sigma$All lines (line Hrs for CGD/Total Hrs for CGD)*Line ME for CGD
        CO Average=$\Sigma$All lines (line Hrs for CGD/Total Hrs for CGD)*Line CO for CGD
    Save Table 1.1.7 value
Exceptional
    Point and click to the % cell to be changed
    Change value in cell
Notes
The user may elect to enter data by row or by column, screen operation should allow both using standard navigation: <enter> moves down a cell, <tab> moves over a cell
Screen should be horizontally and vertically scrollable
When capacity groups are utilized, production rates and efficiencies for each capacity group must be created by averaging the rates and efficiencies of the lines comprising the capacity groups. S&OP process step 1.1.7, depicted in FIG. 3G, shows an exemplary monitor view of this functionality, which is achieved according to the following computer programming specifications:
Initial Processing
Default month and year to current month and year
Lookup all records on Table 1.1.7 using converter_no from login and current month and year
User Workflow & Resultant Processing
Typical
    Enter month, enter year
    Lookup and display all records for the Month and Year
Notes
Display Only An embodiment of the system in accordance with the present invention allows the user to resolve supply imbalances by changing the line availability assumptions originally loaded in process step 1.1.2. For example, the user could decide to delay a planned maintenance outage or to schedule work on a holiday. The user may also resolve supply imbalances by adjusting the production rates and efficiencies originally loaded in process step 1.1.3. For example, the user could decide to accelerate the implementation of a previously planned productivity program.

Another way that a user can resolve imbalances in accordance with an embodiment of the present invention to change the demand forecast originally loaded in process step 1.1.1. For example, the user might delay the ramp up of a new application or other piece of new business.

Figure 4:
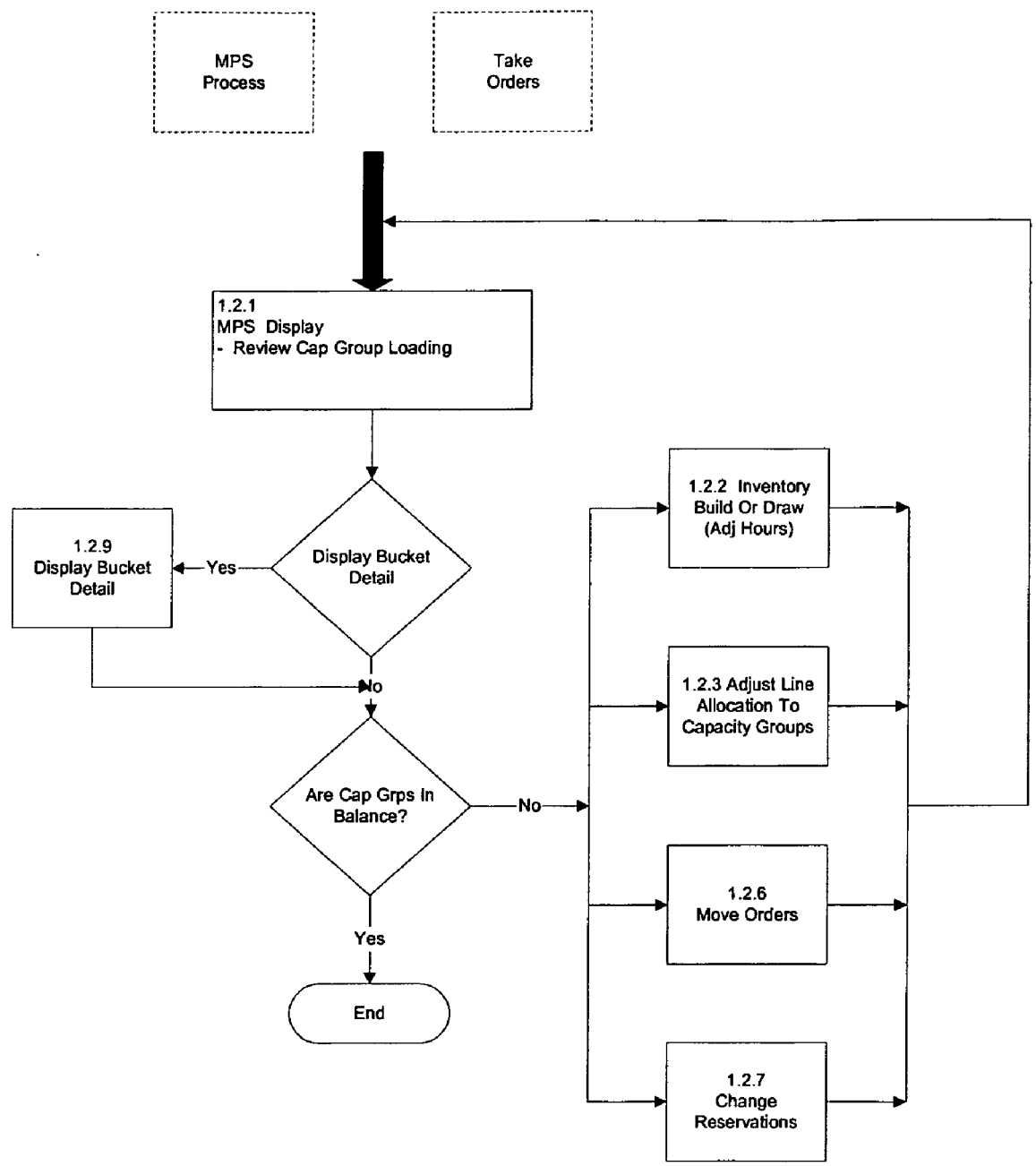
FIG. 4 is flow diagram setting forth an exemplary overview of the Master Production Scheduling processes of the current invention. See also paragraphs [00138]-[00143] of the specification.

FIG. 4 depicts the steps which are part of the MPS process in accordance with the present invention. While FIG. 4 and the accompanying description refer to MPS in the context of a week, it is understood that the MPS process in accordance with the present invention may be applied to any time interval selected by the user. Similarly, it is within the scope of the present invention to practice the MPS process, and the other processes of the present invention, without practicing all of the process steps depicted.

Figure 4A:
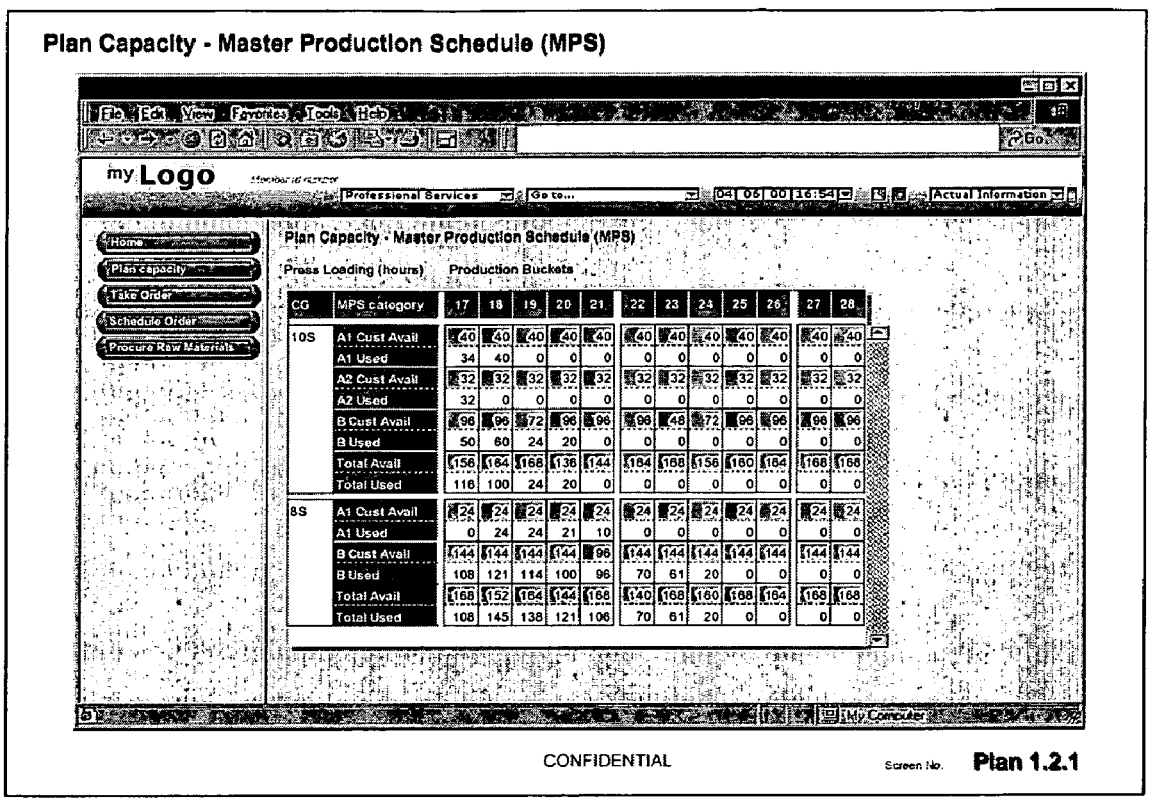
FIG. 4A is an exemplary monitor view of a Master Production Scheduling Summary Table of the Master Production Scheduling processes of the current invention. See also paragraph [00139] of the specification.
Figure 4B:
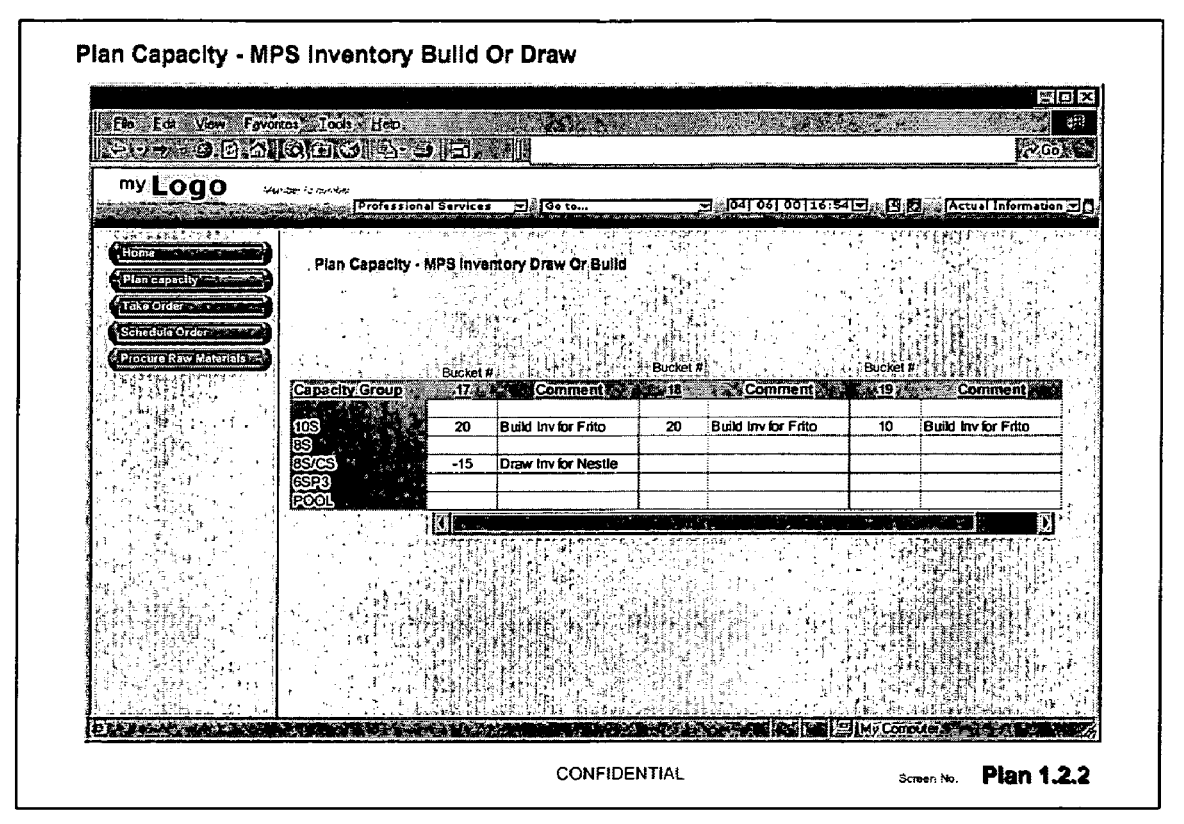

Referring to FIG. 4, as depicted in process step 1.2.1, at the beginning of each MPS cycle, the present invention provides an MPS summary (monitor display) depicting available and remaining capacity by capacity group. FIG. 4A shows an exemplary monitor view of this functionality, which is achieved according to the following computer programming specifications:
Initial Processing
Lookup all records on Table 1.2.1 using converter number from login
Display all records
User Workflow & Resultant Processing
Typical
    User may click on Production Bucket # (at top of column, ie//18) and control should transfer to transaction PLAN1.2.9, Display Bucket Detail.
Notes
Display Only
The computer is further programmed to allow planned inventory draws or builds to be changed as depicted in process step 1.2.2. FIG. 4B shows an exemplary monitor view of this functionality, which is achieved according to the following computer programming specifications:
Initial Processing
Lookup all records on Table 1.2.2 using converter number from login
Calculate "todays" bucket—see algorithm Bucket Calc
Set display such that initial production bucket is "todays" bucket Display all records User Workflow & Resultant Processing Typical Use horizontal scrolling to get to the bucket to display Enter an inventory build or draw (in hours for that bucket) for a specific capacity group. Move to comment field and add a comment on the build or draw.

Notes

None

Figure 4C:
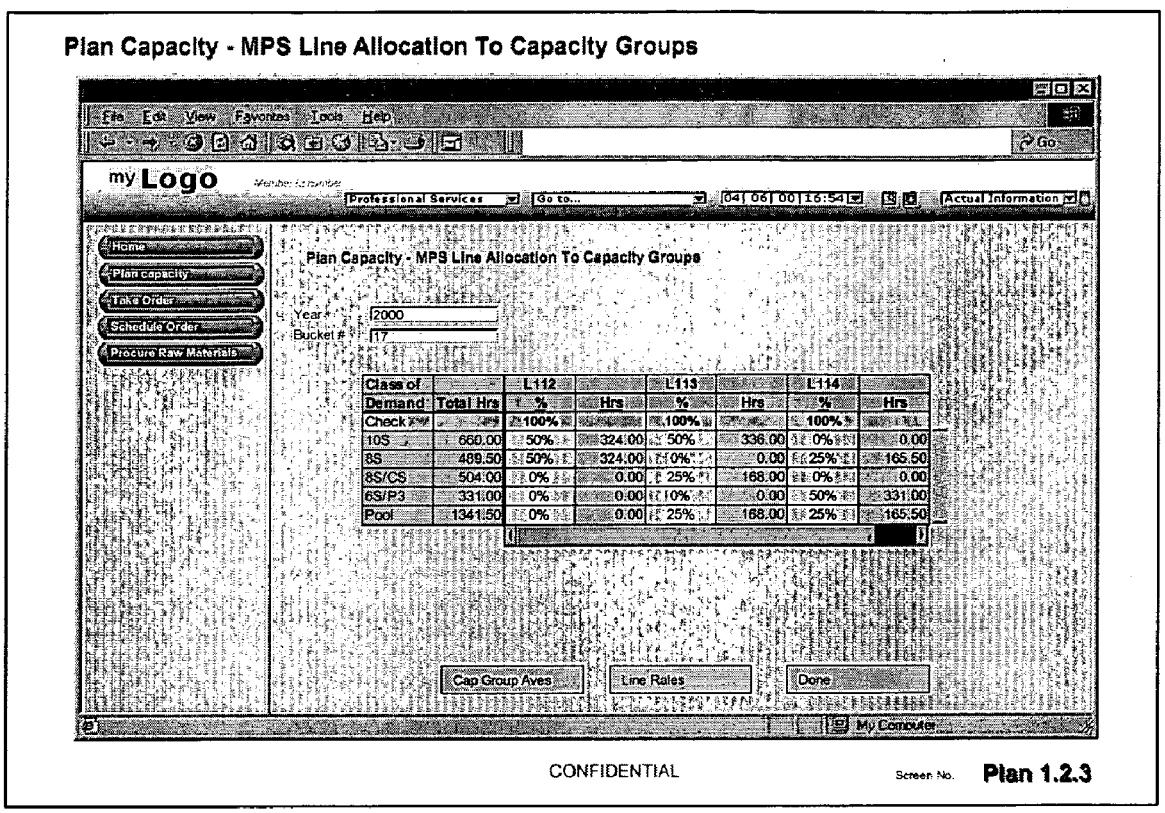
FIG. 4C is an exemplary monitor view of a Capacity Group Assignment Table of the Master Production Scheduling processes of the current invention. See also paragraph [00141] of the specification.

Process step 1.2.3 in FIG. 4 depicts a second table where the present invention allows assumptions to be changed. This data is referred to as the Capacity Group Assignment Table. The MPS model is programmed to load demand into capacity groups (i.e. virtual lines composed of hours from physical lines having similar manufacturing capabilities). Process 1.2.3 allows the user to shift hours from underloaded capacity groups to overloaded ones in order to resolve supply imbalances. For example, if the 10S (10 Station printing line) capacity group is under loaded, some of the 10S capacity could be used to produce 8S (8 Station printing line) demand since a line with 10 stations can substitute for a line with 8 stations. FIG. 4C shows an exemplary monitor view of this functionality, which is achieved according to the following computer programming specifications:

Initial Processing

Lookup and display all records on Table 1.2.3 using converter-no, year, and bucket #.

User Workflow & Resultant Processing

Typical

User Will select a cell and change the percentage.

Prior to exiting the screen, all check sum's must be 100% or error.

Notes

None

In an embodiment of the present invention, the computer is also programmed to allow orders to be moved from one production bucket to another bucket. Typically when this is done, orders are "pulled in" and produced early. Orders can only be "pushed out" and produced later if the user request date can still be met or if the user agrees to a new request date. This process capability is represented by process step 1.2.6 in FIG. 4. In order to support this functionality, the computer may also be programmed to display all of the orders in a bucket with their runtime requirements to assist in choosing which orders can be "pulled in" or "pushed out". This functionality is depicted in process step 1.2.9 of FIG. 4. (Orders identified in processes 1.2.6 and 1.2.9 are moved using process 2.1.1 shown in FIG. 7A.)

In one embodiment, the computer is also programmed to allow customers time reservations to be changed when actual demand differs from these customer reservations, and the customer agrees with this change. This process is represented by process step 1.2.7 of FIG. 4 and is executed using process 1.2.4 depicted in FIG. 5A.

Figure 5:
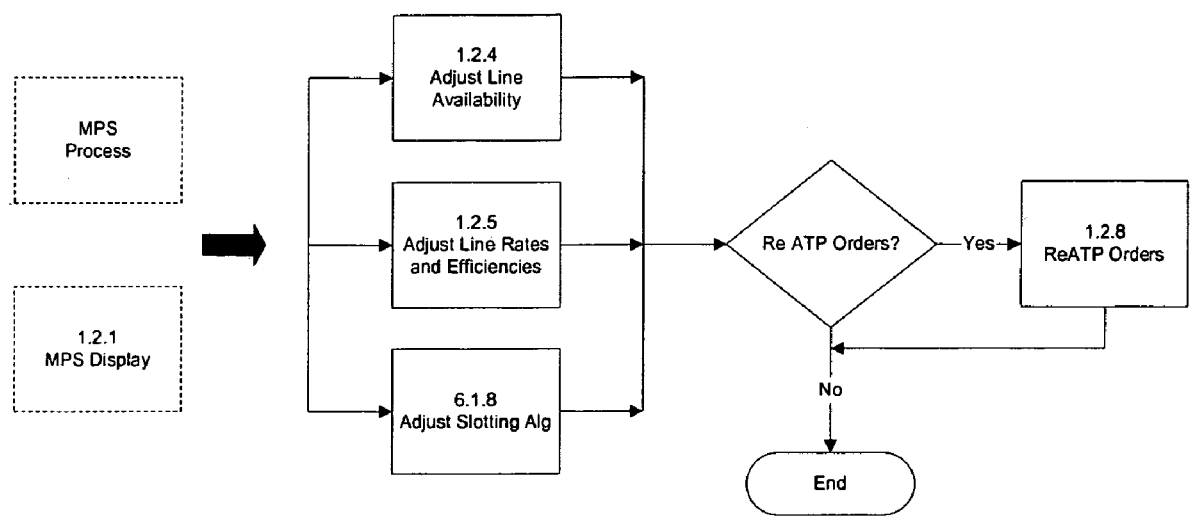
FIG. 5 is a flow diagram setting forth the supporting assumption processes of the Master Production Scheduling processes of the current invention. See also paragraphs [00144]-[00147] of the specification.
Figure 5A:
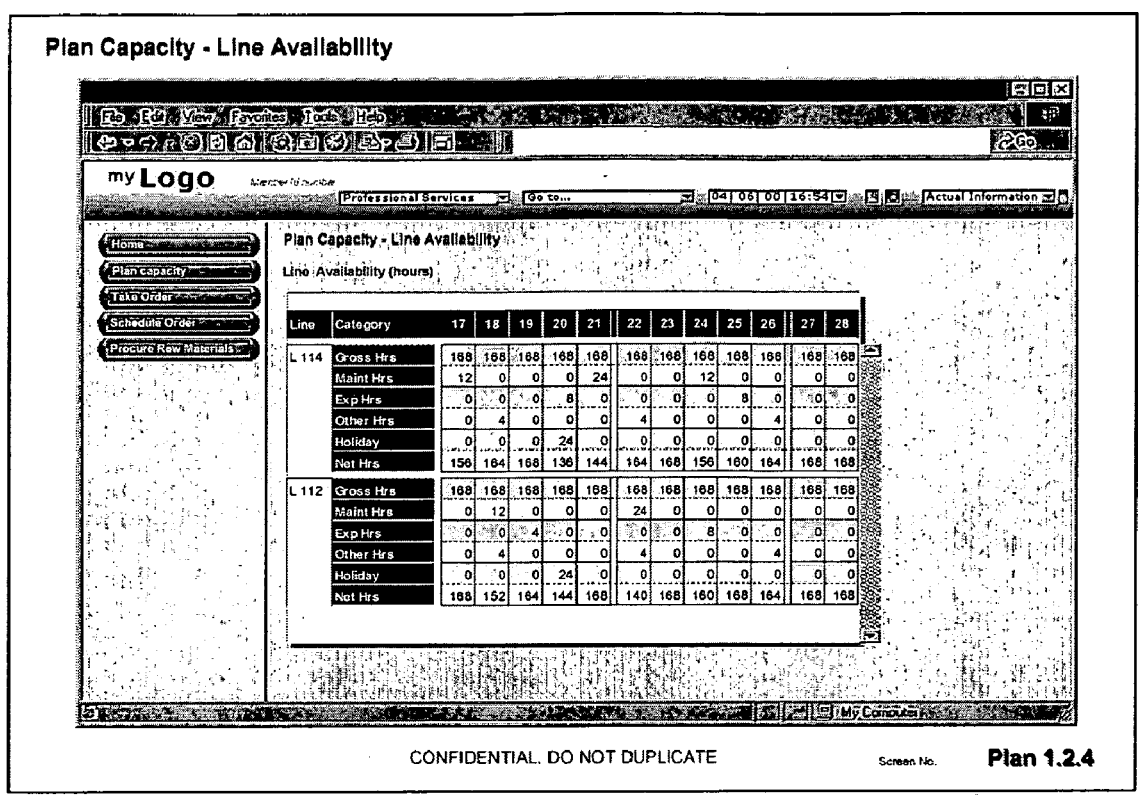
FIG. 5A is an exemplary monitor view of Line Availability Assumptions Table of the Master Production Scheduling processes of the current invention. See also paragraph [00144] of the specification.

MPS depends on a number of supporting assumptions concerning the planned availability, operability, and capability of each production line. These assumptions change over time and need to be updated periodically. FIG. 5 depicts how the present invention accomplishes these updates. Process step 1.2.4 represents an update of the system's production line availability assumptions. FIG. 5A shows an exemplary monitor view of this functionality, which is achieved according to the following computer programming specifications:

Initial Processing

Lookup all records on Table 1.2.4 using converter number from login

Display all records

User Workflow & Resultant Processing

Typical

User will click on a cell and change value

System should recalculate totals and update the screen

Notes

None

Figure 5B:
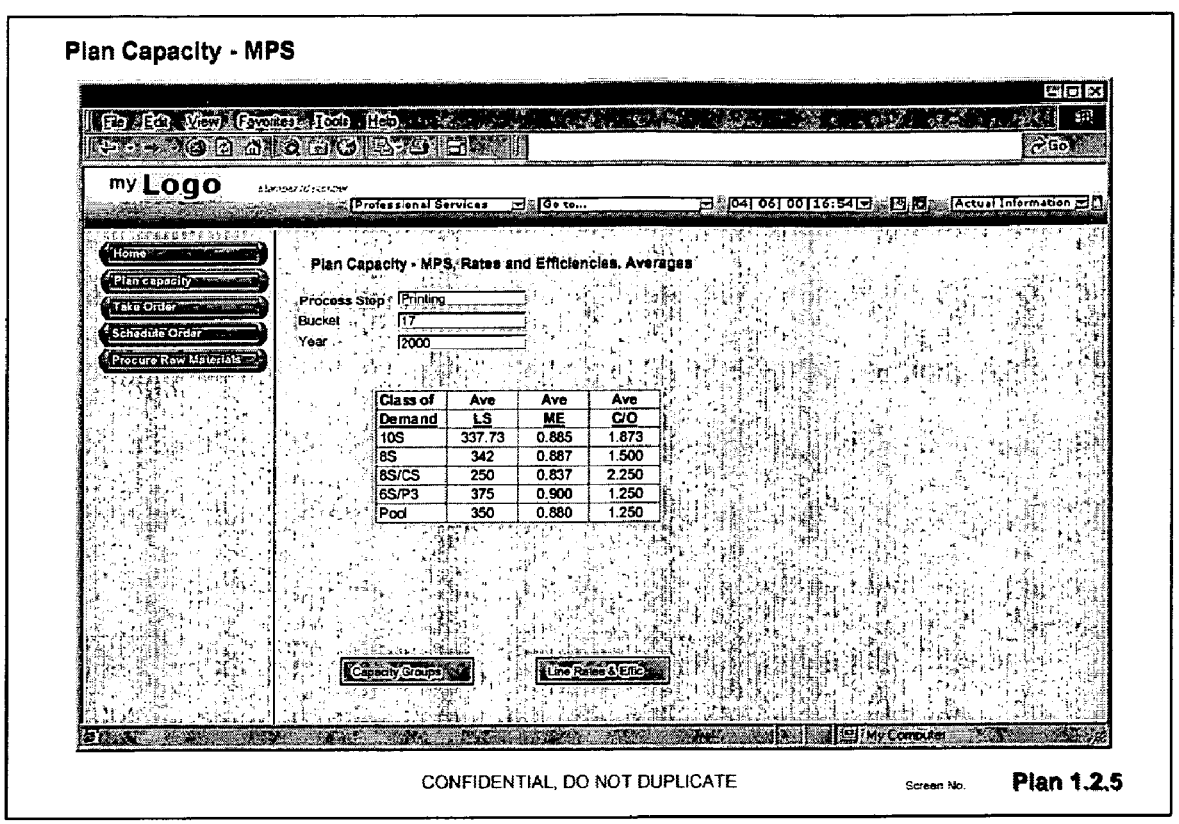
FIG. 5B is an exemplary monitor view of the Line Rates and Efficiencies Table of the Master Production Scheduling processes of the current invention. See also paragraph [00145] of the specification.

As represented by process step 1.2.5 of FIG. 5, the user can adjust the production rates and efficiencies based on recent manufacturing performance. FIG. 5B shows an exemplary monitor view of this functionality, which is achieved according to the following computer programming specifications:

Initial Processing

Lookup and display all records on Table 1.2.5, using converter-no, process step, year, and bucket.

User Workflow & Resultant Processing

Typical

User may change process step, bucket, or year.

Notes

Average data should be display only.

The user may also adjust the slotting algorithm and change the way in which orders will be slotted to the capacity groups. Process step 6.1.8 of FIG. 5 shows this process. FIG. 5C shows an exemplary monitor view of this functionality, which is achieved according to the following computer programming specifications:

Initial Processing

Lookup and display all data on the capacity group DB using converter-no, and process step.

User Workflow & Resultant Processing

Typical

User will add a new capacity group (row) to the matrix

System should check that the priority numbers are unique

Notes

None

The impact of these updates on orders already in the system can be ascertained by rerunning the available to promise (ATP) process for selected orders using the revised assumptions. This capability is depicted in process step 1.2.8 of FIG. 5. Orders selected for reprocessing at this step are re-ATP'd using process 2.1.1 shown in FIG. 7A.

Figure 6:
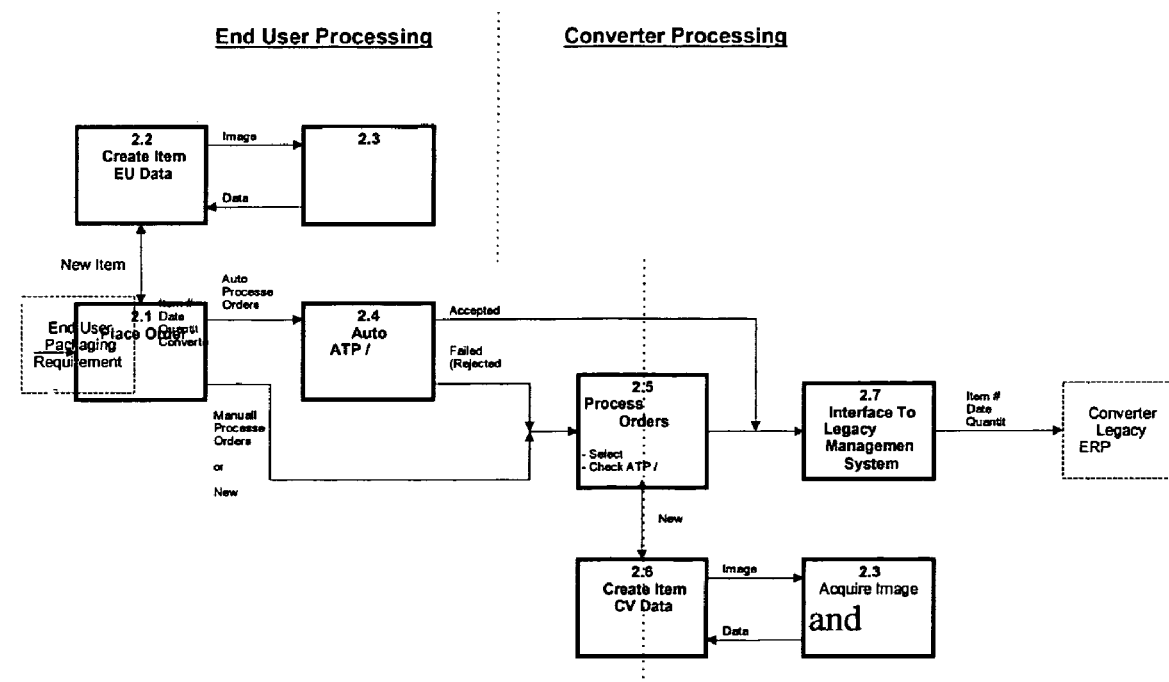
FIG. 6 is a flow diagram setting forth an overview of the Order Management processes of the current invention. See also paragraphs [00148]-[00177] of the specification.

The system in accordance with the present invention is programmed with an order management system to capture order data required for production planning (Process 1.0), scheduling (Process 3.0), and material requirements (Process 4.0). FIG. 6 provides a graphical overview of the order management functionality which may be programmed into the system of the present invention.

As shown in FIG. 6, Order Management begins with the availability of a digital contract proof. As mentioned previously, the digital contract proof may be in PDF format or other suitable file format. The contract proof and associated artwork is stored as digital data and is provided by the end user (or an entity acting on behalf of the end user) as part of the item creation process. This file is acquired and analyzed by the present invention (Process 2.3). In addition to providing a low resolution copy of the image (for verification purposes), this process also extracts scheduling metadata from the image. Scheduling metadata is data about certain characteristics of the image that can be used to more accurately plan production and schedule the job. For example, scheduling metadata allows the scheduler to anticipate the degree of difficulty associated with printing the image using various technologies so the job can be assigned to a press which is technically capable of running the job. Algorithms for extracting scheduling metadata and are described in the foregoing detailed description of the invention.

Once the image has been acquired, the user links it to a package structure to create an End User Item (Process 2.2). With the item complete, the end user creates a purchase order in the end user's legacy purchasing system. At this point, an order for this item is entered using the present invention, and transmitted over the internet to the electronic storage area of the present invention (Process 2.1). The system in accordance with the present invention may be programmed to automatically process the order (Process 2.4) or place the order in a "pending" status for manual processing, depending on the converter's setup and selected preferences.

If the converter selects automatic order processing (Process 2.4) and a converter item corresponding to the end user item already exists, ATP and allocation are automatically checked by the system as soon as the order is entered. This step involves the following four checks:

1. Is there production capacity available to meet the requested delivery date (ATP)?
2. Does the user have sufficient allocated capacity available (Allocation)?
3. Will required production materials be available at the time of production?
4. Will printing cylinders be available at the time of production?

If the order passes these checks, it is accepted and transmitted to the legacy Order Management System (Process 2.7). If the order fails any of the checks or if the converter item does not exist, it is put into a pending order queue that must be manually processed by the converter (Process 2.5).

If the converter selects manual order processing, all orders entered by the end user are placed into a pending order queue (this queue also holds failed orders from the automatic process). To manually process this queue (Process 2.5), the converter selects an order or group of orders and runs an ATP/allocation check. If an order passes this check, the converter may accept the order and transmit data to the legacy Order Management System (Process 2.7). If an order fails due to ATP or allocation, the converter works with the end user to adjust the order quantity or the requested delivery date so that it will pass ATP and allocation. If an order fails due to the lack of production materials or printing cylinder availability, the converter may elect to expedite delivery of the production material or reallocate printing capacity to fulfill the order in the time period requested. If the converter item does not already exist, it can be created using Process 2.6.

The order management functionality described in FIG. 6 is implemented as a series of methods in the present invention. FIGS. 7 through 10 provide detailed descriptions of the individual methods which are required to implement the order management function.

Figure 7:
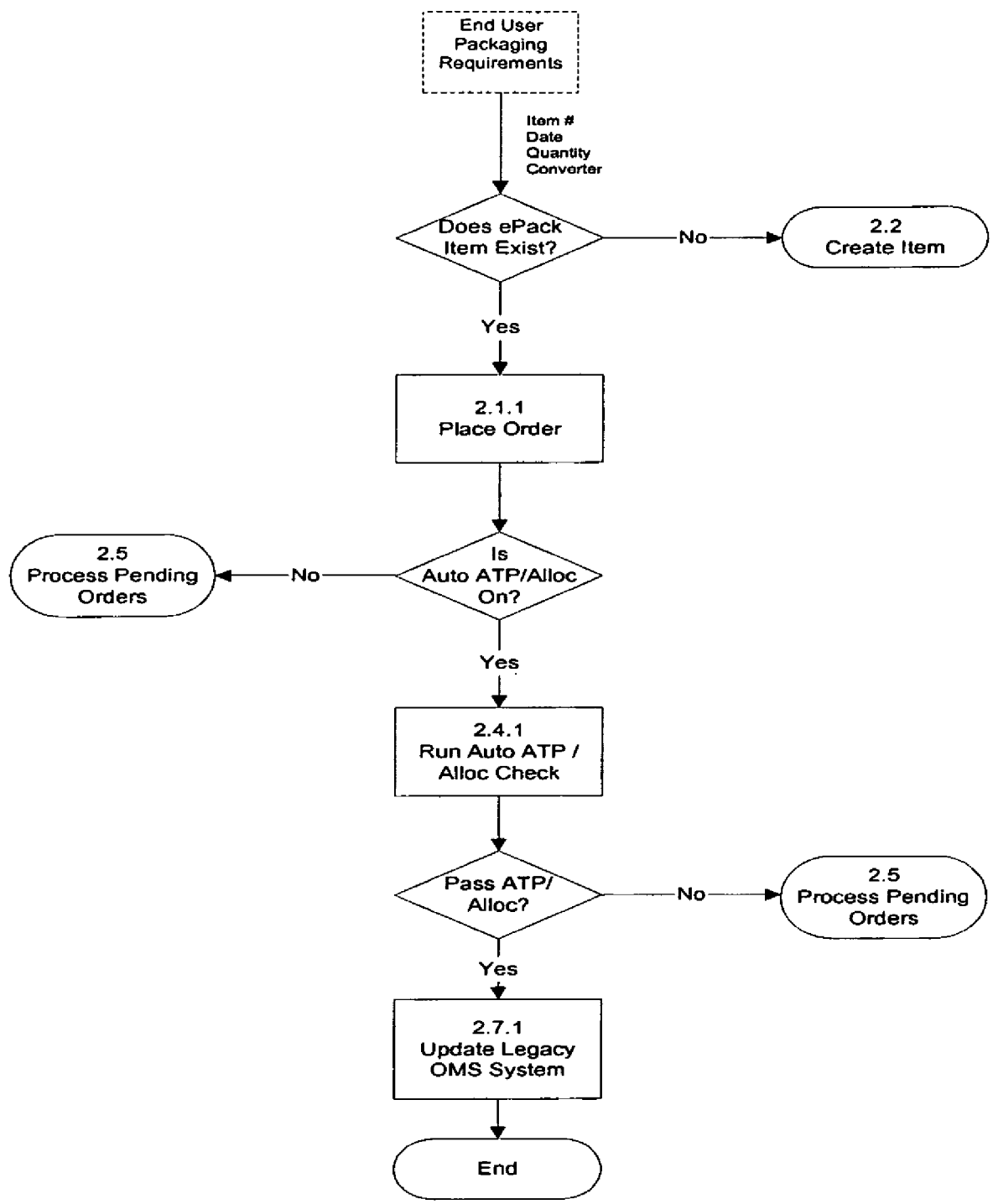
FIG. 7 is a flow diagram setting forth an overview of the order placement and Available-To-Promise (ATP)/Allocation processes of the Order Management processes of the current invention. See also paragraphs [00155]-[00158] of the specification.

FIG. 7 is a graphical depiction of the order placement and ATP/allocation process (Process 2.1 and Process 2.4) in accordance with the present invention. The order placement and ATP/Allocation processes are generally described as follows:

Place Order (Process 2.1.1). The end user places an order. This is done by specifying the item number, quantity required, date required and converter to produce a given order. If the item does not already exist, the end user can create it.

Auto ATP/Allocation Check (Process 2.4.1). If the specified converter's automatic ATP/Allocation check is turned on then ATP/Allocation will be run automatically. If the order passes, it will be accepted and transmitted to the converter's Order Management System. Otherwise, the order is placed in a pending order queue.

Figure 7A:
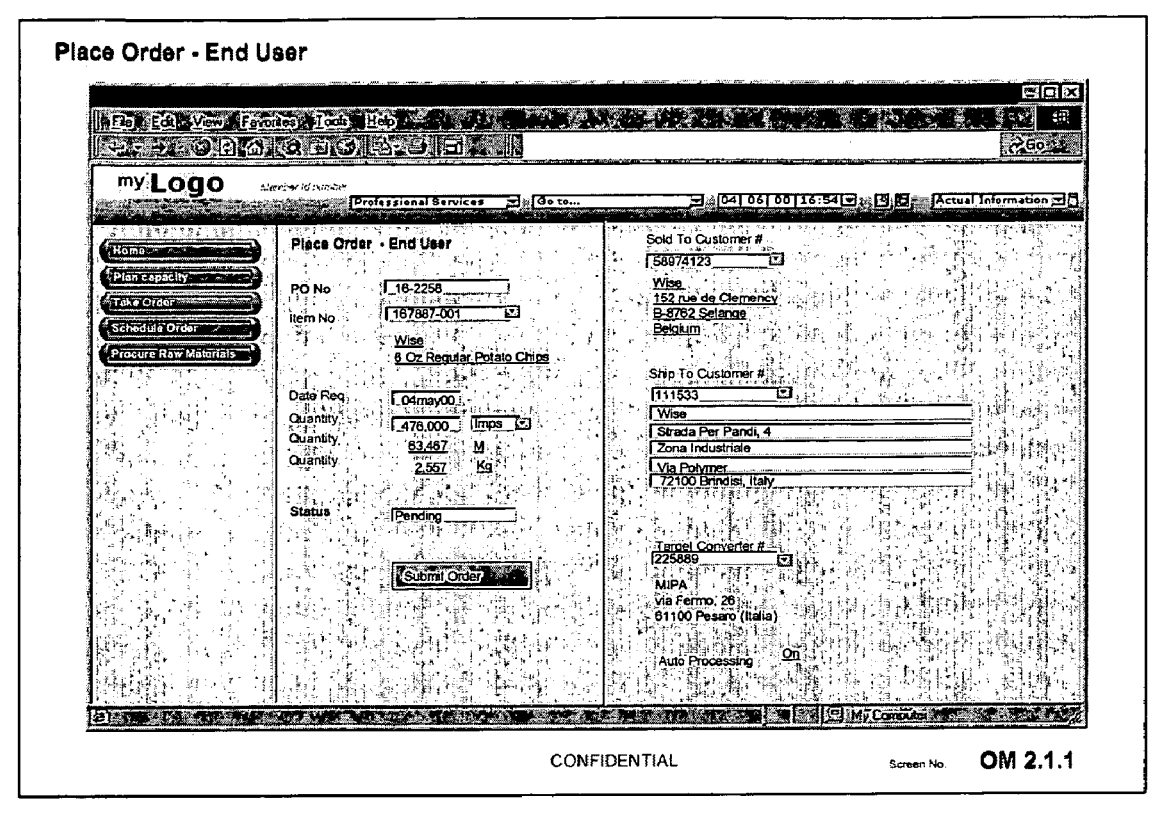
Figure 7B:
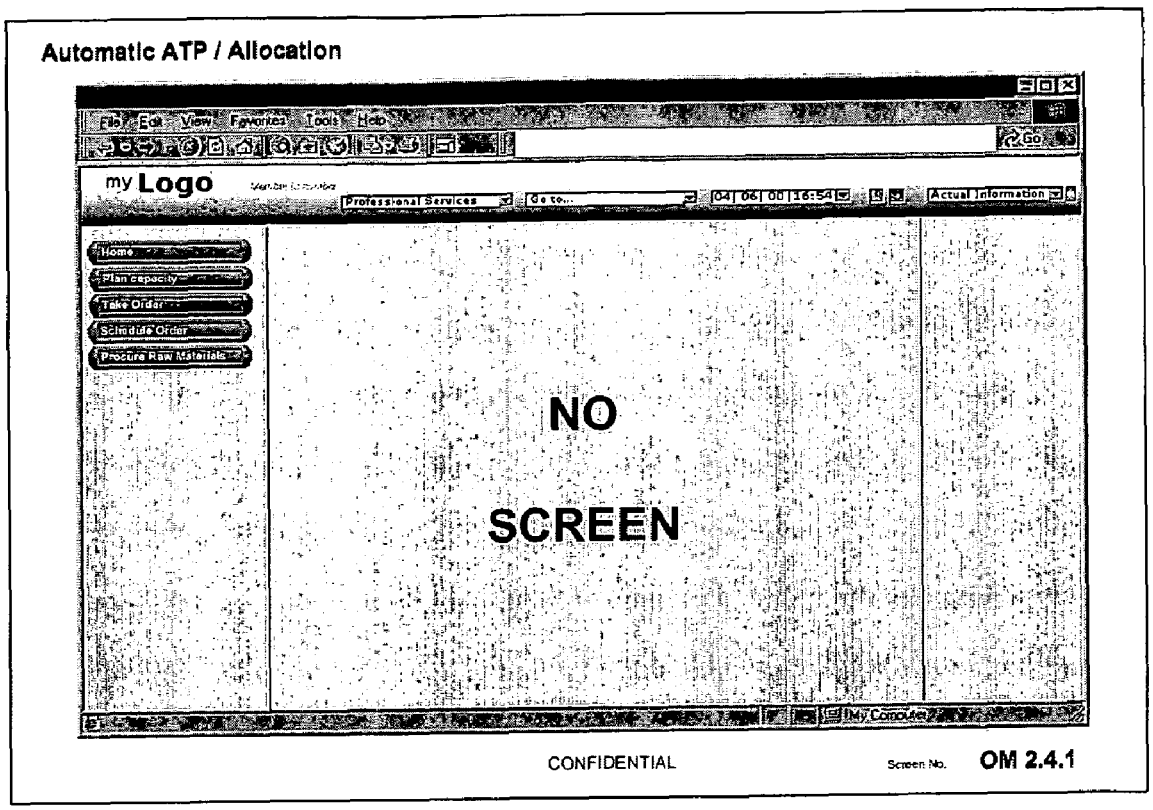
FIG. 7B is an exemplary monitor view of an Automatic ATP/Allocation run of the Order Management processes of the current invention. See also paragraph [00157] of the specification.
Figure 7C:
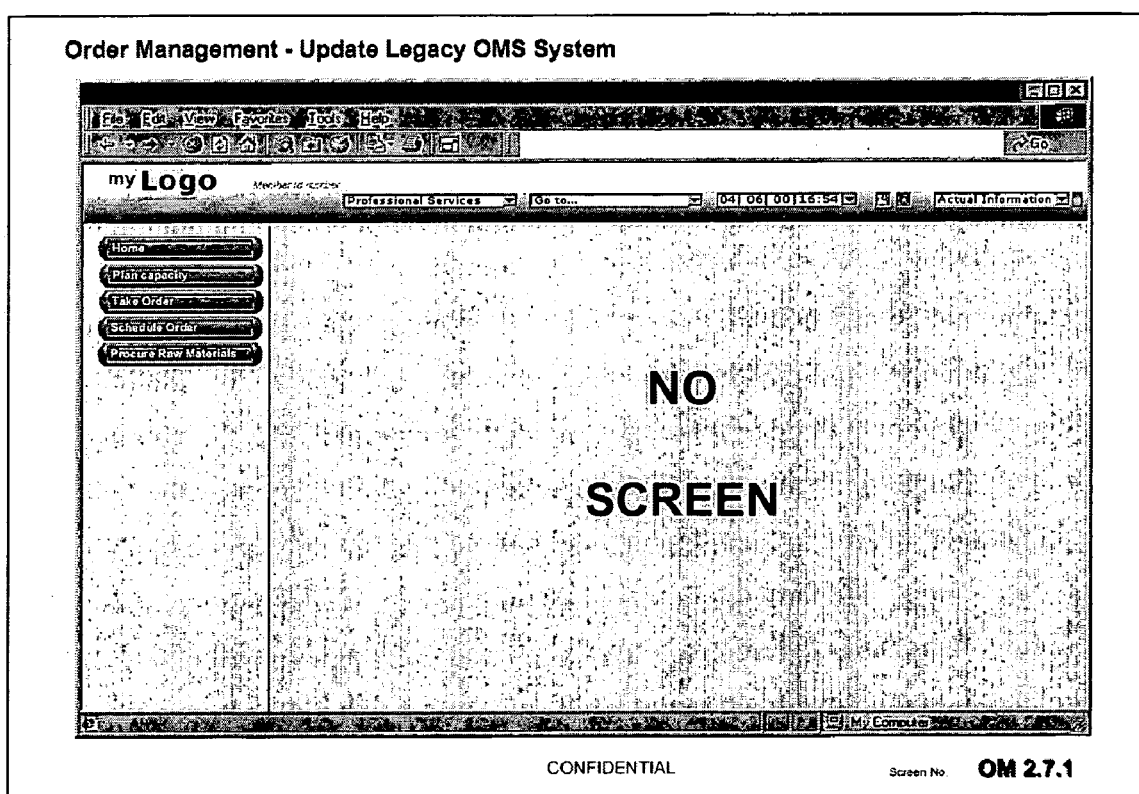
FIG. 7C is an exemplary monitor view of an update to converter's Legacy Order Management System of the Order Management processes of the current invention. See also paragraph [00158] of the specification.

FIGS. 7A-7C provide detailed descriptions of an embodiment of the order placement step and ATP allocation processes in accordance with the present invention. FIG. 7A shows an exemplary monitor view of Process 2.1.1, which is achieved according to the following computer programming specifications:

Initial Processing
None
User Workflow & Resultant Processing
Typical
  Enter purchase order number from legacy Purchasing system
  Enter Item No
  Lookup on Item DB using Item #: item description, end user #, target converter #, yield, cutoff, width
  Set sold to customer number to end user #
  Lookup on converter DB using target converter #: converter name, address, and auto processing field
  Lookup on end user DB using sold to #: customer name, customer address, default ship to customer number
  Set ship to # to default ship to customer number
  Lookup on end user DB using ship to #: customer name and address
  Enter the date required
  Enter quantity
  Enter quantity unit of measure
  Calculate alternative units of measure
    Imps to Mass=((cutoff*width*# imps)/(yield))/uom1
    Imps to Length=((# impressions/# up)*cutoff)/uom2
    Mass to Imps=uom3*(mass*Yield)/(cutoff*width)
    Mass to Length=uom4*(mass*Yield)/(width*# across)
    Length to Imps=uom2*(Length/cutoff)*# across
    Length to Mass=(Length*# across*width)/Yield/uom4
  Note: uom# factors are needed because commercial unit of measure conventions in metric and english units of measure are inconsistent.
  Press Submit Order Key
  If AutoATP="ON" Then:
    Slot order to capacity group (See Algorithms)
    Calculate production bucket (See Algorithms)
    Lookup on Capacity group DB using capacity group: average changeover time, average line speed, average material efficiency
    Slot order to laminator (if applicable) (See Algorithms)
    Lookup on Equipment DB using laminator line #: average changeover time, average line speed, average material efficiency
    Calculate estimated quantity=quantity/(capacity group me*laminator me*standard slitter me)

Figure 8:
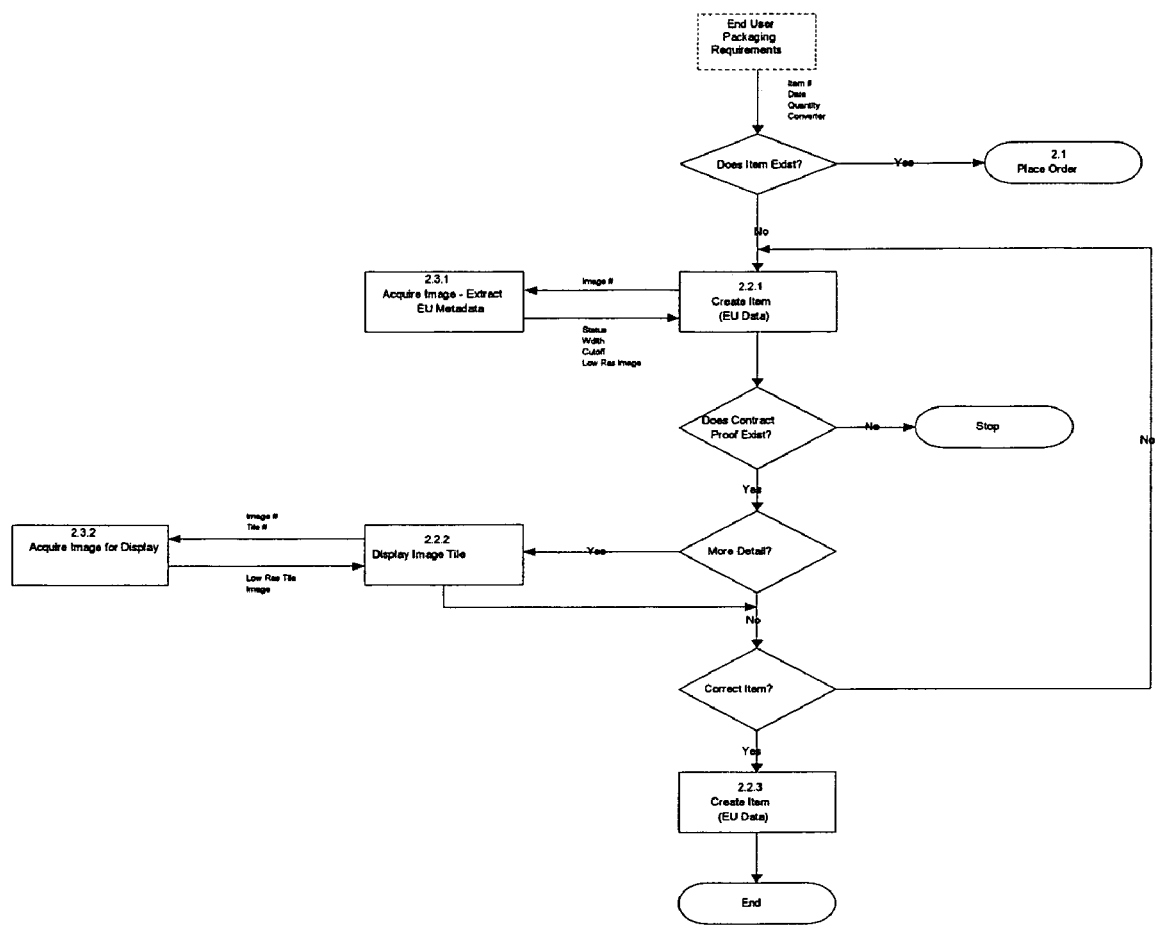
FIG. 8 is a flow diagram setting forth an overview of the process for creating an end user item of the Order Management processes of the current invention. See also paragraphs [00159]-[00164] of the specification.

Calculate estimated production hours
Press:
Across=INTeger(Max width Capacity Group/Image Width)
Length=Imps Orders/#Across
Length=(# Length*Cutoff)/(1000)
AdjLength=Length/Material Eff of Cap Group
Press Hrs=(Length/Average Line Speed Capacity Group)+Average Change Over Time for CG
Laminator:
Laminator Hrs=(Length/Material Eff of Laminator/Average Line Speed Laminator)+Average Change Over Time for Laminator
Send Order No, Press Hrs, Lam Hrs, Item No, Press Bucket, Lam Bucket, Capacity Group to AutoATP Check 2.4.1.
ELSE (AutoATP="OFF")
Change Order Status To "PendingConv"
End
Exceptional
Change Target converter number
Lookup on converter DB using converter # and get converter name and address
Change ship to customer number
Lookup on customer DB using ship to # and get customer name and address
Change ship to address
Change and reATP order
Retrieve existing order, display current values, and allow user to reATP the order with or without changes to date and/or quantity.
Notes
There should be drop down buttons on the following fields so that the user can do a lookup: Item No, Sold To Customer #, Ship To Customer #, Target Converter, Quantity Unit of Measure FIG. 7B shows an exemplary monitor view of Process 2.4.1, which is achieved according to the following computer programming specifications:
Initial Processing
Send:
  Order number
  Press bucket #
  Laminator bucket #
  Required press hours
  Required laminator hours
  End user number
  Item number
Return:
  ATP Status
  Allocation Status
  Film Status
  Cylinder Status
User Workflow & Resultant Processing
None
Notes
See Alg AutoATP for detailed calculations FIG. 7C shows an exemplary monitor view of Process 2.7.1, which is achieved according to the following computer programming specifications:
Initial Processing
Send:
  CV Item #
  EU Item #
  End User #
  End User PO #
  Quantity requested
  Quantity unit of measure
  Date requested
Return:
  Order #
User Workflow & Resultant Processing
None
Notes
None FIG. 8 is a graphical depiction of the process for creating an end user item (Process 2.1). FIG. 8 also shows how the process for acquiring the package design (image) and extracting end user metadata (Process 2.3.1) links to the item creation process. The process for creating an end user item and the linking of the processes for acquiring the package design and extracting end user metadata are generally described as follows:

Create Item (Process 2.2.1). Create Item, Image Data. The end user creates an item in system. The user enters an item number and an image number. The system interfaces with the Image Acquisition and Metadata Extraction Module to retrieve image status, width, cutoff, and a low resolution image display.

Acquire Image-Extract EU Metadata (Process 2.3.1). Acquire Image-Extract EU Metadata. The system requests a specific image from any suitable digital workflow. Once the image is retrieved, the system processes the image file to extract image status, width, cutoff, and a low resolution image display. If there is no approved contract proof in response to the system's request, the create item process is stopped.

Display Image Tile (Process 2.2.2). The low resolution image display will be segmented into "tiles." The user can click on a tile and the system will request and display a low resolution image of that tile.

Acquire Image For Display (Process 2.3.2). Acquire Image For Display. The system makes a specific image and tile # request to the Image Acquisition and Display module. The module returns a low resolution tile image display. If this is not the correct image, the user will can jump back to Create Item (Process 2.2.1) and can enter a different image number.

Create Item (Process 2.2.3). Create Item, Packaging Structure. The user can enter the package structure.

Figure 8A:
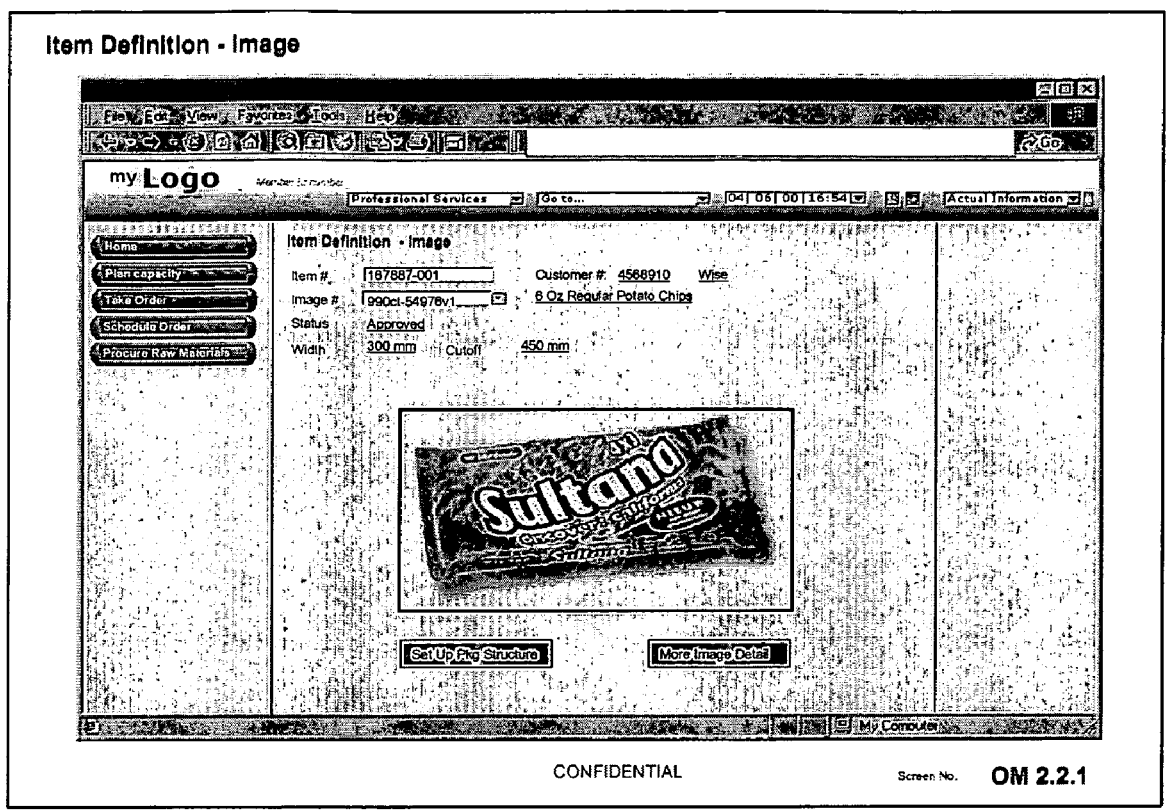
FIG. 8A is an exemplary monitor view of an Item Definition-Image process of the Order Management processes of the current invention. See also paragraph [00160] of the specification.
Figure 8B:
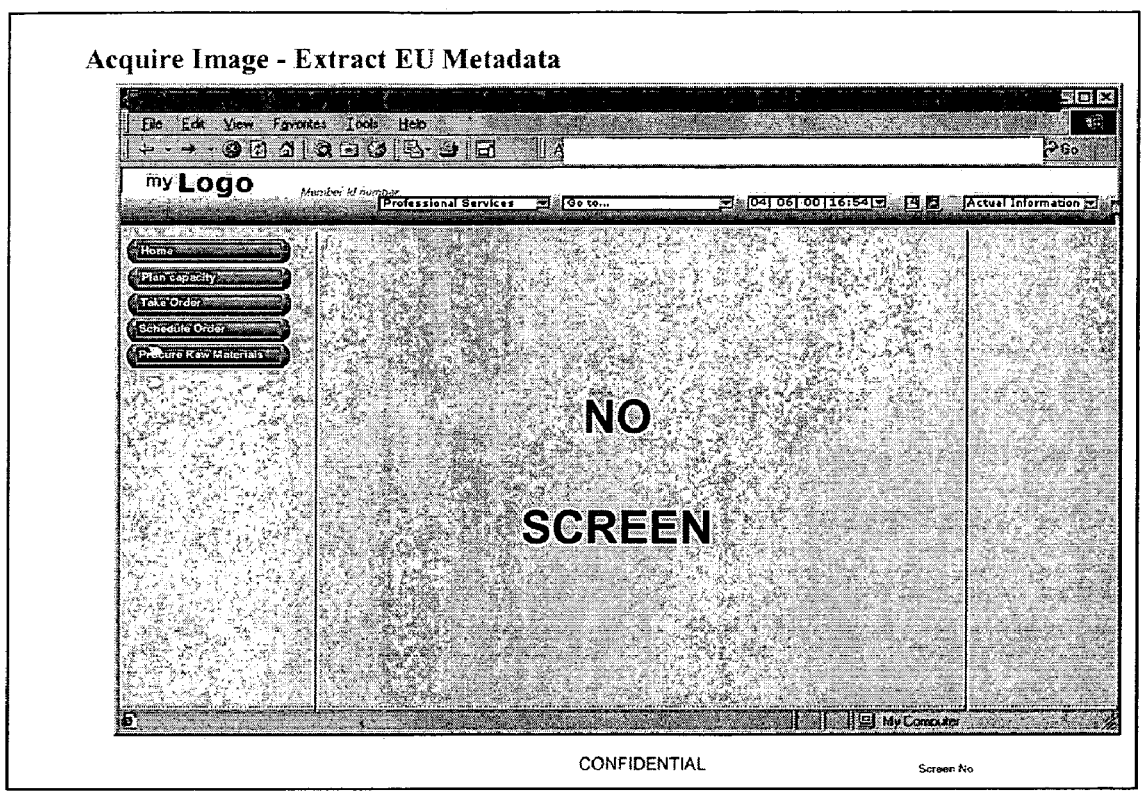
FIG. 8B is an exemplary monitor view of the Acquire Image-Extract End User (EU) Metadata process of the Order Management processes of the current invention. See also paragraph [00161] of the specification.
Figure 8C:
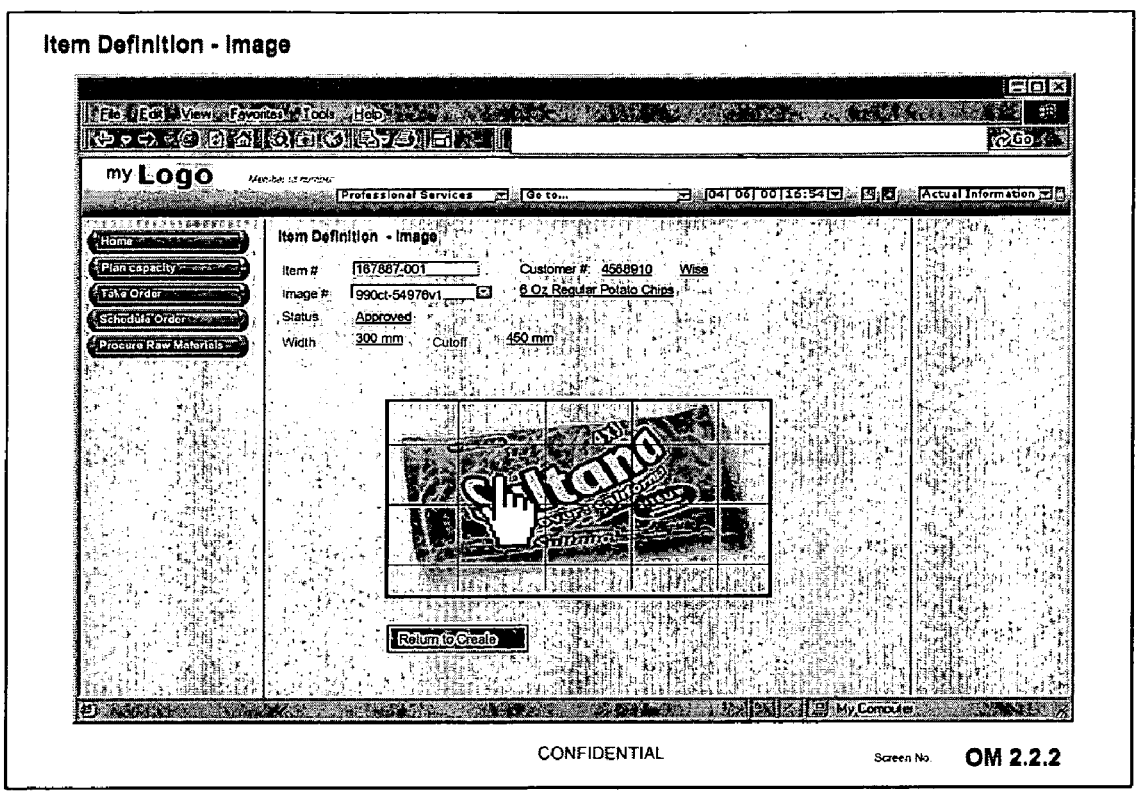
FIG. 8C is an exemplary monitor view of the Display Image Tile process of the Order Management processes of the current invention. See also paragraph [00162] of the specification.
Figure 8D:
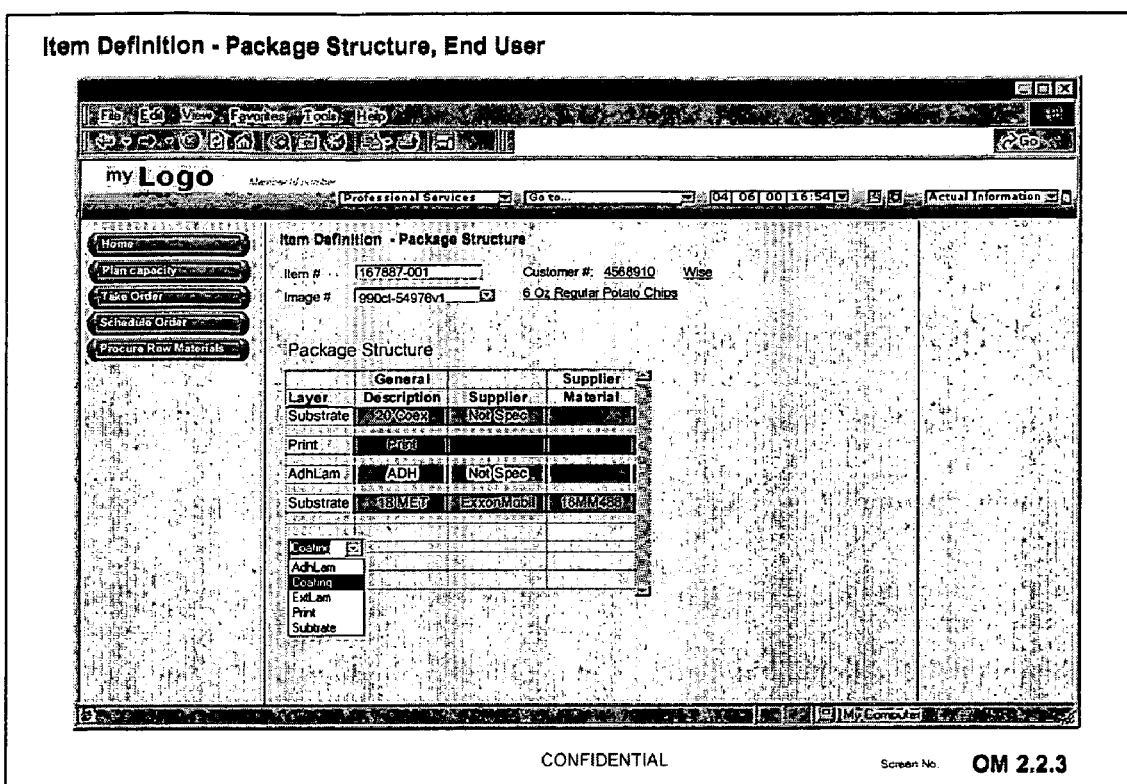
FIG. 8D is an exemplary monitor view of the Package Structure-End User process of the Order Management processes of the current invention. See also paragraph [00163] of the specification.
Figure 8E:
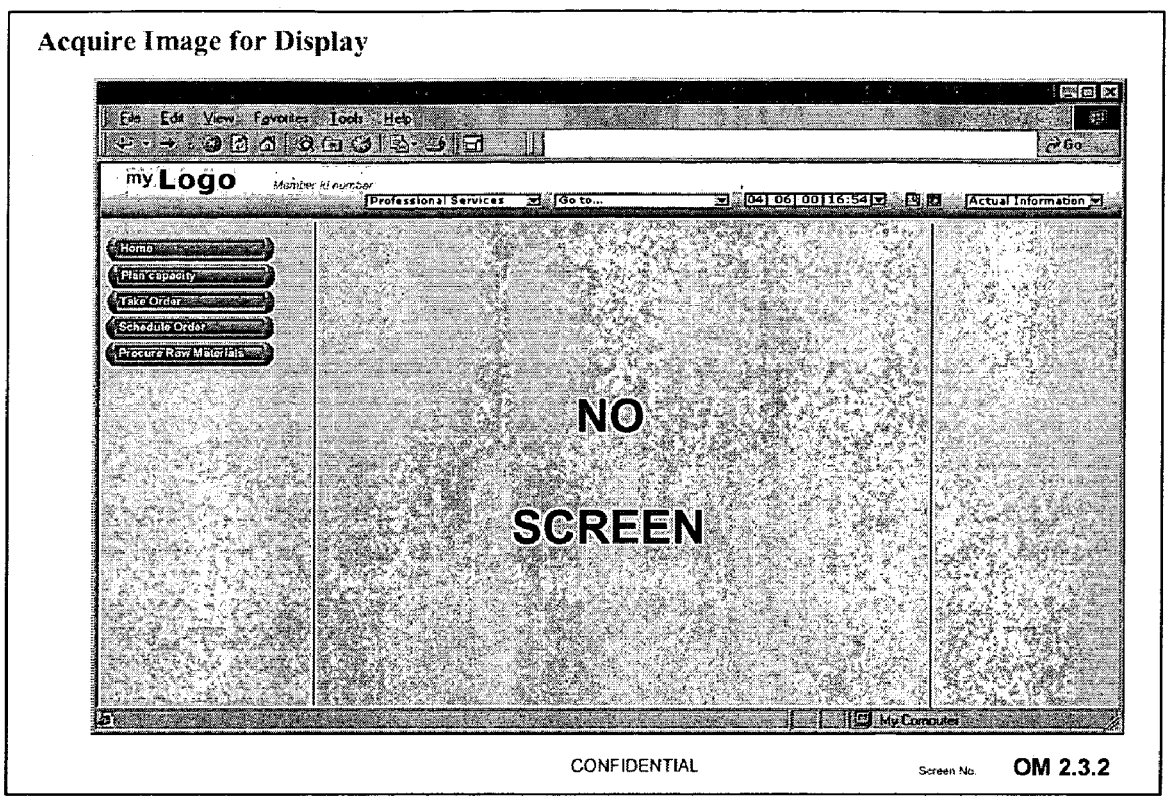
FIG. 8E is an exemplary monitor view of the Acquire Image for Display process of the Order Management processes of the current invention. See also paragraph [00164] of the specification.
Figure 9:
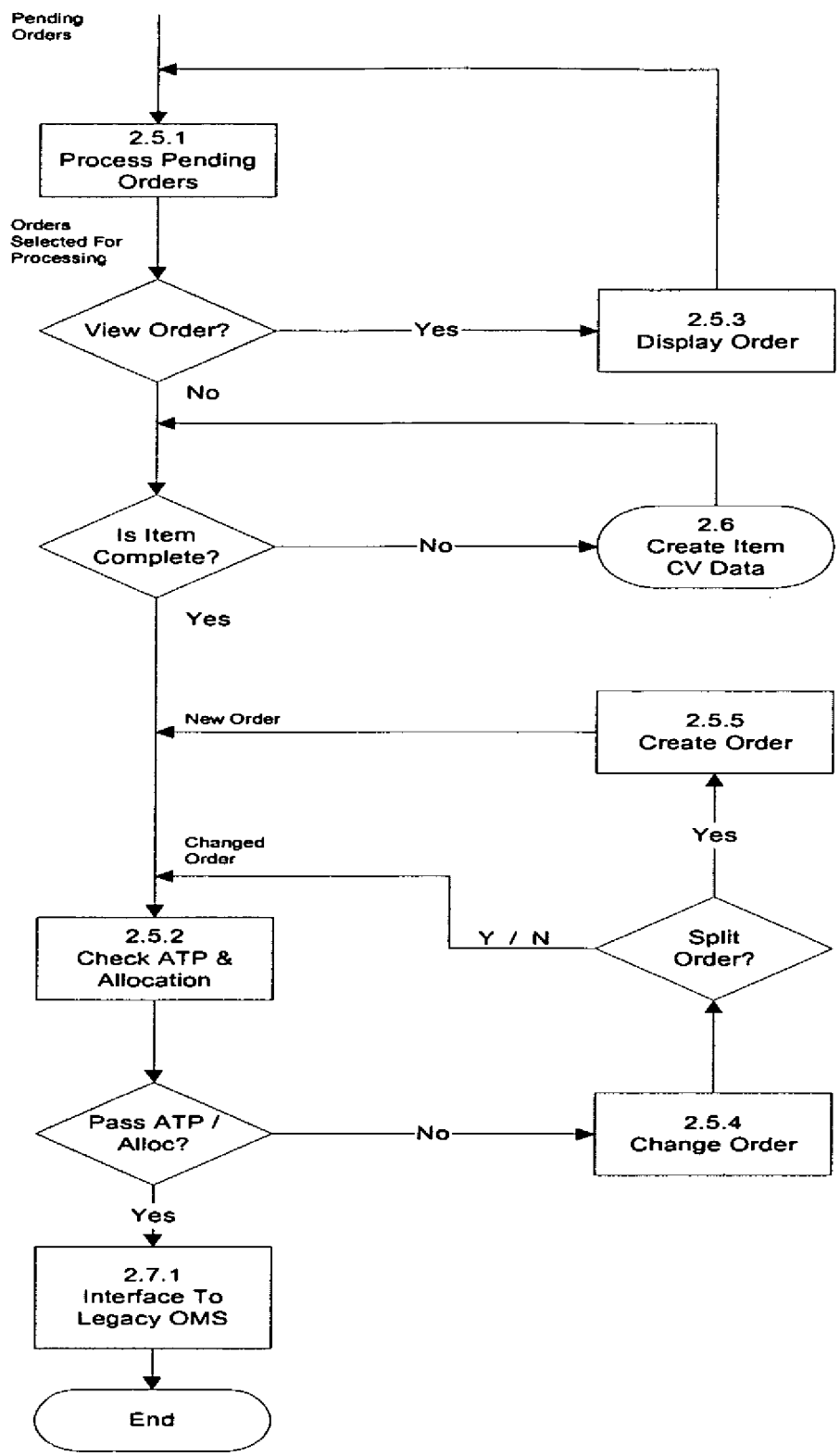
FIG. 9 is a flow diagram setting forth an overview of the process for handling pending orders of the Order Management processes of the current invention. See also paragraphs [00165]-[00171] of the specification.

FIGS. 8A-8E provide detailed descriptions of the process steps represented in FIG. 8 according to an embodiment of the present invention. FIG. 8A shows an exemplary monitor view of Process 2.2.1, which is achieved according to the following computer programming specifications:
Initial Processing
Lookup all records on Table 2.2.1 using enduser_no from login
Default Customer to customer name from login
User Workflow & Resultant Processing
Typical
  Enter Item #
  Enter Image #
  Interface with the Image Acquisition and Metadata extraction module. Send image number. Receive image status, width, cutoff, and a low resolution image for display.
  User clicks on the "Set Up Pkg Structure" button and is transferred to transaction 2.2.3.
Exceptional
  User clicks on the "More Image Detail" button and is transferred to transaction 2.2.2.
Notes
None FIG. 8B shows an exemplary monitor view of Process 2.3.1, which is achieved according to the following computer programming specifications:
Initial Processing
Send:
  Image number
Return:
  Image Status
  Image width
  Image cutoff
  Low Resolution Image Display file
Calculations
  None Required
User Workflow & Resultant Processing
None
Notes
None FIG. 8C shows an exemplary monitor view of Process 2.2.2, which is achieved according to the following computer programming specifications:
Initial Processing
Display image with tile grid lines
User Workflow & Resultant Processing
Typical
  User clicks on one of the "tiles"
  The system requests the specified tile from the Image Acquisition and Display Module by sending the image number and the tile number. The module returns a low resolution, full screen image of the tile (Process 2.3.2).
  User clicks on "Return to Create" button
Exceptional
Notes
None FIG. 8D shows an exemplary monitor view of Process 2.2.3, which is achieved according to the following computer programming specifications:
Initial Processing
Lookup allowable items for layer on Table "Layers"
User Workflow & Resultant Processing
Typical
  Pick layer off list
  Enter all other fields
Exceptional
  Point and click to select individual cell
  Change value in cell
Notes
  The user may elect to enter data by row or by column, screen operation should allow both using standard navigation: <enter> moves down a cell, <tab> moves over a cell
  Screen should be vertically scrollable FIG. 8E shows an exemplary monitor view of Process 2.3.2, which is achieved according to the following computer programming specifications:
Initial Processing
Send:
  Image number
  Tile number
Return:
  Full Screen Low Resolution Image Display of tile
Calculations
  None Required
User Workflow & Resultant Processing
None
Notes
None FIG. 9 is a detailed graphical depiction of the order management process for handling pending orders (Process 2.5) and interfacing to the existing OMS system (Process 2.7) in accordance with the present invention. The order management process for handling pending orders and the process for interfacing to existing OMS systems are generally described as follows:

Process Pending Orders (Process 2.5.1). The first step in processing orders is viewing the list of pending orders. The pending orders may be the result of failed automatic processing, or the result of disabled auto processing. The user may wish to select an order(s) and "View" the order(s) in detail. The next step is to determine if the item definition is complete. This can be determined by looking in column #4 of the Pending Orders que. If this column is blank, then the converter must fill in additional data to complete the item definition by going to Process 2.6.

ATP Allocation Check (Process 2.5.2). Both ATP and allocation are checked. If either item fails to pass the check, the system will provide an explanation via a recommended change to the data such that it will pass. For example, if the original order were for 476,000 impressions on July $10^{th}$, a failure would trigger ePack to display what items could be produced and when (380,000 impressions on July $10^{th}$ or 476,000 impressions on July $15^{th}$).

Change/Create Order (Process 2.5.3). If ATP or allocation fails, the converter will have to change the quantity or request date on the order.

Change/Create Order (Process 2.5.3). If there is a significant change to quantity or request date, the end user may require an additional order be entered to ensure they do not run out of material. The converter will enter the new order.

Interface To Legacy OMS (Process 2.7). Once an order (s) passes ATP and allocation, it is accepted and passed to the Legacy OMS system.

Figure 9A:
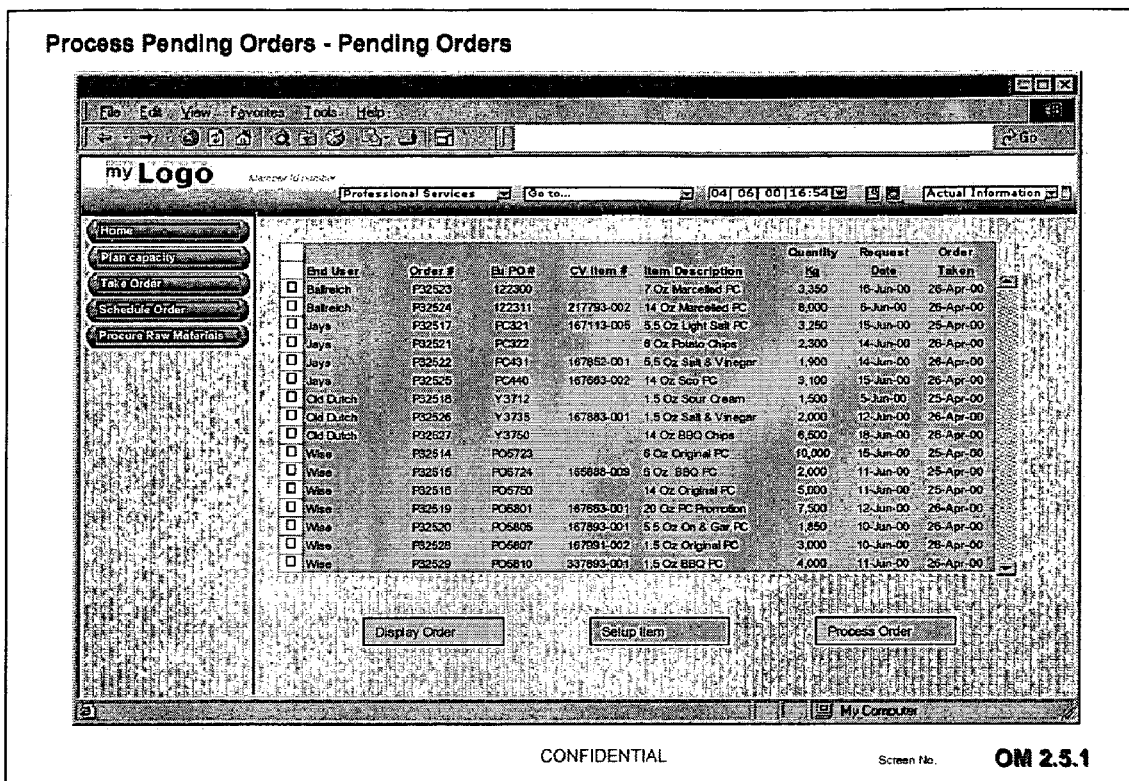
FIG. 9A is an exemplary monitor view of the Process Pending Orders process of the Order Management processes of the current invention. See also paragraph [00166] of the specification.
Figure 9B:
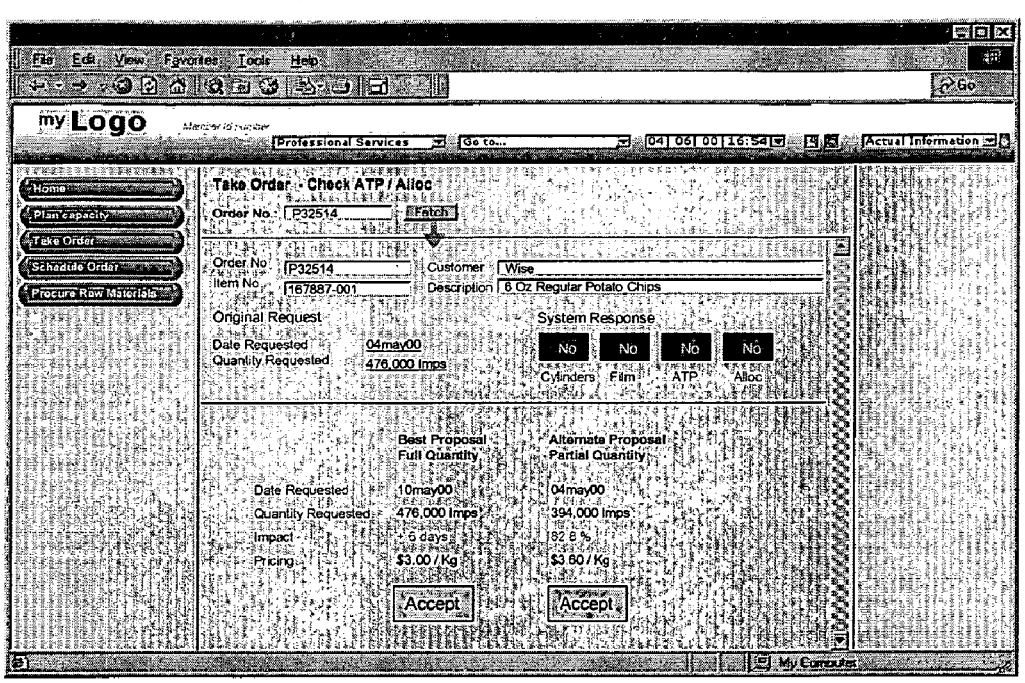
FIG. 9B is an exemplary monitor view of the ATP/Allocation Check process of the Order Management processes of the current invention. See also paragraph [00167] of the specification.

FIGS. 9A-9F provide detailed descriptions of the process steps represented in FIG. 9 according to an embodiment of the present invention. FIG. 9A shows an exemplary monitor view of Process 2.5.1, which is achieved according to the following computer programming specifications:
Initial Processing
Lookup on the "Orders" database, using converter number, all orders with a "Pending" status
User Workflow & Resultant Processing
Typical
  The user will check off a group of orders
  The user will click on the "Process Orders" button
  List of checked orders and corresponding data will be sent to Transaction 2.5.2 (Check ATP/Allocation)
Exception
  The user will check off a group of orders
  The user will click on the "Display Orders" button
  List of checked orders and corresponding data will be sent to Transaction 2.5.3 (Display Order)
  The user will check off a group of orders that do not have CV Item numbers listed in column #4
  The user will click on the "Setup Item" button
  List of checked orders and corresponding data will be sent to Transaction 2.6.1 (Create Item, CV data)
Notes
  No data can be changed on this screen
  The user may only check off orders and push the setup item or process orders buttons FIG. 9B shows an exemplary monitor view of Process 2.5.2, which is achieved according to the following computer programming specifications:
Initial Processing
Lookup on order DB using order #: date requested, quantity requested, uom requested, enduser number
Send order data to ATP/Allocation check
Display ATP/Allocation results
User Workflow & Resultant Processing
Typical
  User will look at the results of ATP/Allocation, if cylinder or film is red, the user will "click" on the film or cylinder button to get more detail. Display Film Detail—Sch 3.1.4, Display Cylinder Detail—Sch 3.1.3
  If ATP is "NO" find alternate proposals, see algorithms ATP/Allocation Check.
  User will look at the "proposed" solutions and accept one of them.
Exception
  If any one of the indicators is No (red) the user will click on one of the "display detail" buttons and go to the detail screens.
  Display Film Detail—Sch 3.1.4
  Display Cylinder Detail—Sch 3.1.3
  Display ATP Detail
  Display Alloc Detail
Notes
This screen is only displayed if the order fails for 1 or more of the checks: cylinders, film, ATP, allocation.

Figure 9C:
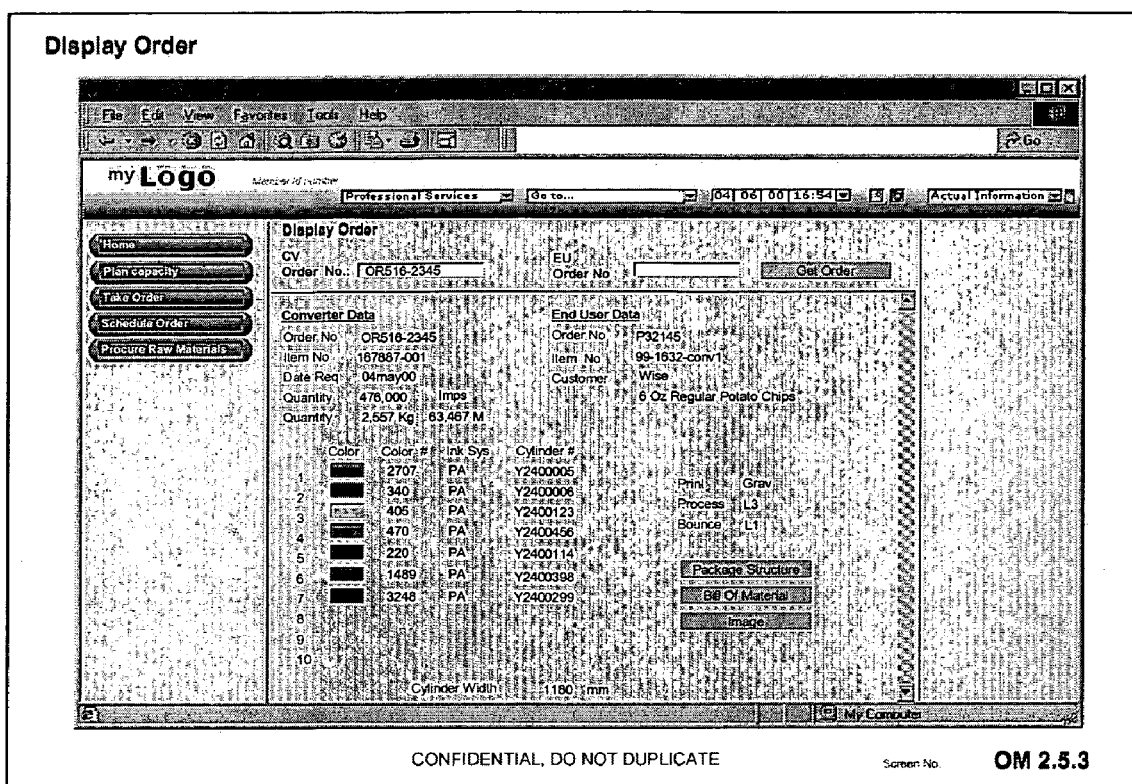
FIG. 9C is an exemplary monitor view of the Display Order process of the Order Management processes of the current invention. See also paragraph [00168] of the specification.
Figure 9D:
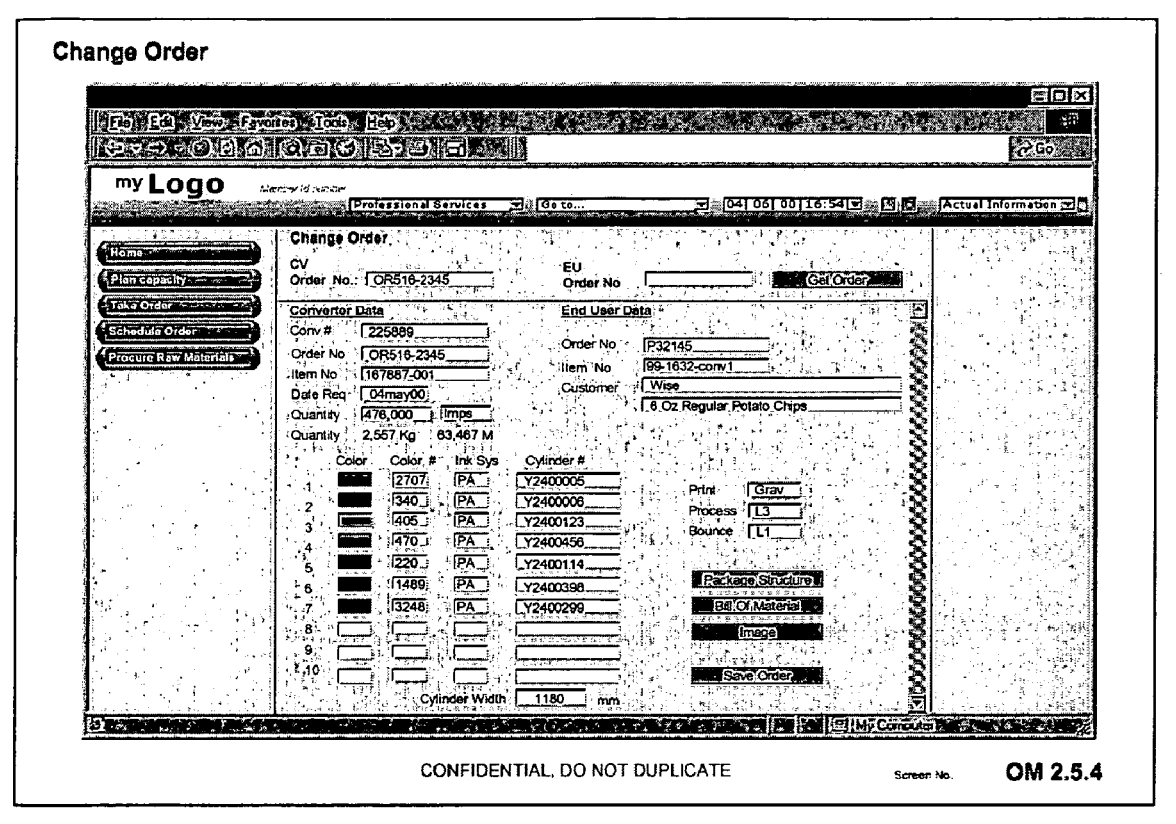
Figure 9E:
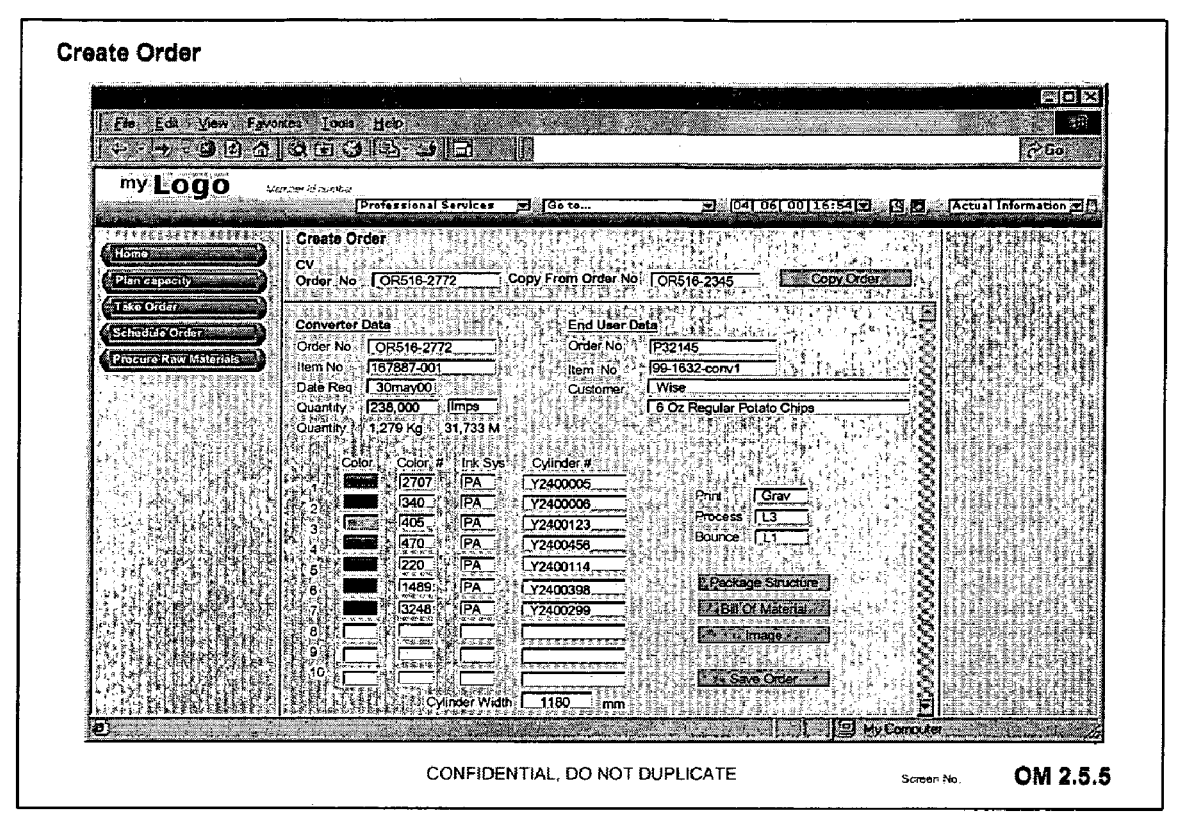
Figure 9F:
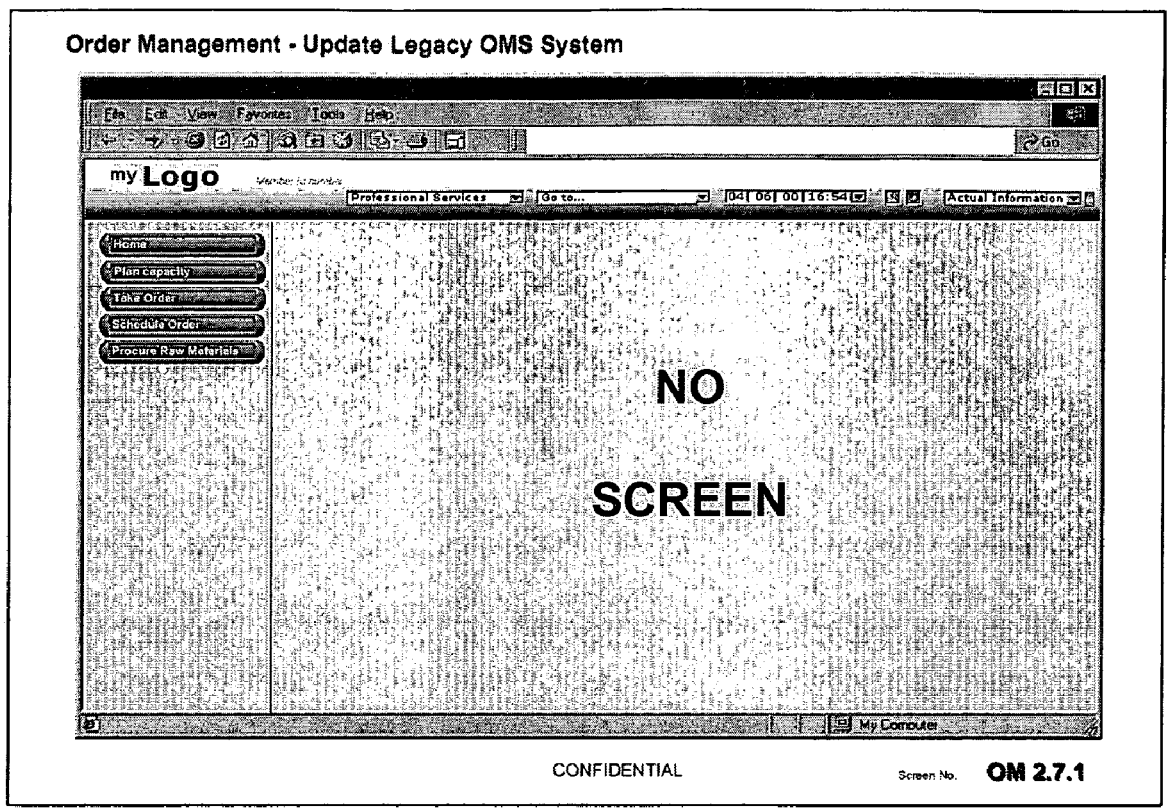
FIG. 9F is an exemplary monitor view of an update to converter's Legacy Order Management System of the Order Management processes of the current invention. See also paragraph [00171] of the specification.
Figure 10:
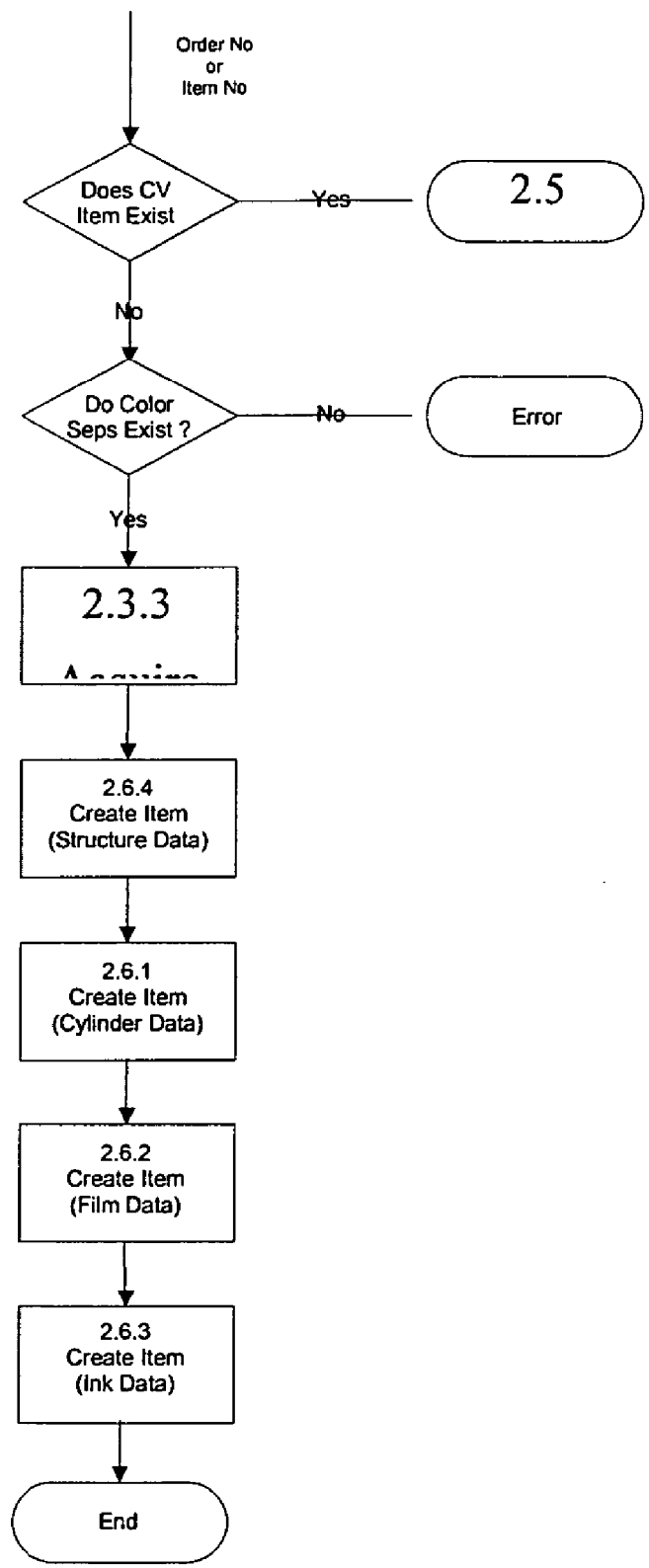
FIG. 10 is a flow diagram setting forth an overview of the processes for converter completion of a packaging item of the Order Management processes of the current invention. See also paragraphs [00172]-[00177] of the specification.

FIG. 9C shows an exemplary monitor view of Process 2.5.3, which is achieved according to the following computer programming specifications:
Initial Processing
Lookup on Order DB using order #: all order data
Display order
User Workflow & Resultant Processing
Typical
  User will look at order details
Exception
  User may click on buttons to look at package structure or bill of material or image details
Notes
This is a read only screen FIG. 9D shows an exemplary monitor view of Process 2.5.4, which is achieved according to the following computer programming specifications:
Initial Processing
Lookup on Order DB using order #: all order data
Display order
User Workflow & Resultant Processing
Typical
  User will change order quantity or request date
Exception
Notes
None FIG. 9E shows an exemplary monitor view of Process 2.5.5, which is achieved according to the following computer programming specifications:
Initial Processing
Lookup on Order DB using order #: all order data
Display order
User Workflow & Resultant Processing
Typical
  User will fill in a new order number and an order number to copy from
  User will push copy button
  System will copy order and display copy on screen
  User will change date requested and quantity
Exception
Notes
None FIG. 9F shows an exemplary monitor view of Process 2.7.1, which is achieved according to the following computer programming specifications:
Initial Processing
Send:
  CV Item #
  EU Item #
  End User #
  End User PO #
  Quantity requested
  Quantity unit of measure
  Date requested
Return:
  Order #
User Workflow & Resultant Processing
None
Notes
None FIG. 10 is a detailed graphical depiction of the process steps for a converter to complete a package item (Process 2.6), including the process for acquiring the image and extracting metadata to support this process (Process 2.3.3). The process for converter completion of a packaging item, including acquisition of the image and extraction of meta data are generally described as follows:
  Acquire Image-Extract CV Metadata (Process 2.3.3). Get Item # from Order DB using order #. Get Image # from Item DB using Item #. Interface with the Image Acquisition and Metadata Extraction Module using Image # and get all converting data.
  Create Item (Process 2.6.4). The converter adds structure data to the item. Some of the data elements for this transaction have already been entered by the end user.
  Create Item (Process 2.6.1). The converter adds cylinder data to the item.
  Create Item (Process 2.6.2). The converter adds film data to the item bill of material.
  Create Item (Process 2.6.3). The converter adds ink data to the item bill of material.

Figure 10A:
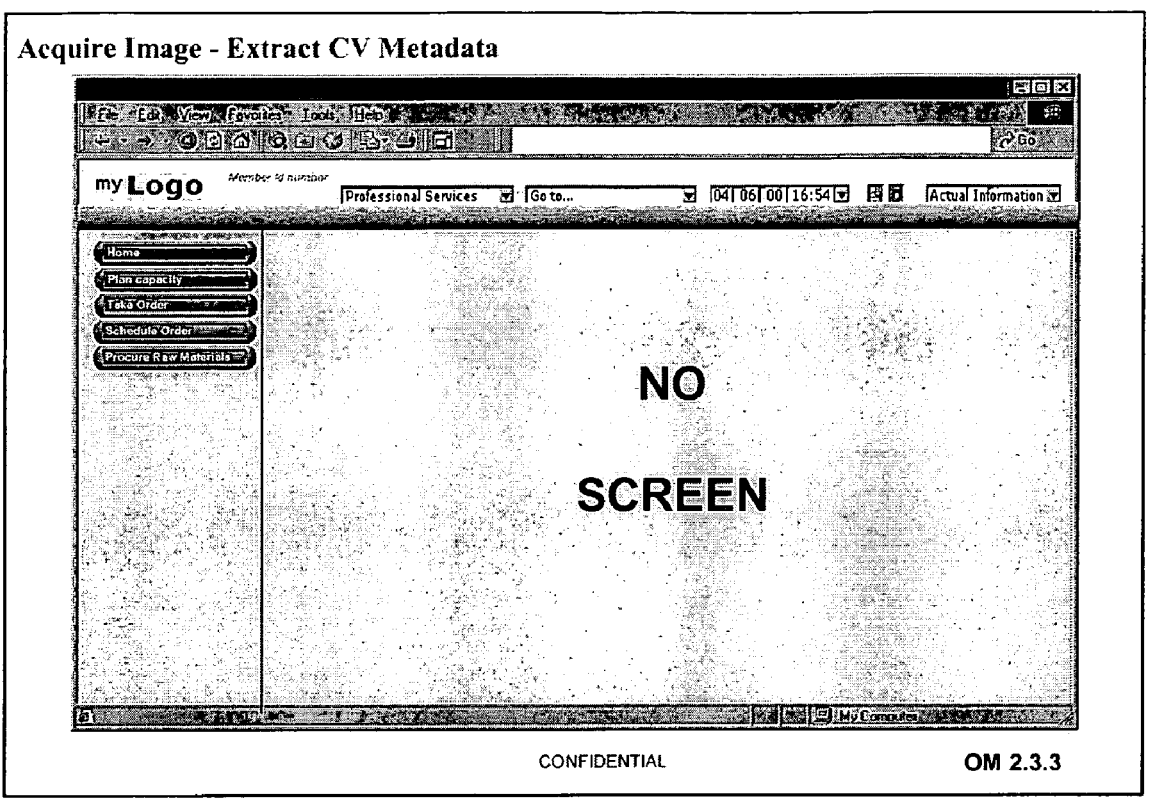
FIG. 10A is an exemplary monitor view of the Acquire Image-Extract Converter (CV) Metadata process of the Order Management processes of the current invention. See also paragraph [00173] of the specification.
Figure 10B:
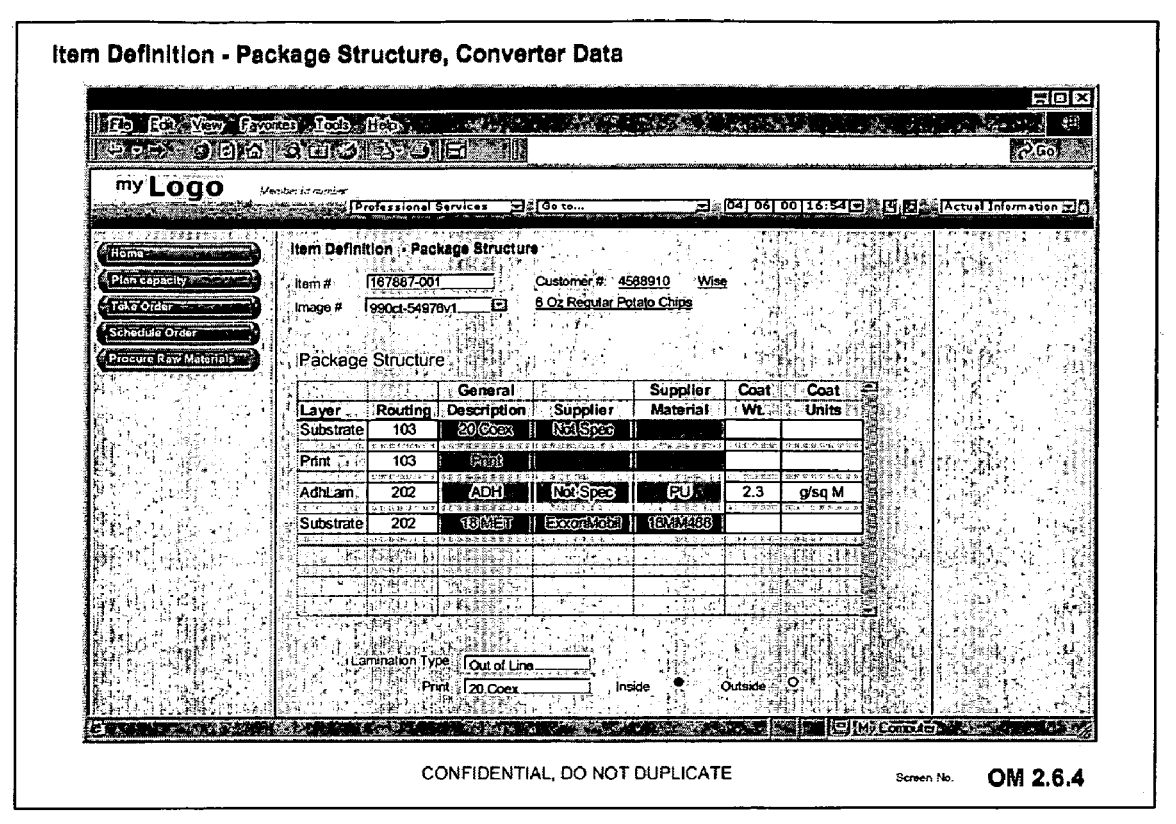
Figure 10C:
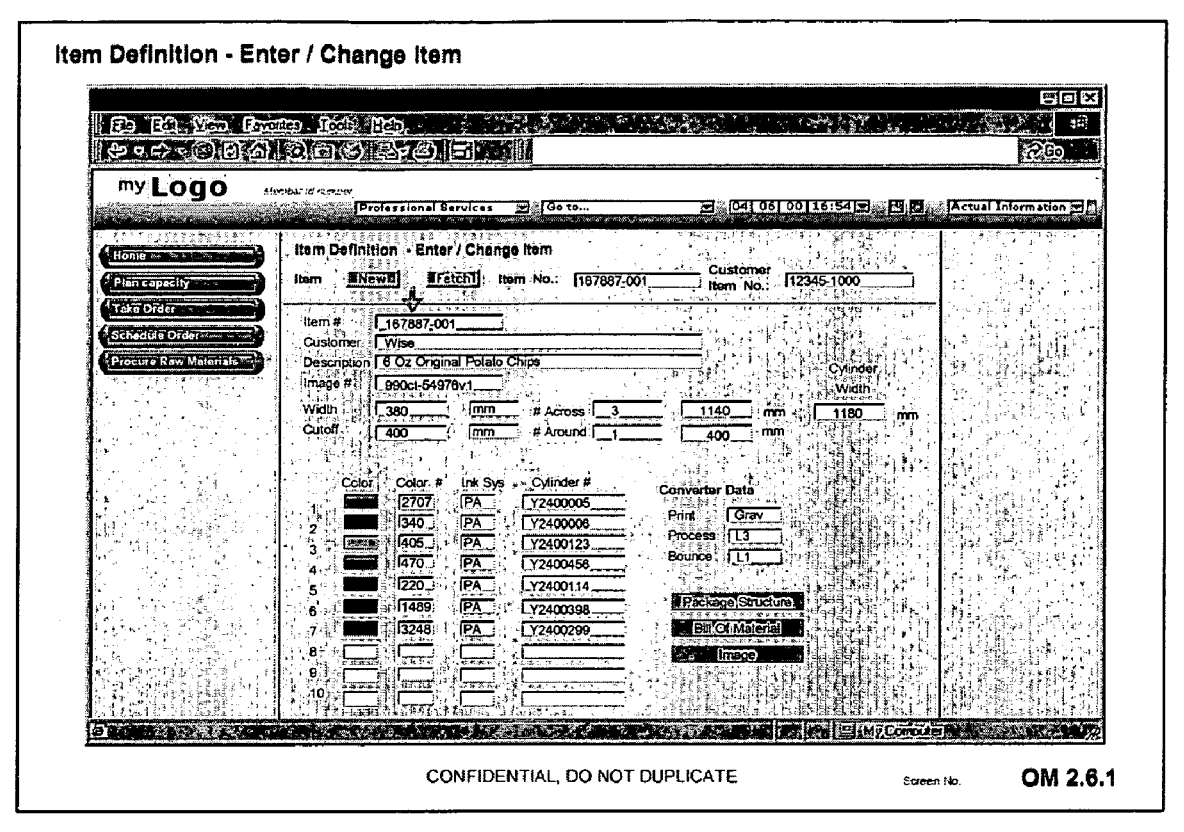

FIGS. 10A-10E provide detailed descriptions of the process steps represented in FIG. 10 according to an embodiment of the present invention. FIG. 10A shows an exemplary monitory view of Process 2.3.3, which is achieved according to the following computer programming specifications:
Initial Processing
Send:
  Image number
Return:
  Image description
  Customer number
  Customer name
  #Across
  #Around
  Bounce level of difficulty
  Color # for each cylinder
  % ink coverage for each cylinder (color)
Calculations
  None Required
User Workflow & Resultant Processing
None
Notes
None FIG. 10B shows an exemplary monitor view of Process 2.6.4, which is achieved according to the following computer programming specifications:
Initial Processing
Lookup and display data elements from Table 2.2.3(Item Definition, Package Structure) using item_no
User Workflow & Resultant Processing
Typical
Enter routing
Enter coating weight (if applicable)
Enter coating units (if applicable)
Enter Print film and side
Notes
None FIG. 10C shows an exemplary monitor view of Process 2.6.1, which is achieved according to the following computer programming specifications:
Initial Processing
Calculate width across=# across*width
Calculate width around=#around*cutoff
User Workflow & Resultant Processing
Typical
Enter ink system for each cylinder
Enter cylinder # for each cylinder
On first cylinder, lookup cylinder width on the cylinder DB using converter_no and cylinder number
Fill in cylinder width field
For all subsequent cylinders, lookup cylinder width on the cylinderDB using convert_no and cylinder number and check it against the cylinder width field. If there IS NOT a match, error.
Enter Print
Enter process level of difficulty
Click on Package Structure button
Notes
None FIG. 10D shows an exemplary monitor view of Process 2.6.2, which is achieved according to the following computer programming specifications:
Initial Processing
None
User Workflow & Resultant Processing
Typical
Enter basis quantity
Enter basis unit of measure
If basis unit of measure is not impressions, calculate basis impressions (required for ink calculations) Kg to Imps=Kg*Yield/(1000^2)/cutoff mm/width mm

*Sqm to Imps=Sqm*/cutoff mm/width mm/1000^2

Figure 10E:
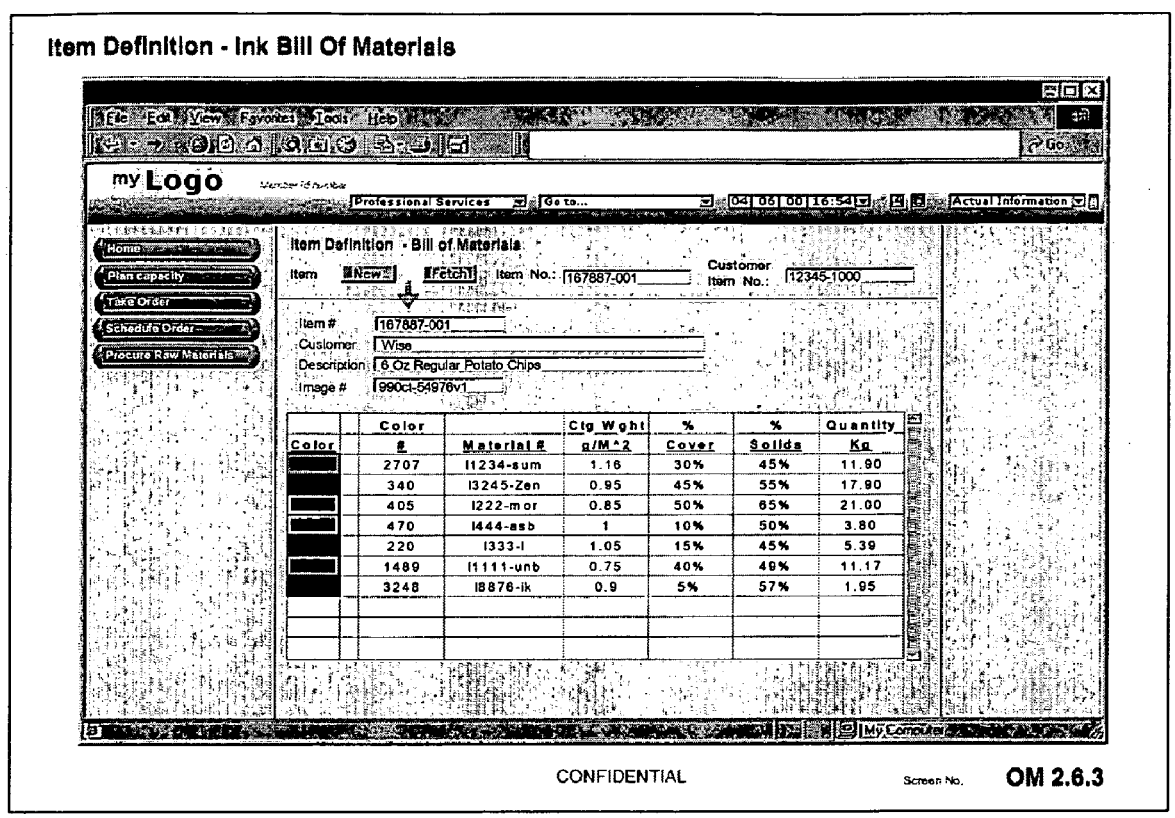
FIG. 10E is an exemplary monitor view of the Ink Bill of Materials process of the Order Management processes of the current invention. See also paragraph [00177] of the specification.
Figure 11:
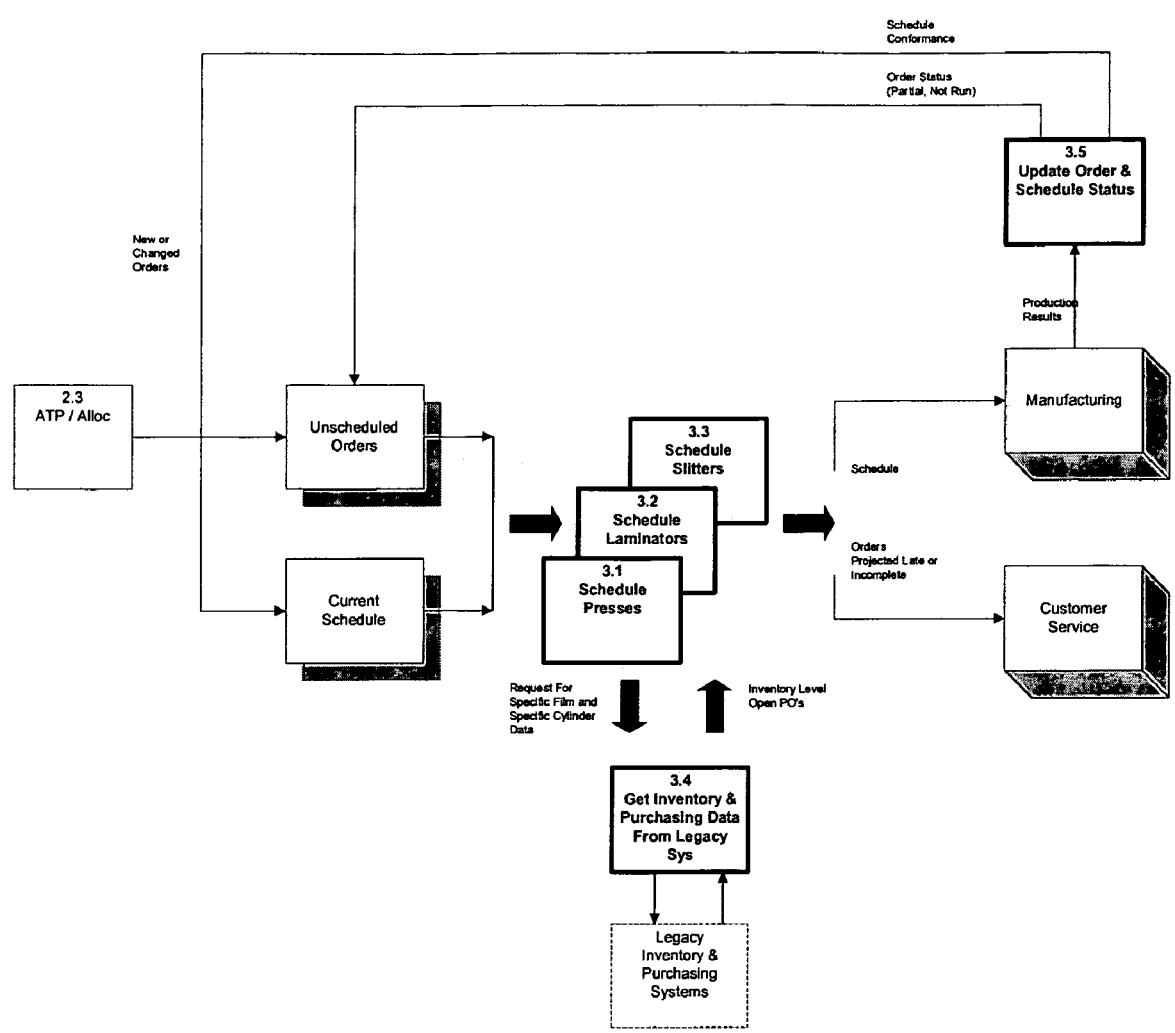
FIG. 11 is a flow diagram setting forth an overview of the Schedule Orders processes of the current invention. See also paragraphs [00178]-[00194] of the specification.

For all materials
Enter material number
Lookup on Material DB using material #: material description
Enter material, width, gauge, quantity required to produce basis quantity
For all coatings
Enter material number
Lookup on Material DB using material #: material description
Enter material, coating weight, coating units, quantity required to produce basis quantity
Click on Ink Bill of Materials button
Notes
None FIG. 10E shows an exemplary monitor view of Process 2.6.3, which is achieved according to the following computer programming specifications:
Initial Processing
None
User Workflow & Resultant Processing
Typical
For all materials
Enter material number
Enter coating weight
Enter % solids
Calculate Quantity=(BasisImpressions*cutoff*width/1000/1000)*coating weight*% coverage*% solids/1000
Notes
None To fill an accepted order, its production must be scheduled. The purpose of the scheduling process is to sequence orders in a way that optimizes the effectiveness of manufacturing assets while still meeting customer delivery requirements. FIG. 11 provides a detailed graphical overview of the scheduling process in accordance with the present invention.

Scheduling begins with a set of new or changed orders that have passed ATP/Allocation in the order management process. These orders have been accepted based on capacity and resource availability in a specific production bucket (day or week) to meet the promised date. The scheduling process defines the specific line and time an order will run, thus converting a capacity commitment into executable instructions for production.

When an order is scheduled (Process 3.1 for presses, Process 3.2 for laminators and Process 3.3 for slitters), inventory and purchasing data is retrieved from existing system(s) (Process 3.4). This data is used to project inventory levels and determine the availability of the packaging film and cylinders (plates) at the specific date and time an order is scheduled to run in manufacturing. This check of packaging film and cylinders (plates) improves schedule conformance by preventing raw material shortages. With this information in hand, the order is added to an existing schedule (at the beginning, at the end or in the middle of the schedule).

The scheduling process automatically recalculates the entire schedule whenever an order is added or removed from the schedule. This recalculation involves detailed changeover and line speed calculations to accurately quantify start and end times. This instantaneous recalculation is a powerful decision tool for schedulers. Presses, laminators and slitters are scheduled in a similar way, using different formulas for changeover and line speed calculations.

The completed schedule is sent to manufacturing for execution. A list of projected late or incomplete orders are sent to customer service so that appropriate action(s) can be taken. As the schedule is run, manufacturing updates are added to the system of the present invention (Process 3.5) to support projections of order status and schedule conformance. This data is used to adjust the start time for the next period (manufacturing may be running ahead or behind schedule).

Figure 11A:
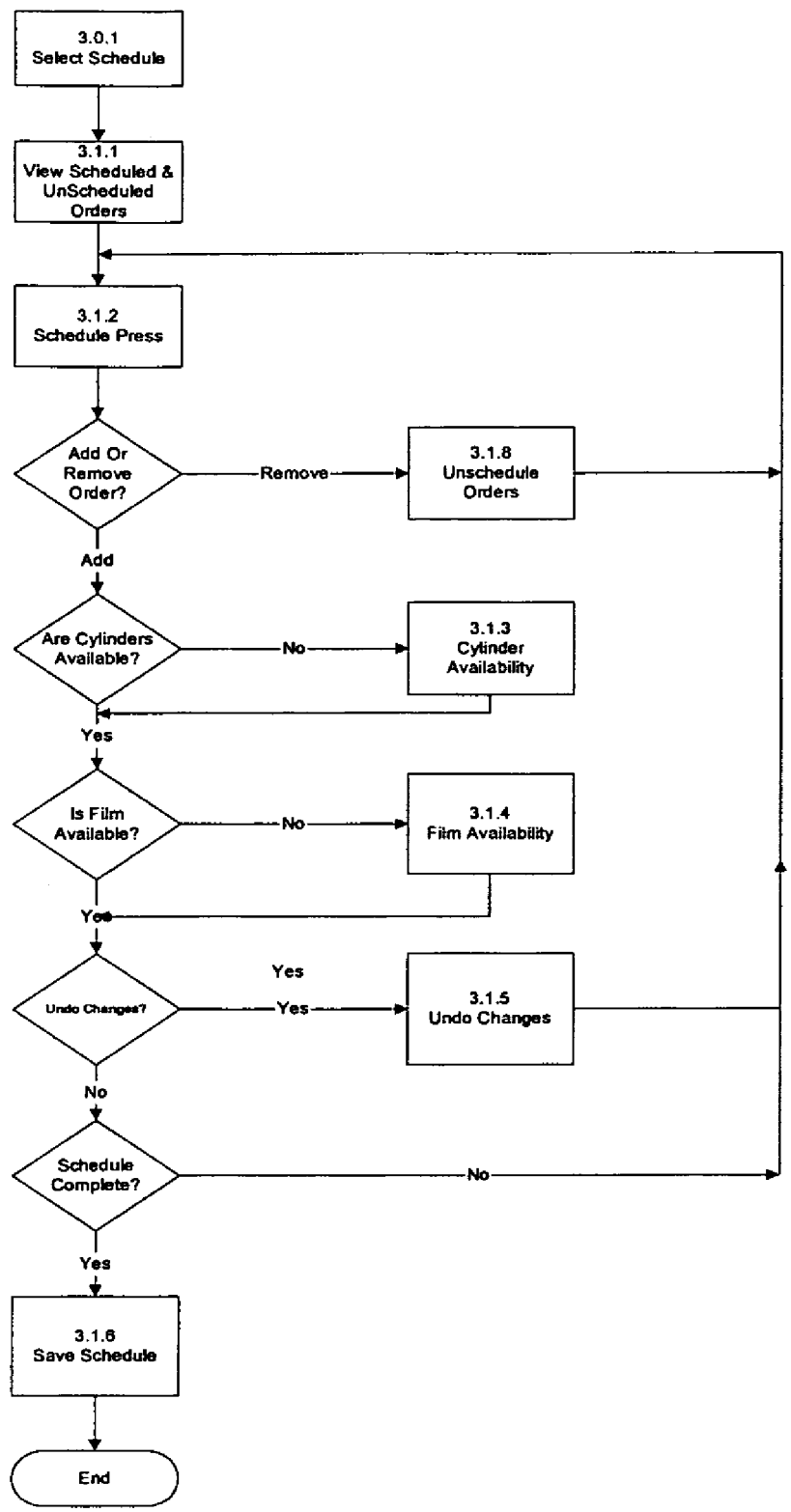
FIG. 11A is a flow diagram setting forth an overview of the process for scheduling presses of the Schedule Order processes of the current invention. See also paragraph [00183] of the specification.

FIGS. 11A-11L provide detailed descriptions of the scheduling process steps represented in FIG. 11 according to an embodiment of the present invention. FIG. 11A generally describes the scheduling process for presses (Process 3.1) as follows:

Select a Schedule (Process 3.0.1). Gives the user the ability to select the schedule they would like to work on. A user may have several "versions" of a schedule.

View Scheduled & Unscheduled Orders (Process 3.1.1). Gives the user split screen capability (of the schedule they have selected) to view a line schedule on one side and a specified group of unscheduled orders on the other side of the screen.

Schedule Press (Process 3.1.2). Gives the user the ability to schedule a press by selecting the job to schedule and dragging it onto the schedule in the desired position. The schedule is automatically adjusted. Scheduling statistics and job indicator lights are provided to help the user assess the impact of the change.

Cylinder Availability (Process 3.1.3). When a job is scheduled there is an instantaneous check on available print cylinders. If any of the cylinders are not going to be ready then this transaction will show the user the status and projected compete dates on the cylinders.

Film Availability (Process 3.1.4). When a job is scheduled there is an instantaneous check on film availability. If film is not going to be ready then this transaction will show the user a view of film inventory. The user can do a query on film sizes that are close to the desired size and may elect to "use" some of film for this job.

Figure 11B:
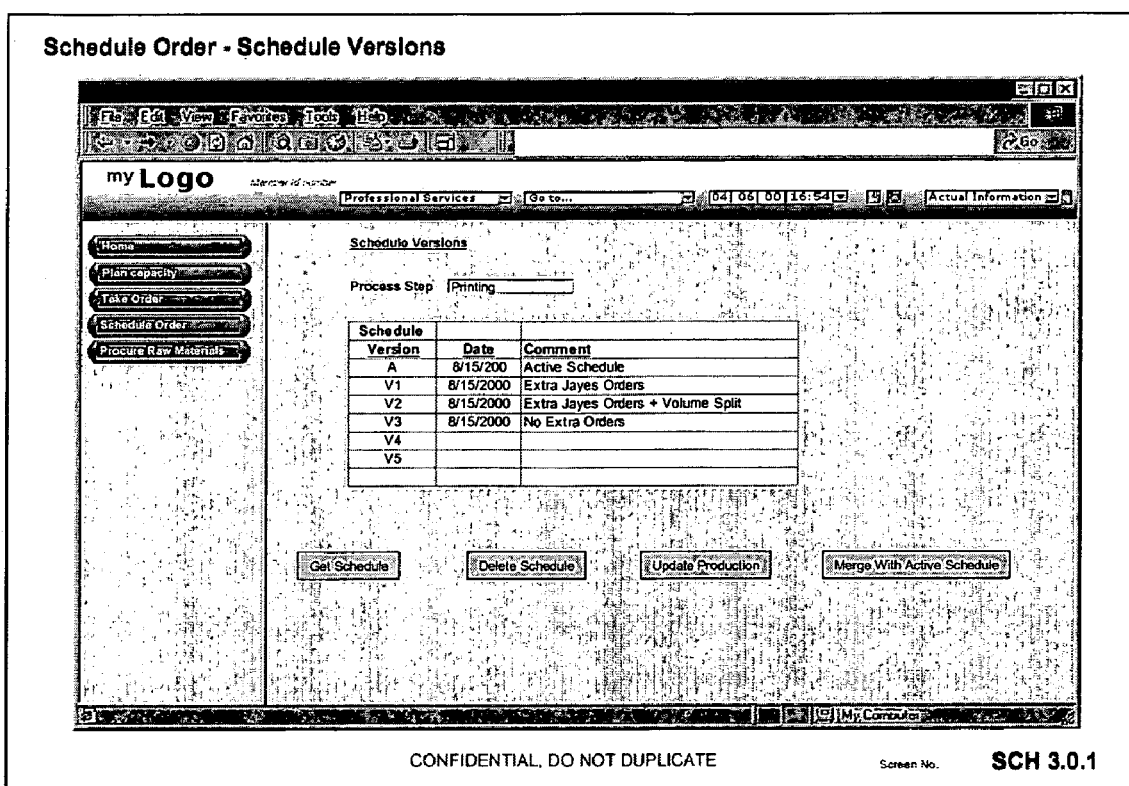
FIG. 11B is an exemplary monitor view of the Select Schedule process of the Schedule Order processes of the current invention. See also paragraph [00184] of the specification.
Figure 11C:
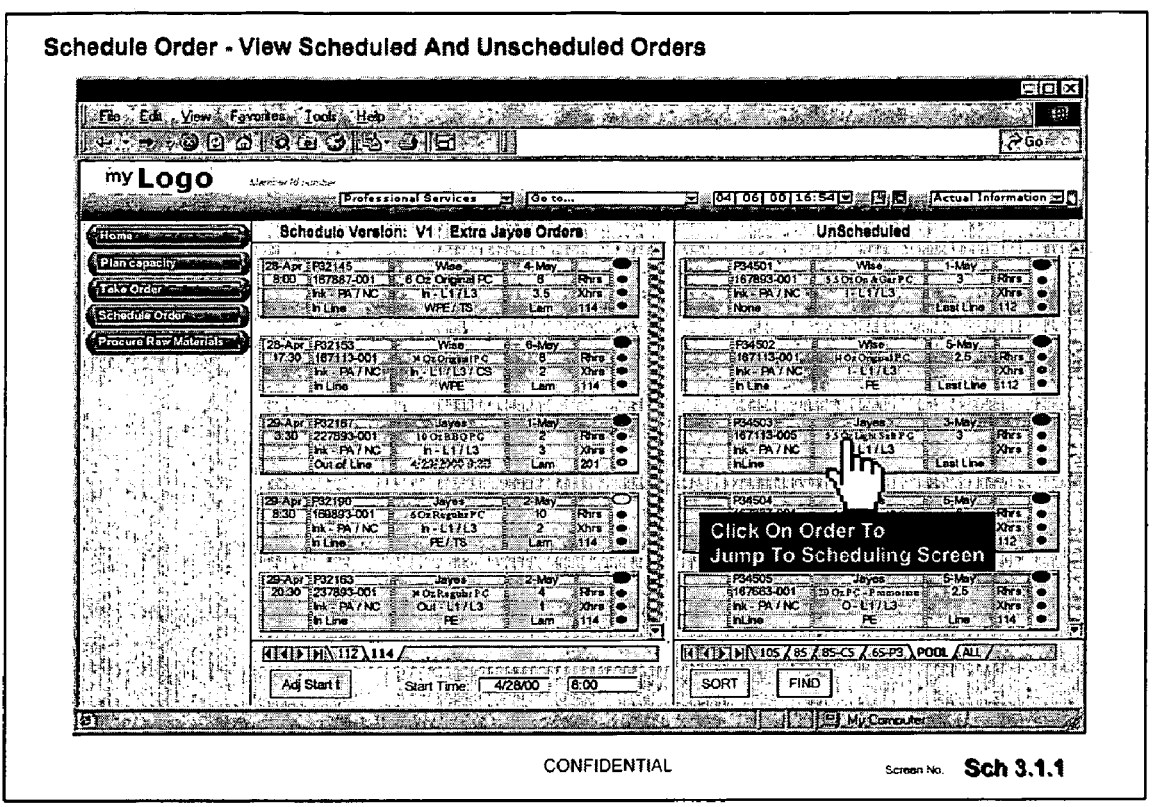
FIG. 11C is an exemplary monitor view of the View Scheduled and Unscheduled Orders process of the Schedule Order processes of the current invention. See also paragraph [00185] of the specification.

FIG. 11B shows an exemplary monitor view of Process 3.0.1, which is achieved according to the following computer programming specifications:

Initial Processing
Default process step to printing
Lookup and display existing schedule version data on the schedule-version db using converter-no and process step User Workflow & Resultant Processing
Typical
    Change process step
    Lookup and display existing schedule version data on the schedule-version db using converter-no and process step
    Click and highlight desired version
    Click on the Get Schedule button
To Build Version PVX (Print Version X) Scheduled Orders for Line L for the Next Screen
    Join Order DB and ScheduleDB (only records where schedule DB records exist)
    Select all orders with printstatus (OrderDB)="unscheduled"
    Select all orders with schedule line (ScheduleDB)="L" (default to lowest line number to build first tab on next screen)
    Select all orders with version (ScheduleDB)="X"
    Sort orders on sequence #
    Get PVX start date and time from the schedule-timeDB using process-step="Print", Version="X", and Line-no="L"
    Starting with first order (in sorted sequence) and continuing through the list, calculate start time, run time, and changeover time
    Build "Schedule PVX" pane for the default line, this will be the first display pane on the next screen.
    Build the other scheduled line panes in the background.
To Build Version PVX (Print Version X) Unscheduled Orders for the Next Screen
    Join order DB and schedule DB (using all order records)
    Select all orders with Print-Status="Unscheduled"
    Select all orders with Version NOT="X" (these should be all of the unscheduled orders for version X)
    Sort the unscheduled orders based on capacity group, on customer on item description.
    Default capacity group to the first alphabetical group and select those orders. Build the unscheduled PVX pane for that capacity group. This will be starting display pane for the unscheduled orders on the next screen.
    Build the other unscheduled capacity group panes in the background.
Exceptional
    Delete schedule button—The user highlights a schedule and presses the delete schedule button. Note: You are not allowed to delete the active schedule. If you want to get rid of the active schedule, you must pull it up (get schedule) and unschedule the orders.
        Get the ScheduleDB and get all of the records with schedule version="X" (the version to delete).
        Delete these records
    Update production button—The user presses the update schedule button.
        Join the ScheduleDB and the OrdersDB
        Select all records with Scheduleversion="A"
        Build the display for transaction UP 1.0.1
    Merge with Actual Schedule button—The user highlights a schedule and presses the merge with actual schedule button.
        Join the OrderDB and ScheduleDB (only records where ScheduleDB records exists).
        Select all records with version="A" or version="X"
        Sort on Line number on version on sequence number (this should segment by line, putting all active schedule jobs first, then VX jobs).
        For each line number, renumber sequence from 1 to N.
Notes
None FIG. 11C shows an exemplary monitor view of Process 3.1.1, which is achieved according to the following computer programming specifications:

Initial Processing
See transaction SCH 3.0.1 for details on how to build the "tab panes" for this screen.
Get start date and start time from the schedule-timeDB process-step="Print", Version="X", and Line-no="L"

User Workflow & Resultant Processing
Typical
    Go to scheduled portion of the screen and click on the tab for the line # to be scheduled
    Go to the unscheduled portion of the screen and click on the tab for the group of orders to be used as candidates for scheduling (this may be a capacity group, the pool, or all orders)
    Scroll through both sections of the screen and find order to be scheduled and the location for it.
    Click on the order to be scheduled
    Transfer control to transaction Sch 3.1.2 passing line number for scheduled orders and line number and order number for unscheduled orders.
Exceptional
    Adj Start t button—The user will change the displayed start date and start time and click on the Adj Start t button.
        Save the new start date and start time in the schedule time DB using process step, schedule V# and line-no.
        Starting with first order (in sorted sequence) and continuing through the list, calculate new start times.

New start time=start time from last job+run time from last job+changeover time to this job.

Sort button—The user will click on the sort button.
Bring up a sort menu with all of the order characteristics. Allow the user to pick "sort on" criteria and hit OK. Resort the unscheduled orders based on the sort criteria.

Find button—User will click on the find button
Bring up a find dialog box so the user can key in an order number. Search the unscheduled list and adjust the display to show the "find" order in the middle of the unscheduled window.

Notes

Initial processing for this screen should be done on transaction SCH 3.0.1. For performance reasons, it may make sense to build the default tabs in transaction SCH 3.0.1 and then build the subsequent tabs in the background.

Figure 11D:
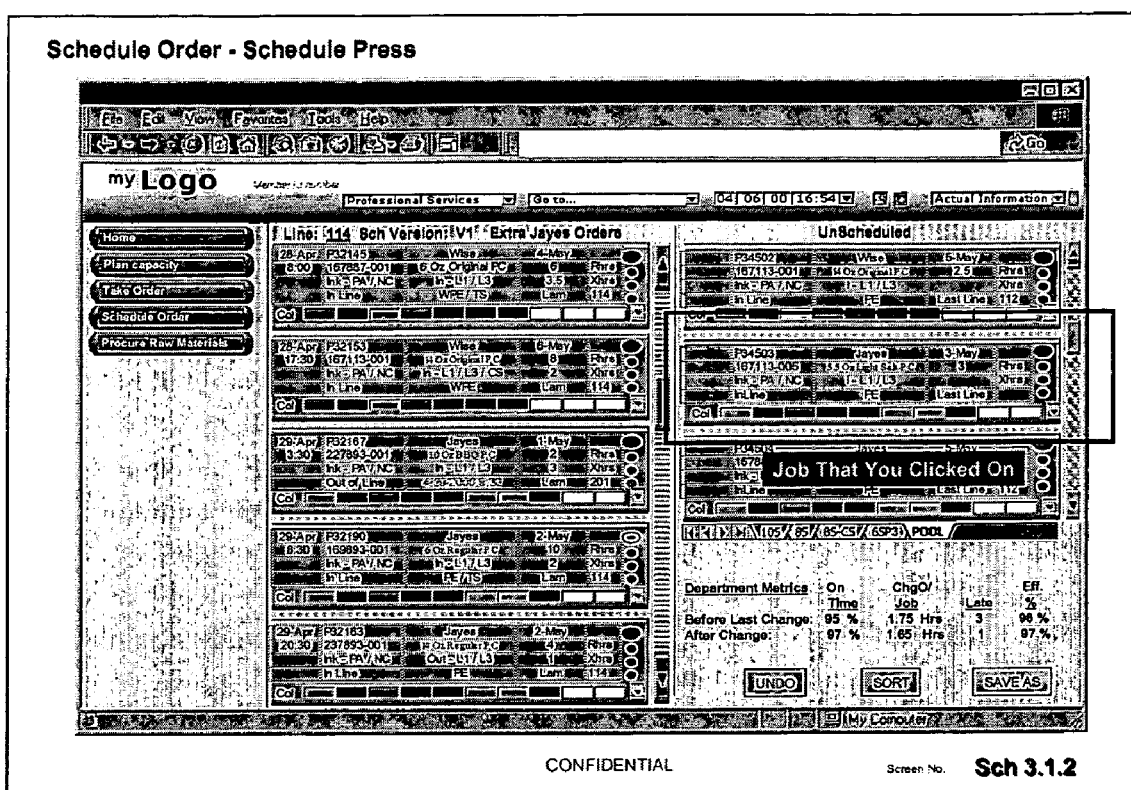
FIG. 11D is an exemplary monitor view of the Schedule Press process of the Schedule Order processes of the current invention. See also paragraph [00186] of the specification.

FIG. 11D shows an exemplary monitor view of Process 3.1.2, which is achieved according to the following computer programming specifications:

Initial Processing

Use the datasets created in SCH3.1.1.

Build the job bars using DB information from the orders DB.

Indicator lights
Top light—Ontime light
=green if xworks date−ship date>2,
=yellow if xworks ship date−xworks-date<=2
=red if xworkds ship date−xworkds-date<0
Next light—Film light
=green if film exists
=yellow if film arrives on production day
=red if no film
Next light—Cylinder
=green if cylinders exists
=yellow if cylinders arrives on production day
=red if no cylinders by production day
Next light—Next Step light
=green if xworks date for next step>this step
=yellow if xworks date for next step=this step
=red if xworks step for next step<this step User Workflow & Resultant Processing Typical
User will scroll through the scheduled orders and look for a good position to schedule the order they are interested in
User will go to the unscheduled portion of the screen and click on the order they want to schedule.
User will drag the order to the position on the scheduled portion of the screen that they want to schedule the order
Execute Alg Schedule Order
User will review the department metrics and schedule indicator lights Exceptional
Undo button—The user clicks on the "undo" button.
Remove (undo) the last order scheduled
Recalculate the changeover times
Recalculate the start times
Recalculate the department metrics Sort button—The user will click on the sort button.
Bring up a sort menu with all of the order characteristics. Allow the user to pick "sort on" criteria and hit OK. Resort the unscheduled orders based on the sort criteria.

Save As button—The user will click on the Save As button.
Bring up a file save dialog box and allow the user to save the schedule as V1, V2, V3, V4, V5. If one of those already exists, ask the user if they want to overwrite it.
Take all of the scheduled orders and go to the scheduleDB and change the Version column to the Save as X version. For example, the user may have originally done a "get schedule" on version V1, made some changes and decided to save as V2.

Notes

None

Figure 11E:
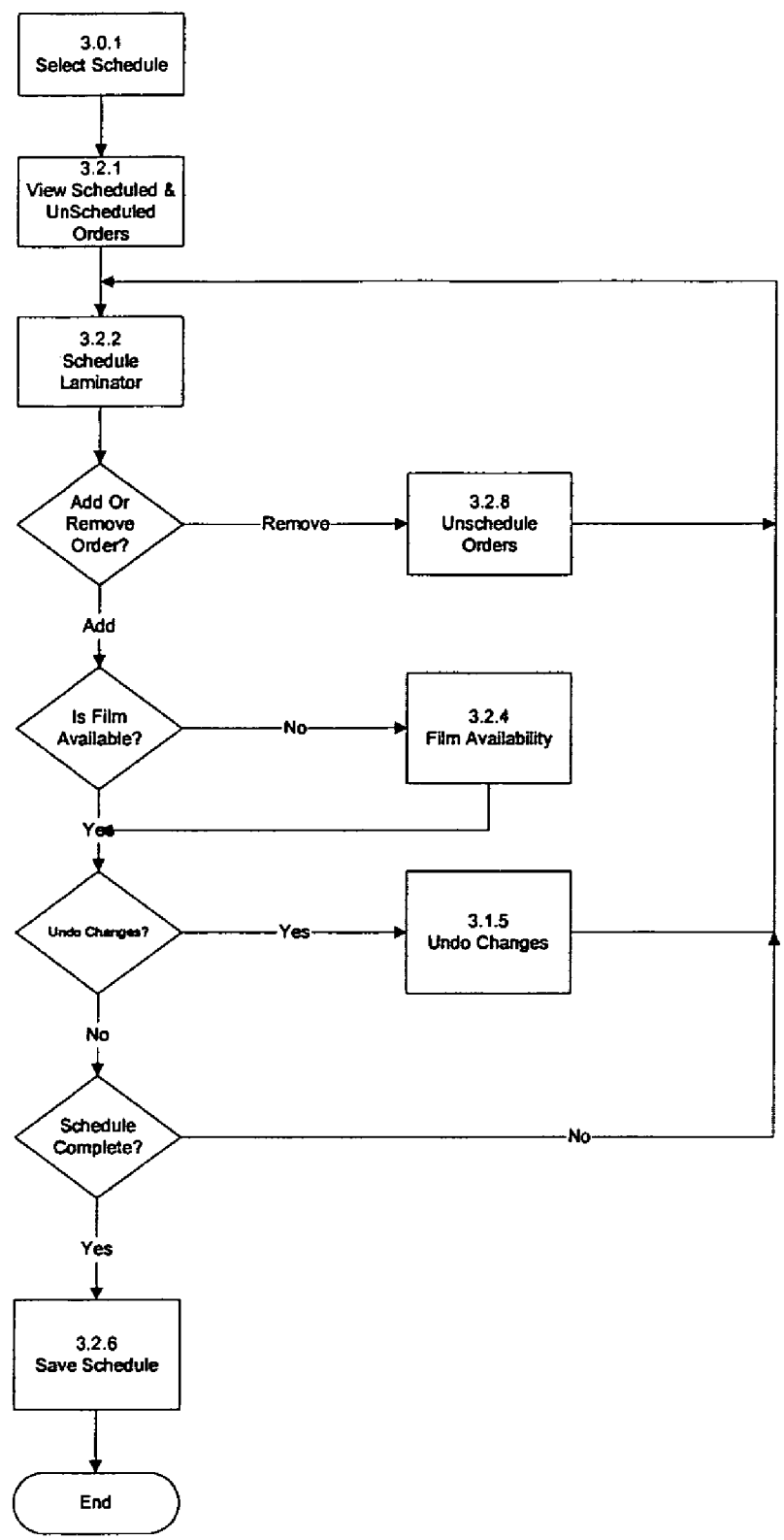
FIG. 11E is a flow diagram setting forth an overview of the process for scheduling laminators of the Schedule Order processes of the current invention. See also paragraph [00187] of the specification.

FIG. 11E generally describes the scheduling process for laminators (Process 3.2) as follows:

Select a Schedule (Process 3.0.1). Gives the user the ability to select the schedule they would like to work on. A user may have several "versions" of a schedule.

View Scheduled & Unscheduled Orders (Process 3.2.1). Gives the user split screen capability (of the schedule they have selected) to view a line schedule on one side and a specified group of unscheduled orders on the other side of the screen.

Schedule Laminator (Process 3.2.2). Gives the user the ability to schedule a laminator by selecting the job to schedule and dragging it onto the schedule in the desired position. The schedule is automatically adjusted. Scheduling statistics and job indicator lights are provided to help the user assess the impact of the change.

Film Availability (Process 3.2.4). When a job is scheduled there is an instantaneous check on film availability. If film is not going to be ready then this transaction will show the user a view of film inventory. The user can do a query on film sizes that are close to the desired size and may elect to "use" some of film for this job.

Figure 11F:
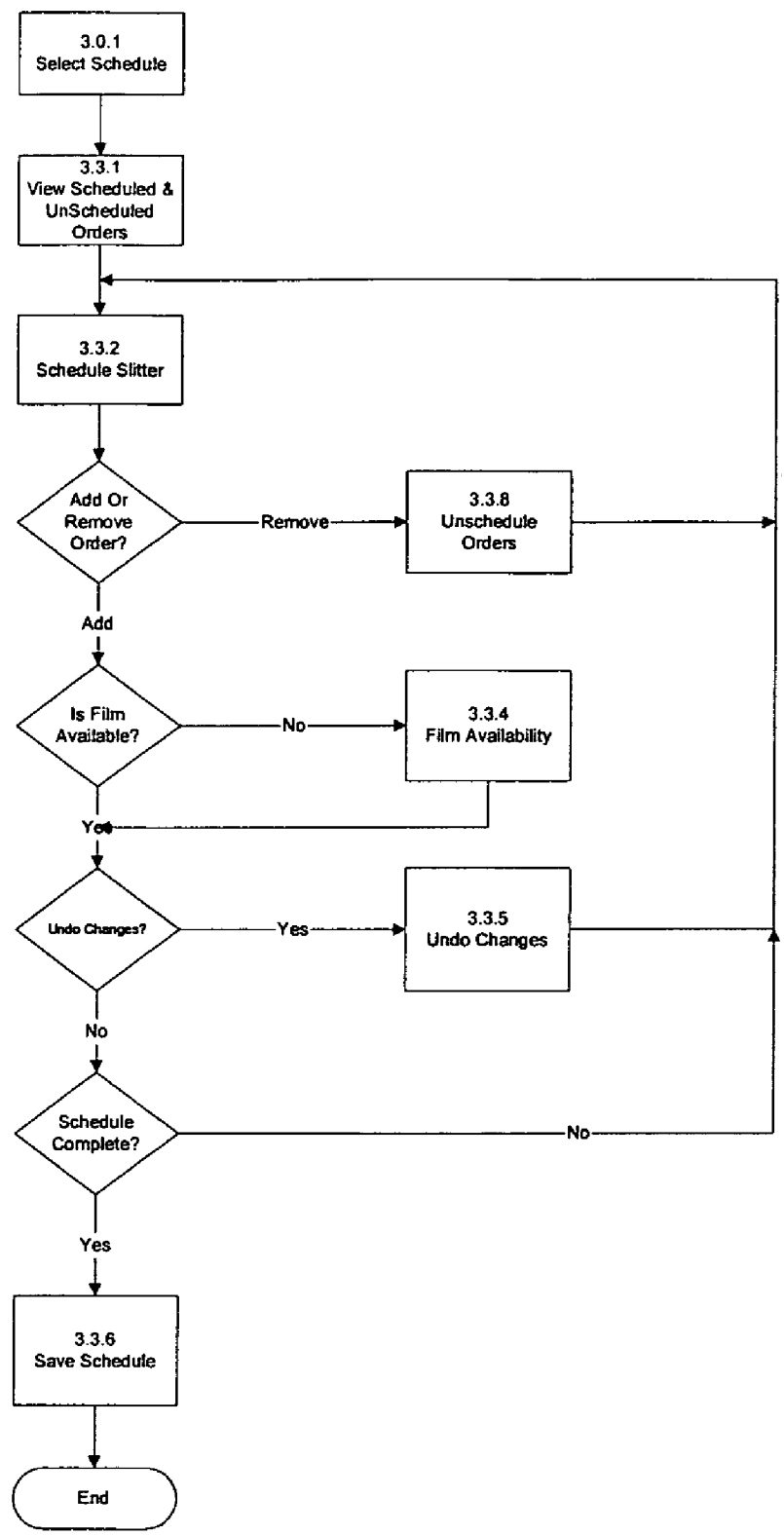
FIG. 11F is a flow diagram setting forth an overview of the process for scheduling slitters of the Schedule Order processes of the current invention. See also paragraph [00188] of the specification.

FIG. 11F generally describes the scheduling process for slitters (Process 3.3) as follows:

Select a Schedule (Process 3.0.1). Gives the user the ability to select the schedule they would like to work on. A user may have several "versions" of a schedule.

View Scheduled & Unscheduled Orders (Process 3.3.1). Gives the user split screen capability to select a line schedule on one side and a specified group of unscheduled orders on the other side of the screen.

Schedule Slitter (Process 3.3.2). Gives the user the ability to schedule a slitter by selecting the job to schedule and dragging it onto the schedule in the desired position. The schedule is automatically adjusted. Scheduling statistics and job indicator lights are provided to help the user assess the impact of the change.

Figure 11G:
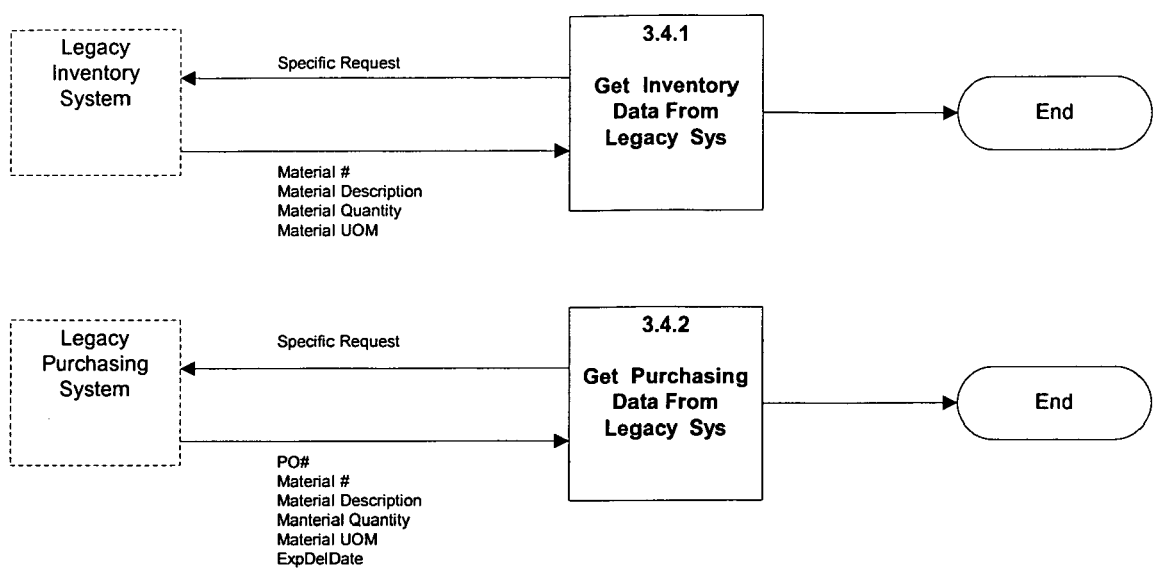
FIG. 11G is a flow diagram setting forth an overview of the Inventory/Purchasing Interface processes of the Schedule Order processes of the current invention. See also paragraph [00189] of the specification.

FIG. 11G generally describes the Inventory/Purchasing Interface processes (Processes 3.4.1 and 3.4.2) as follows:

Get Inventory Data From Legacy System (Process 3.4.1). As orders are scheduled, inventory data on the required film and cylinders is retrieved from the legacy system. This data is used for raw material availability checking.

Get Purchasing Data From Legacy System (Process 3.4.2). As orders are scheduled, purchasing data on the required film and cylinders is retrieved from the legacy system. This data is used for raw material availability checking.

Figure 11H:
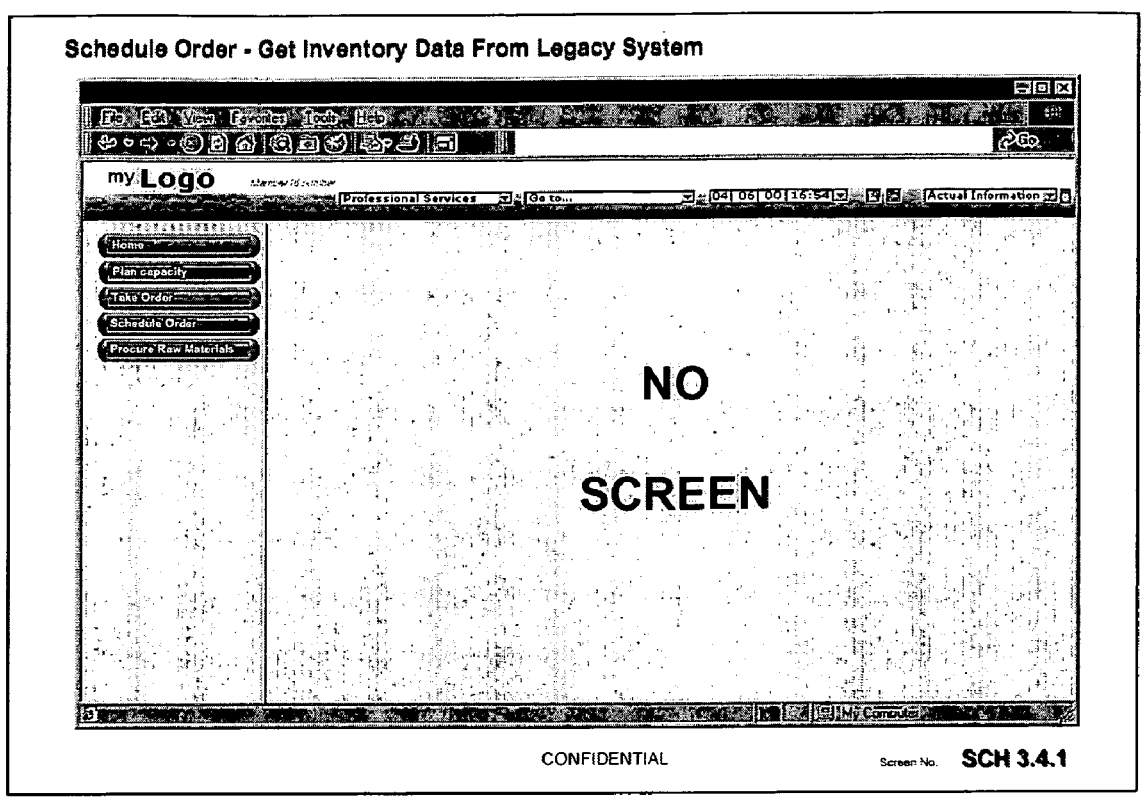
FIG. 11H is an exemplary monitor view of the Get Inventory Data from Legacy Order Management System process of the Schedule Order processes of the current invention. See also paragraph [00190] of the specification.
Figure 11I:
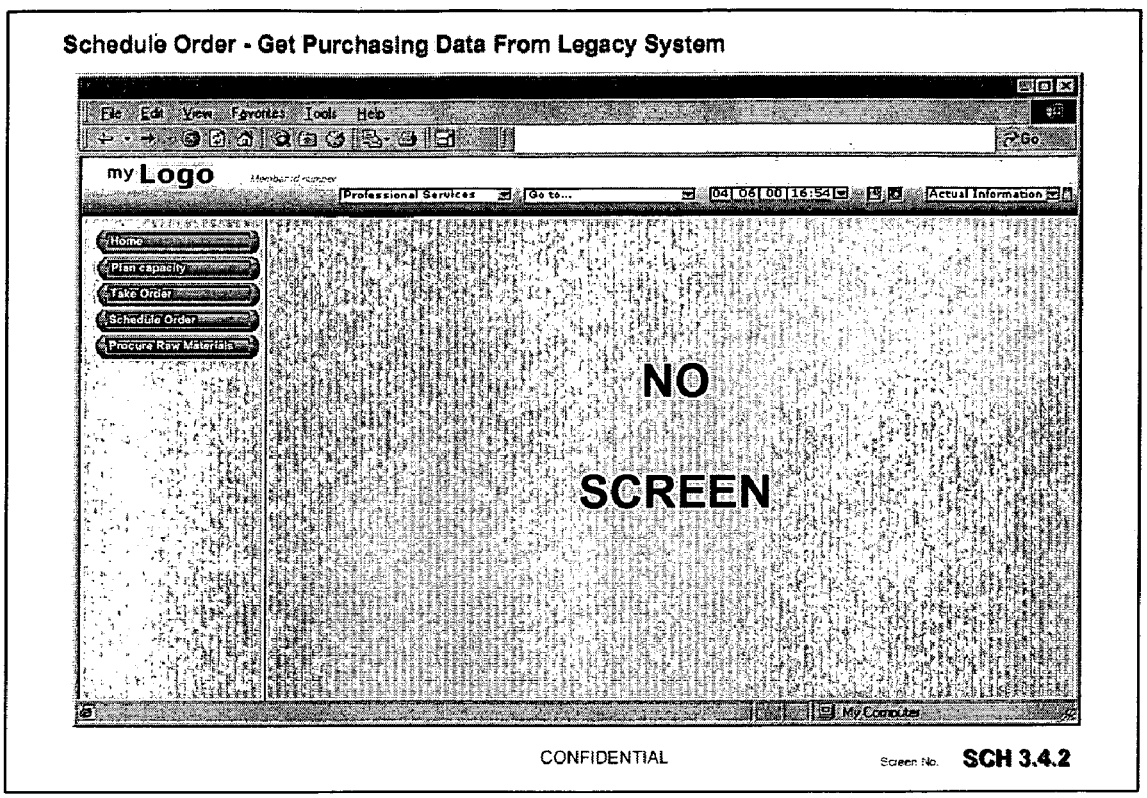
FIG. 11I is an exemplary monitor view of the Get Purchasing Data from Legacy Order Management System process of the Schedule Order processes of the current invention. See also paragraph [00191] of the specification.
Figure 11J:
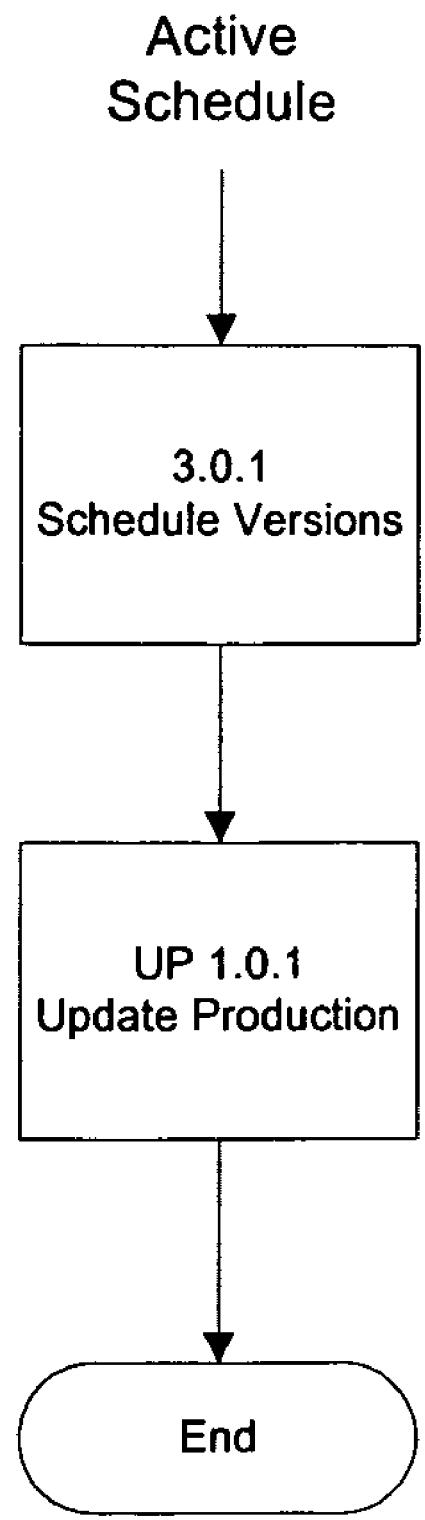
FIG. 11J is a flow diagram setting forth an overview of the Update Order and Schedule Status process of the Schedule Order processes of the current invention. See also paragraph [00192] of the specification.

FIG. 11H shows an exemplary monitor view of Process 3.4.1, which is achieved according to the following computer programming specifications:
Initial Processing
Receive order number and item number from SCH 3.1.2
Get Bill of Material (BOM) items from BOM DB using Item number
For each BOM item with class="Film", send request to inventory legacy system
Store returned inventory values
For each BOM item with class="Cylinder", send request to inventory legacy system
Store returned inventory values
User Workflow & Resultant Processing
Typical
Notes
None FIG. 11I shows an exemplary monitor view of process 3.4.2, which is achieved according to the following computer programming specifications:
Initial Processing
Receive order number and item number from SCH 3.1.2
Get BOM items from Bom DB using Item number
For each BOM item with class="Film", send request to purchasing legacy system
Store returned purchasing values
For each BOM item with class="Cylinder", send request to purchasing legacy system
Store returned purchasing values
User Workflow & Resultant Processing
Typical
Notes
None FIG. 11J generally describes the Update Order and Schedule Status process (Process 3.5) as follows:
Schedule Versions (Process 3.0.1). The update production screen is accessed from the schedule versions screen. You may only update the active schedule from this screen. From the screen, push the "Update Production" button.
Update Production (Process UP1.0.1) From this screen, the user can update the schedule and readjust the start time of the active job.

Figure 11K:
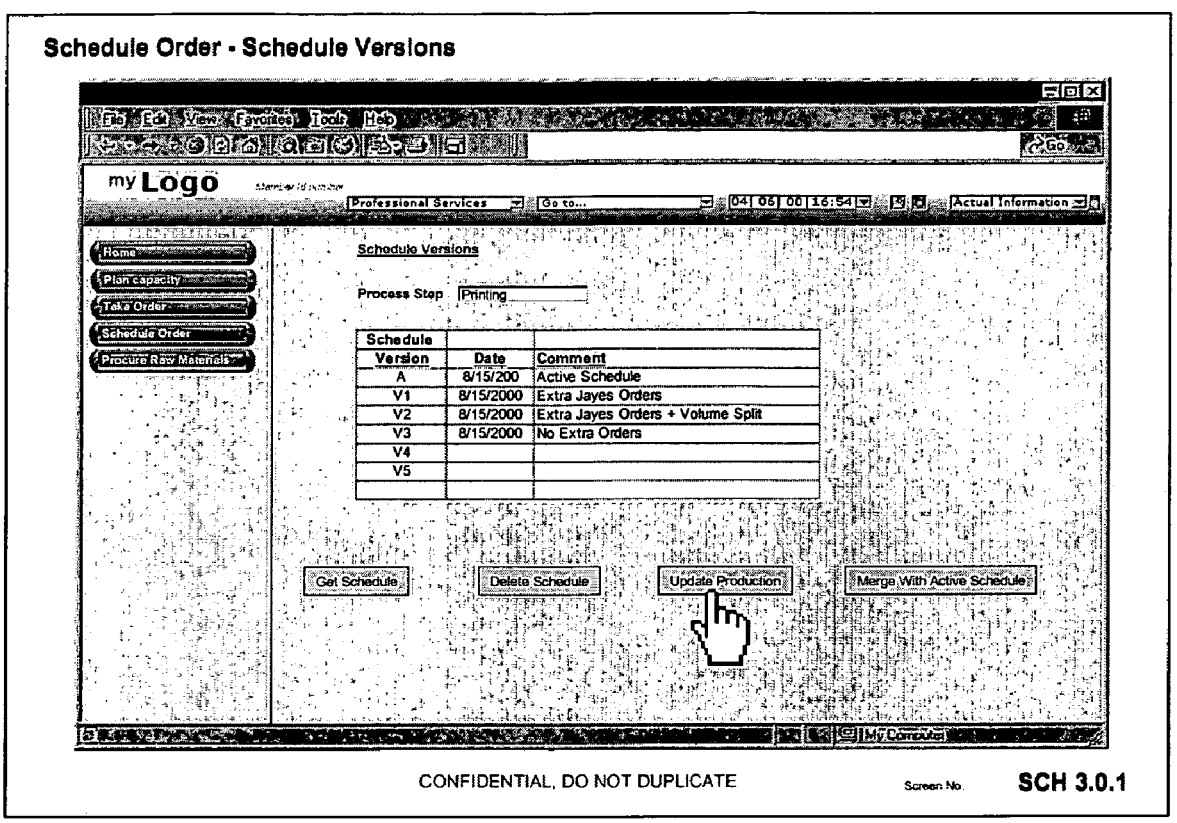
FIG. 11K is an exemplary monitor view of Schedule Versions process of the Schedule Order processes of the current invention. See also paragraph [00193] of the specification.
Figure 11L:
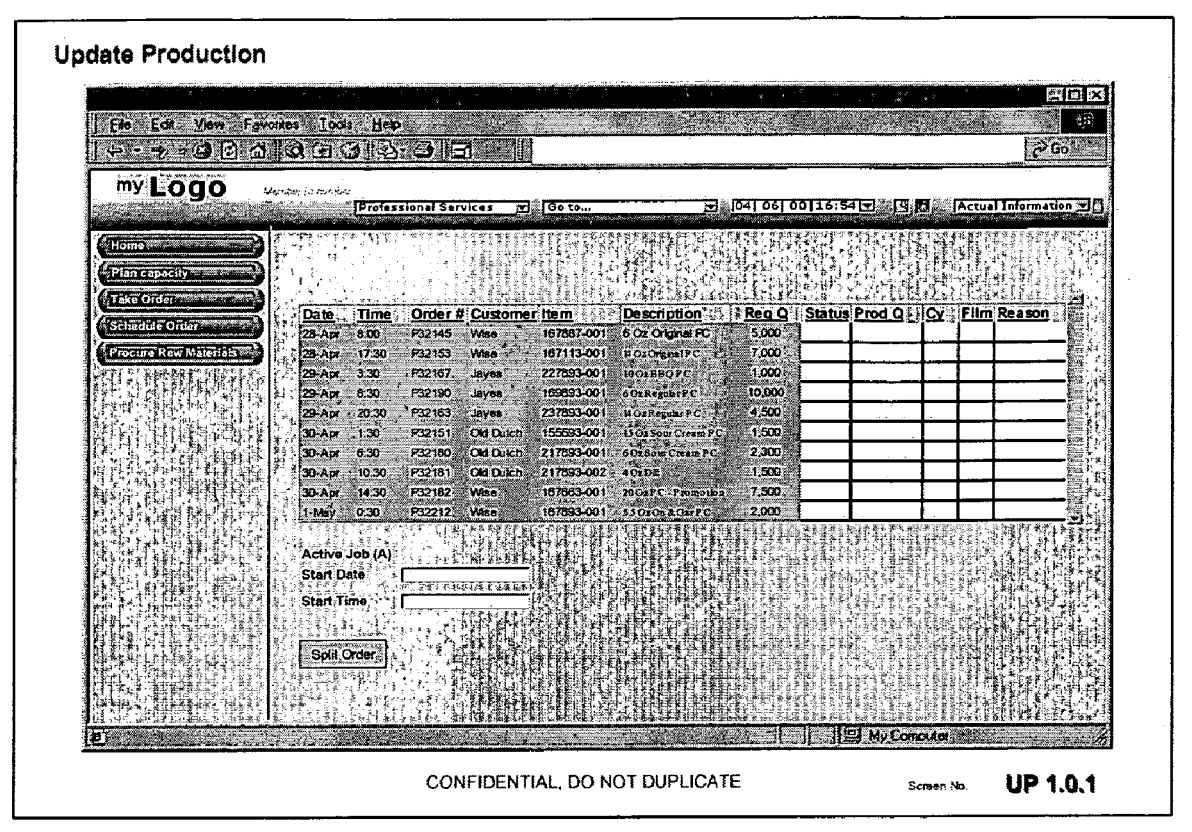
Figure 12:
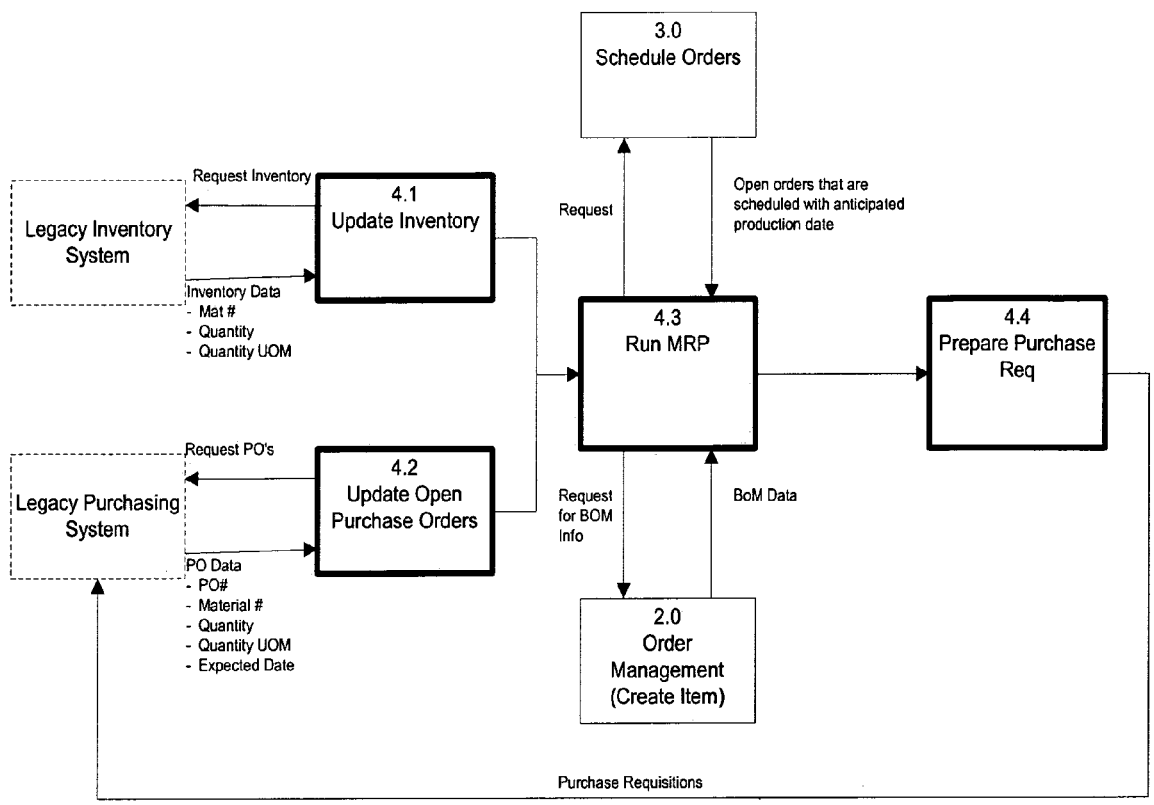
FIG. 12 is a flow diagram setting forth an overview of the Material Requirements Planning processes of the current invention. See also paragraphs [00195]-[00202] of the specification.

FIG. 11K shows an exemplary monitor view of Process 3.5.1, which is achieved according to the following computer programming specifications:
Initial Processing
Default process step to printing
Lookup and display existing schedule version data on the schedule-version db using converter-no and process step.
User Workflow & Resultant Processing
Typical
User will click on the "Update Production" button
System will lookup the Active schedule on the schedule DB and transfer control to UP1.0.1 Update Production.
Notes
None FIG. 11L shows an exemplary monitor view of Process UP 1.0.1, which is achieved according to the following computer programming specifications:
Initial Processing
Display input screen with first six fields filled in from the active schedule.
User Workflow & Resultant Processing
Typical
User will fill in the Status, Prod Q, Cy, Film, and Reason columns for all pertinent orders. See glossary section for a list of acceptable codes.
User will mark the active job in the status column with an "A" and put the actual start date and start time below in the Active Job section of the screen.
The system will resort and recalculate the start times for all of the active jobs left on the schedule.
Exceptional
User will highlight a row (order) and click on the "Split Order" button.
The system will split the order into two orders with a suffix of –A and –B.
The user will fill in the pertinent data columns for the split job.
Notes
None In order to produce packaging items and to schedule their production, it is necessary to make sure that materials necessary for the production of the packaging items are available when needed. This process is referred to as materials requirements planning. FIG. 12 provides a detailed graphical overview of the Material Requirements Planning Process ("MRP") in accordance with an embodiment of the present invention. The purpose of material requirements planning is to generate a requirements list so that raw materials can be ordered and ready in time for manufacturing. The material requirements planning process begins with loading inventory and purchase order data into the system of the present invention (Processes 4.1 and 4.2). This inventory and purchase order data is used to calculate stock levels of raw materials on a day-by-day basis. The comparison of this data to manufacturing requirements generates a net daily material requirement (Process 4.3). This net daily requirement is then "rolled up" into purchase requisitions which are transmitted back to the Legacy system to create purchase orders (Process 4.4).

Figure 12A:
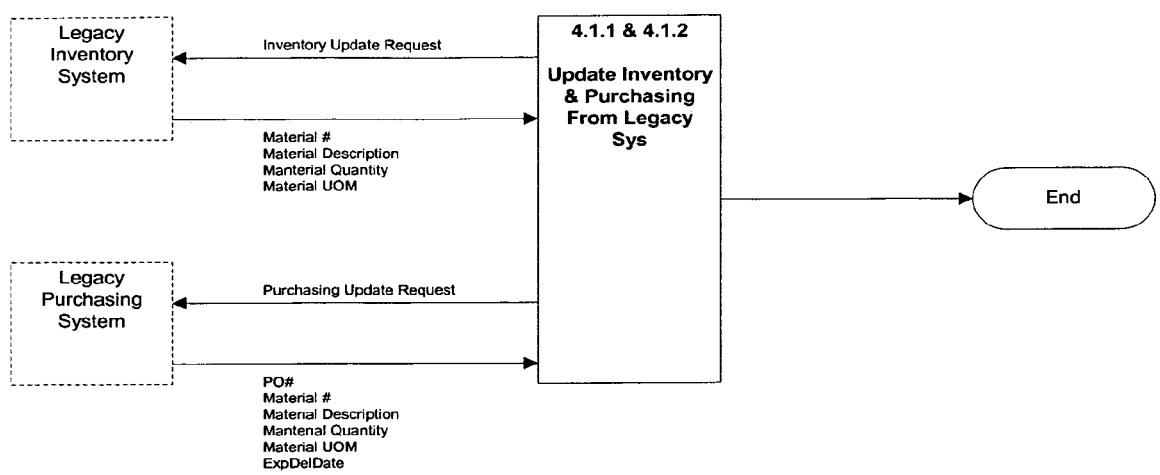
FIG. 12A is a flow diagram setting forth an overview of the Inventory/Purchasing Interface process of the Material Requirements Planning processes of the current invention. See also paragraph [00196] of the specification.

FIGS. 12A-12G provide detailed descriptions of the MRP steps represented in FIG. 12 according to an embodiment of the present invention. FIG. 12A generally describes the Inventory/Purchasing Interface of Processes 4.1 and 4.2 as follows:
Update Inventory & Purchasing From Legacy System (Processes 4.1.1 & 4.1.2). At the beginning of the MRP process it is critical to have an inventory load and PO load from the Legacy systems. Prior to the loading inventory and PO's will be cleared such that the Legacy load is a complete reload of data. This approach eliminates the problem of keeping 2 systems in synch. The legacy system is the master system and the present invention simply accepts the inventory and PO loads it is given.
The load is initiated via transactions 4.1.1 and 4.1.2, which request data from the Legacy system.
Inventory Request (4.1.1)
Legacy returns—For all raw materials:
Material #, material description, material quantity and material unit of measure
Purchasing Request (4.1.2)
Legacy returns—For all raw materials:
PO#, material #, material description, material quantity, material unit of measure, and the expected delivery date
The material numbers in the bills of material should be identical to the material numbers being used in the legacy system.

Figure 12B:
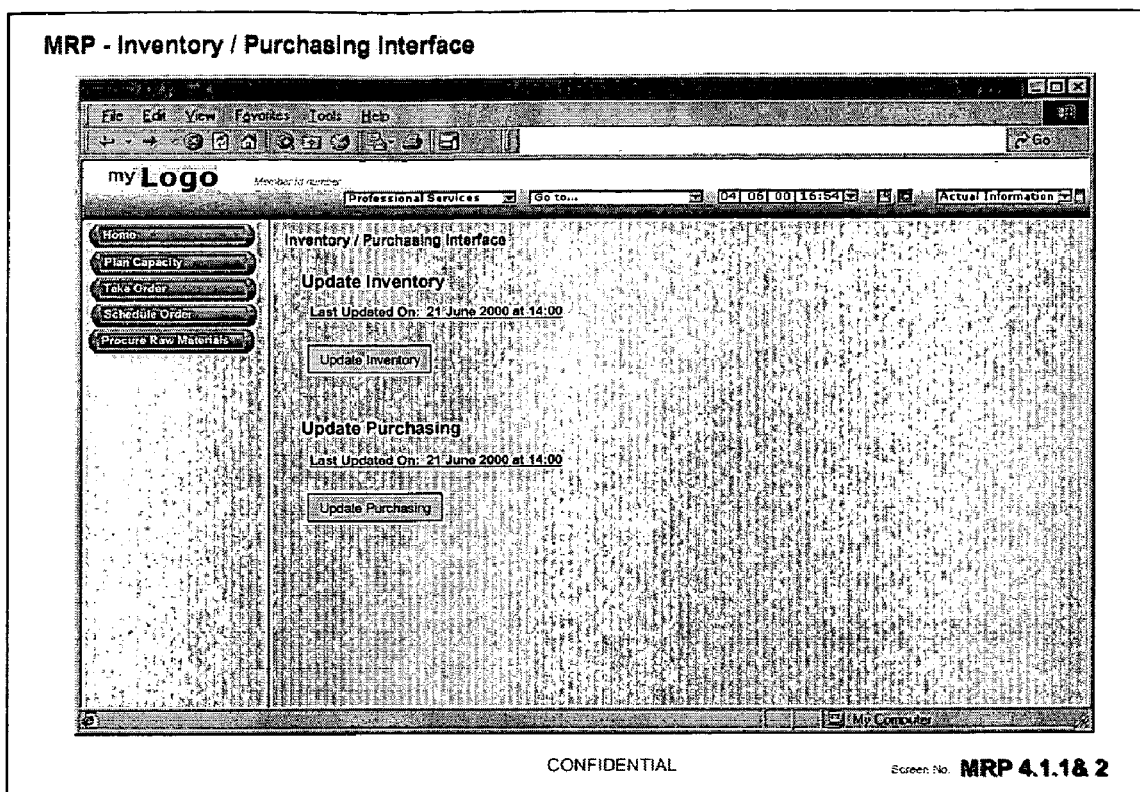
FIG. 12B is an exemplary monitor view of Inventory/Purchasing Interface process of the Material Requirements Planning processes of the current invention. See also paragraph [00197] of the specification.
Figure 12C:
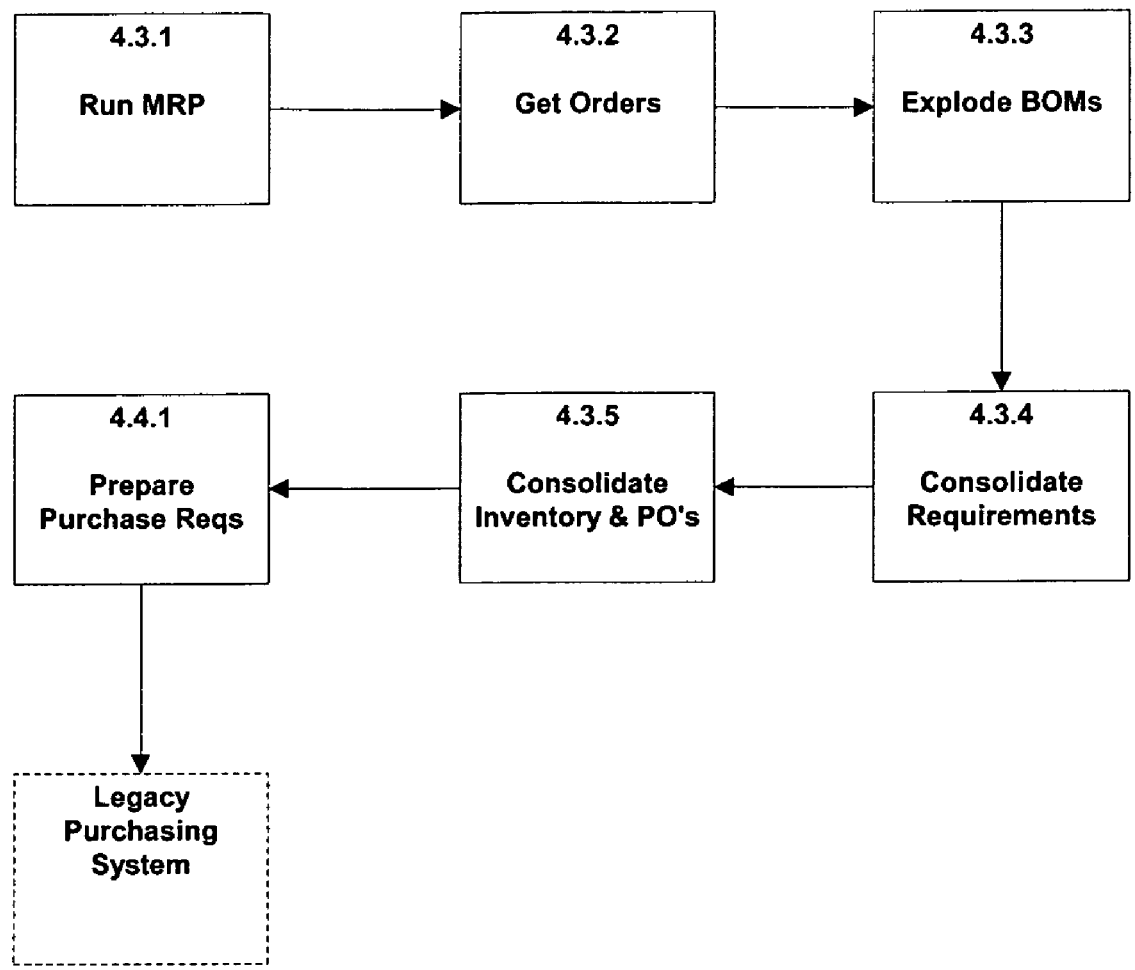
FIG. 12C is a flow diagram setting forth an overview of the Run Material Requirements Planning, Prepare Purchase Requirements process of the Material Requirements Planning processes of the current invention. See also paragraph [00198] of the specification.
Figure 12D:
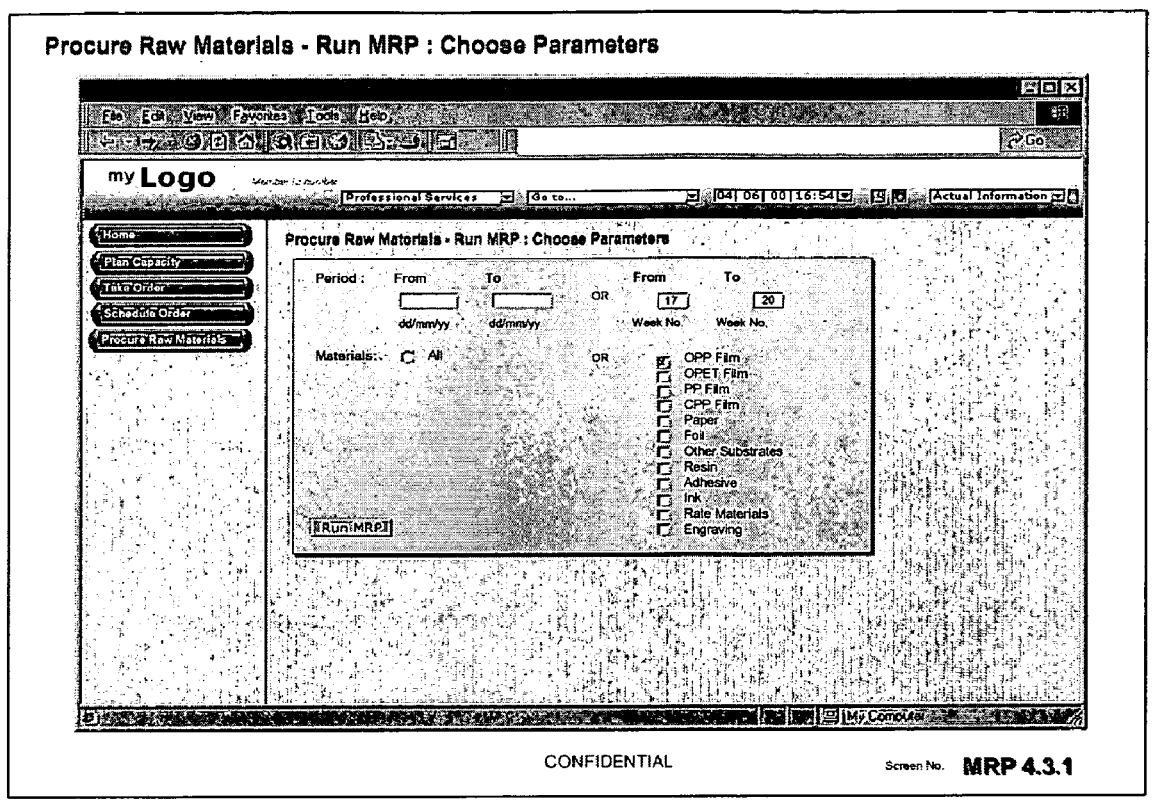
FIG. 12D is an exemplary monitor view of the Procure Raw Materials process of the Material Requirements Planning processes of the current invention. See also paragraph [00199] of the specification.
Figure 12E:
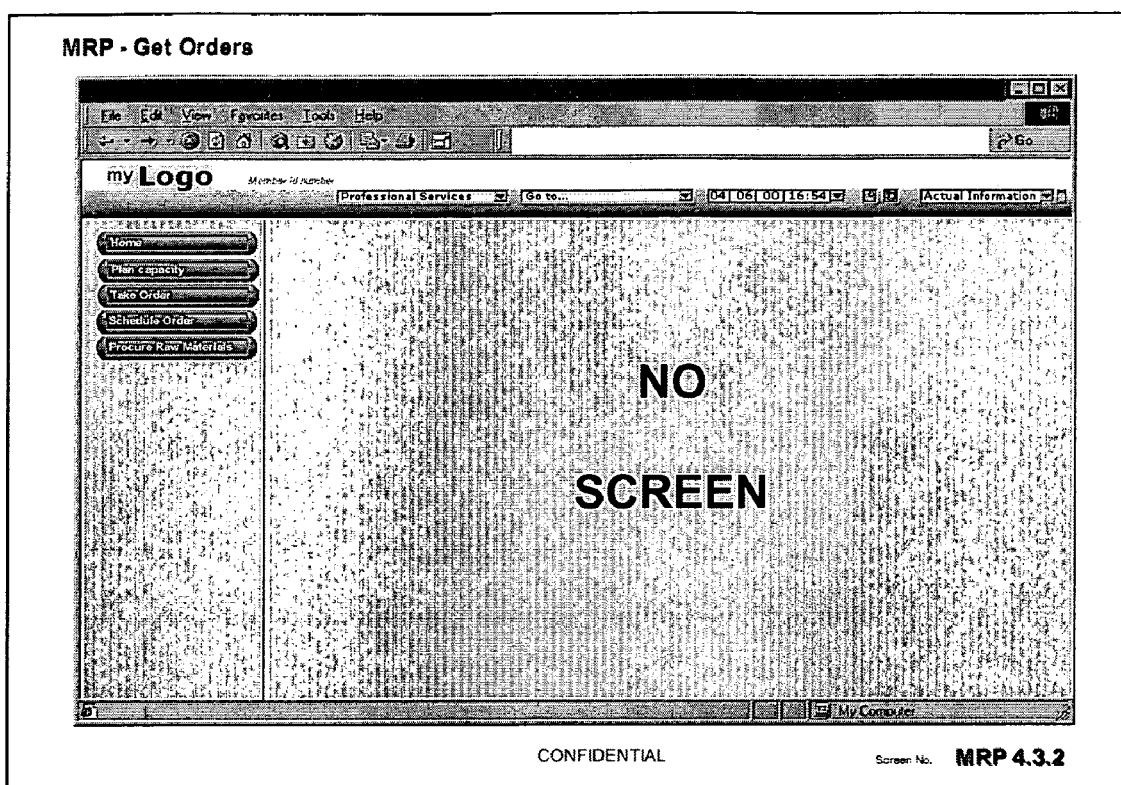
FIG. 12E is an exemplary monitor view of the Get Orders process of the Material Requirements Planning processes of the current invention. See also paragraph [00200] of the specification.
Figure 12:
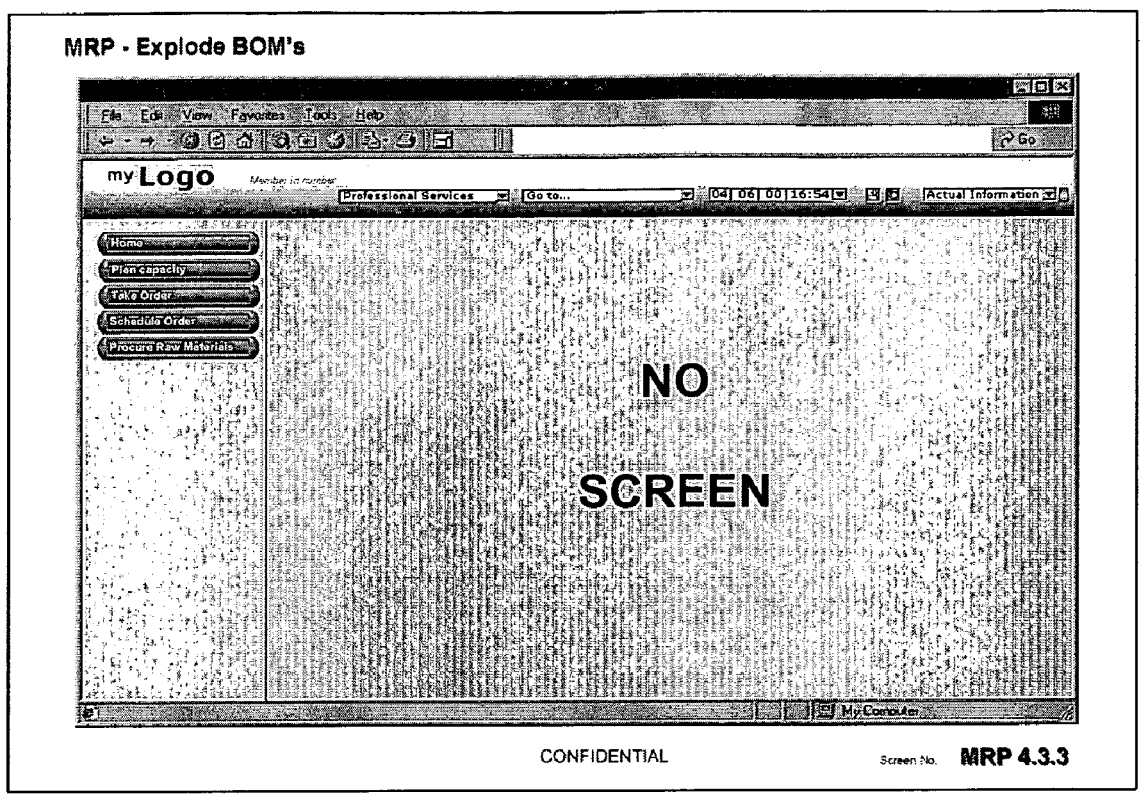
Figure 12G:
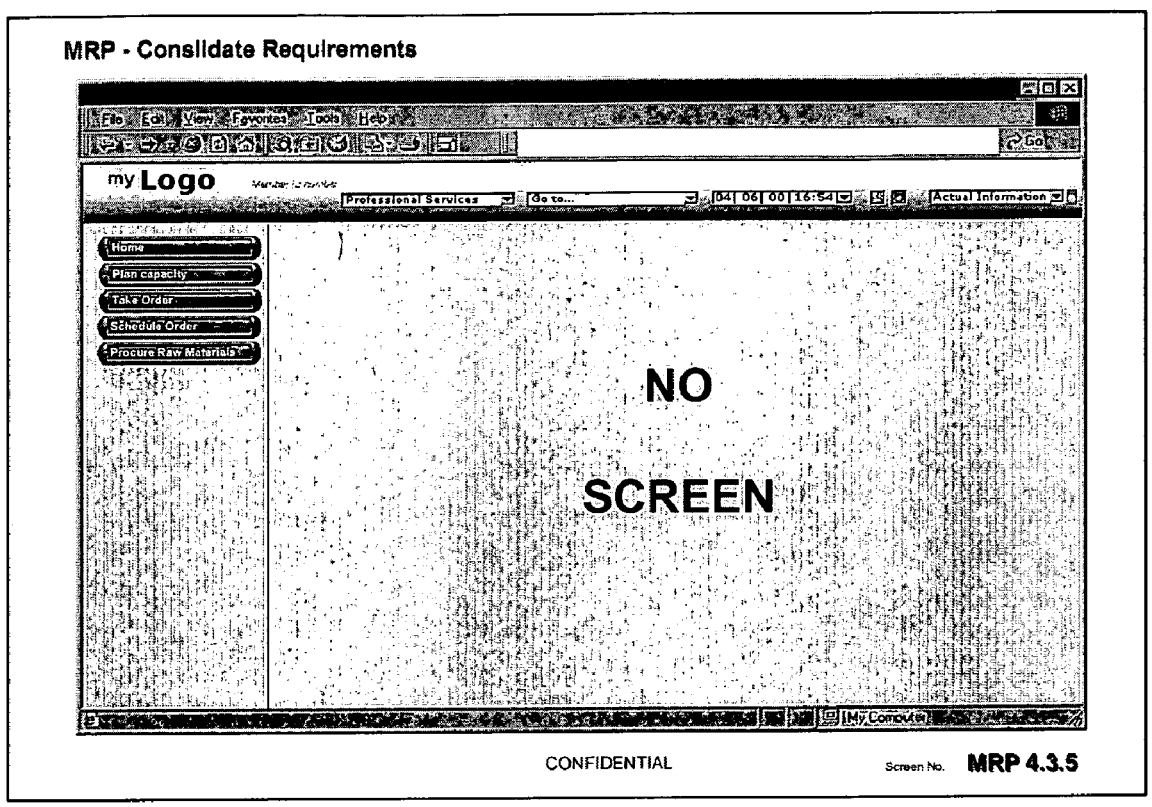
FIG. 12G is an exemplary monitor view of the Consolidate Requirements process of the Material Requirements Planning processes of the current invention. See also paragraph [00202] of the specification.

FIG. 12B shows an exemplary monitor view of Process 4.1.1. and 4.1.2, which are achieved according to the following computer programming specifications:
Initial Processing
Lookup date and time of previous download on Download DB
User Workflow & Resultant Processing
Typical
  User will click on Update Inventory
  User will click on Update Purchasing
Notes
None
FIG. 12D shows an exemplary monitor view of Process 4.3.1, which is achieved according to the following computer programming specifications:
Initial Processing
Lookup the current week number on CalenderDB
Default "From" to the current week and "To" to current week+3
User Workflow & Resultant Processing
Typical
  User will edit the from and to weeks or dates
  User will check off the materials that they would like to run MRP for
  User will click on the "Run MPR" button
  If user has filled in weeks, calculate the "from" and "to" dates using "from" and "to" weeks
  Get all orders on the Orders DB that have date-xworks-print or date-xworks-lam between these two dates
  For all of these orders, get all material #'s in the BOM by doing a lookup on BOM DB using Item #
  Select only those materials where MaterialClass=one of the selected classes from the MRP screen
  For each material, calculate a required order quantity
  If BOM item UOM≠BOM basis UOM then convert BOM basis UOM Imps to kg=IMPs*(width*cutoff)/1000/1000/yield Kg to Imps=KG*yield*1000*1000/(width*cutoff)
  Required Order Quantity=(Gross Order Quantity/BOM Basis quantity)*item born quantity
  Sort all born items, for all selected orders on item number and on date required, subtotal on required order quantity (by date)
  For each item calculate an on hand quantity=Inventory−sum of all item quantities from earlier dates
  For each item calculate an on order quantity=sum of all item po's from earlier dates, up to the "to" date
Notes
None
FIG. 12E shows an exemplary monitor view of Process 4.3.2, which is achieved according to the following computer programming specifications:
Initial Processing
Receive "from" and "to" weeks from MRP transaction
Calculate from and to dates
Get all orders on the Orders DB that have Xworks dates between these two dates
User Workflow & Resultant Processing
Typical
Notes
None
FIG. 12F shows an exemplary monitor view of Process 4.3.3, which is achieved according to the following computer programming specifications:
Initial Processing
For each of the orders in 4.3.2
  Get list of born items by doing a lookup on BOM db using Item #
  For each item calculate a required quantity Required Quantity=(Gross Order Quantity/Bom Basis Q)*Item BOM Quantity
User Workflow & Resultant Processing
Typical
Notes
None
FIG. 12G shows an exemplary monitor view of Process 4.3.4, which is achieved according to the following computer programming specifications:
Initial Processing
Sort BOM items on item number and on date
User Workflow & Resultant Processing
Typical
Notes
None The foregoing disclosure and description of the invention are illustrative and explanatory thereof, and variations will be apparent to those skilled in the art, and are considered within the spirit and scope of the claimed invention.

We claim:

1. A method for management of placement and fulfillment of orders for printed packaging products, including labels for fast moving consumer goods, comprising the steps of:
(a) storing digital data associated with a plurality of orders for printed packaging items in a digital computer system;
(b) processing said digital data to create scheduling metadata which comprises the degree of technical difficulty associated with printing the images on said packaging items;
(c) storing digital data associated with multiple scheduling options for production of said packaging items associated with a plurality of orders in a digital computer system;
(d) analyzing said digital data with said digital computer system;
(e) generating a schedule for production of said packaging items associated with a plurality of orders from among said multiple scheduling options with said digital computer system; and
(f) producing said printed packaging products according to said schedule.

2. The method of claim 1, wherein said scheduling metadata about said images is analyzed by said digital computer system to confirm availability of production resources technically capable of printing said images on said packaging items.

3. The method of claim 1, wherein said digital data associated with said plurality of orders comprises packaging designs, packaging product designs, packaging items, and orders, said orders comprise a specified quantity of packaging items for delivery on specified dates.

4. The method of claim 1, wherein said digital data further comprises the production resources necessary to produce said packaging items.

5. The method of claim 1, wherein said digital data is analyzed by said digital computer system for ATP/Allocation.

6. The method of claim 5, wherein said ATP/Allocation comprises confirmation of availability of production capacity resources and production materials to fulfill said packaging order.

7. The method of claim 5, wherein said orders are accepted for scheduling by said digital computer system following confirmation of ATP/Allocation.

8. The method of claim 7, wherein said accepted orders comprise confirmation of capacity and resource availability in a specific production capacity bucket to meet a specified date.

9. The method of claim 1, wherein said digital computer system analyzes said digital data to support scheduling of said accepted orders in a sequence to optimize the effectiveness of manufacturing assets and meet end user specified dates for delivery of said packaging items.

10. The method of claim 1, wherein said schedule comprises scheduling of successive steps in the manufacturing process for said packaging items.

11. The method of claim 10, wherein said schedule comprises converter operations schedules including press schedules, laminator schedules, slitter schedules, coater schedules, metallizer schedules and schedules for other converter operations.

12. The method of claim 1, wherein said schedule includes utilization of specific production line resources and time resources for production of said packaging items associated with said plurality of orders.

13. The method of claim 1, wherein said schedule is generated by said digital computer system using decision support tools that provide immediate feedback on the impact of adding an order to a schedule, moving an order in a schedule, or deleting an order from a schedule.

14. The method of claim 13, wherein said decision support tools generate a finite schedule for orders sequenced for production on a particular converter operations line.

15. The method of claim 14, wherein said decision support tools comprise changeover and line speed calculations for said converter operations to quantify production start times and end times for said plurality of orders.

16. The method of claim 15, wherein said decision support tools utilize different formulas for changeover and line speed calculations for said converter operations schedules including press schedules, laminator schedules, slitter schedules, coater schedules, metallizer schedules and schedules for other converter operations.

17. The method of claim 13, wherein the means of adding, moving, or deleting an order from said schedule is drag and drop functionality.

18. The method of claim 1, wherein said digital computer system maintains multiple alternative schedules for producing said packaging items associated with said plurality of accepted orders.

19. The method of claim 14, wherein said schedule for successive converter operations in the manufacturing process are linked to one another, and immediate feedback on the impact of adding, moving, or deleting an order includes the impact that adding, moving or deleting an order will have on the schedule for subsequent steps in the production process.

20. A computer system for the management of placement and fulfillment of orders for printed packaging products, including labels, for fast moving consumer goods, comprising:

(a) an electronic storage means for storing digital data associated with a plurality of orders for printed packaging items;

(b) a means for processing said digital data to create scheduling metadata which comprises the degree of technical difficulty associated with printing the images on said packaging items;

(c) an electronic storage means for storing digital data associated with multiple scheduling options for production of said packaging items associated with a plurality of orders;

(d) a means for analyzing said digital data; and (e) a means for generating a schedule for production of said packaging items associated with a plurality of orders from among said multiple scheduling options, and (f) producing said printed packaging products according to said schedule.

21. The computer system of claim 20, wherein said digital information about said images is analyzed by said digital computer system to confirm availability of production resources technically capable of printing said images on said packaging items.

22. The computer system of claim 20, wherein said digital data further comprises packaging product designs, which comprises packaging designs, and packaging orders which comprise a specified quantity of packaging items for delivery on specified dates, said packaging items comprising said packaging product designs.

23. The computer system of claim 20, wherein said digital data further comprises the production resources necessary to produce said packaging items.

24. The computer system of claim 20, wherein said digital data is analyzed by said digital computer system for ATP/Allocation.

25. The computer system of claim 24, wherein said ATP/Allocation comprises confirmation of availability of production capacity resources and production materials to fulfill said packaging order.

26. The computer system of claim 24, wherein said orders are accepted for scheduling by said digital computer system following confirmation of ATP/Allocation.

27. The computer system of claim 26, wherein said accepted orders comprise confirmation of capacity and resource availability in a specific production capacity bucket to meet a specified date.

28. The computer system of claim 20, wherein said digital computer system analyzes said digital data to support scheduling of said accepted orders in a sequence to optimize the effectiveness of manufacturing assets and meet end user specified dates for delivery of said packaging items.

29. The computer system of claim 20, wherein said schedule comprises scheduling of successive steps in the manufacturing process for said packaging items.

30. The computer system of claim 29, wherein said schedule comprises converter operations schedules including press schedules, laminator schedules, slitter schedules, coater schedules, metallizer schedules and schedules for other converter operations.

31. The computer system of claim 20, wherein said schedule includes utilization of specific production line resources and time resources for production of said packaging items associated with said plurality of orders.

32. The computer system of claim 20, wherein said schedule is generated by said digital computer system using decision support tools that provide immediate feedback on the impact of adding an order to a schedule, moving an order in a schedule, or deleting an order from a schedule.

33. The computer system of claim 32, wherein said decision support tools generate a finite schedule for orders sequenced for production on a particular converter operations line.

34. The computer system of claim 33, wherein said decision support tools comprise changeover and line speed calculations for said converter operations to quantify production start times and end times for said plurality of orders.

35. The computer system of claim 34, wherein said decision support tools utilize different formulas for changeover and line speed calculations for said converter operations schedules including press schedules, laminator schedules, slitter schedules, coater schedules, metallizer schedules and schedules for other converter operations.

36. The computer system of claim 32, wherein the means of adding, moving, or deleting an order from said schedule is drag and drop functionality.

37. The computer system of claim 20, wherein said digital computer system maintains multiple alternative schedules for producing said packaging items associated with said plurality of accepted orders.

38. The computer system of claim 33, wherein said schedule for successive converter operations in the manufacturing process are linked to one another, and immediate feedback on the impact of adding, moving, or deleting an order includes the impact that adding, moving or deleting an order will have on the schedule for subsequent steps in the production process.

* * * * *